(12) United States Patent
Kautto-Koivula et al.

(10) Patent No.: US 7,058,895 B2
(45) Date of Patent: Jun. 6, 2006

(54) METHOD, SYSTEM AND APPARATUS FOR CONSTRUCTING FULLY PERSONALIZED AND CONTEXTUALIZED INTERACTION ENVIRONMENT FOR TERMINALS IN MOBILE USE

(75) Inventors: Kaisa Kautto-Koivula, Espoo (FI); Marita Huhtaniemi, Helsinki (FI); Petri Lähdesmäki, Espoo (FI); Petri Mäenpää, Helsinki (FI)

(73) Assignee: Nokia Corporation, Espoo (FI)

( * ) Notice: Subject to any disclaimer, the term of this patent is extended or adjusted under 35 U.S.C. 154(b) by 455 days.

(21) Appl. No.: 10/028,170

(22) Filed: Dec. 20, 2001

(65) Prior Publication Data

US 2003/0117436 A1    Jun. 26, 2003

(51) Int. Cl.
*G06F 7/00* (2006.01)
(52) U.S. Cl. .................................. 715/744; 709/229

(58) Field of Classification Search ............... 345/744, 345/733, 762, 838; 709/213, 215, 201; 715/744, 715/733, 765, 763, 853
See application file for complete search history.

(56) References Cited

U.S. PATENT DOCUMENTS 6,323,881 B1 * 11/2001 Broulik et al. ............. 345/744
6,708,172 B1 *  3/2004 Wong et al. ................. 707/10

* cited by examiner

*Primary Examiner*—Cao (Kevin) Nguyen
(74) *Attorney, Agent, or Firm*—Morgan & Finnegan, LLP

(57) ABSTRACT

A method, system and apparatus for creating personalized and contextualized interaction environment for terminals in mobile use. The method comprises receiving user instruction regarding information displayed on the interface, wherein the interface is represented in the contextualized interaction environment by a node map, updating the internal node map in accordance with the user instruction and displaying the interface in accordance with the updated internal node map. The node map is arranged to represent the user information in a particular context on the interface.

82 Claims, 94 Drawing Sheets

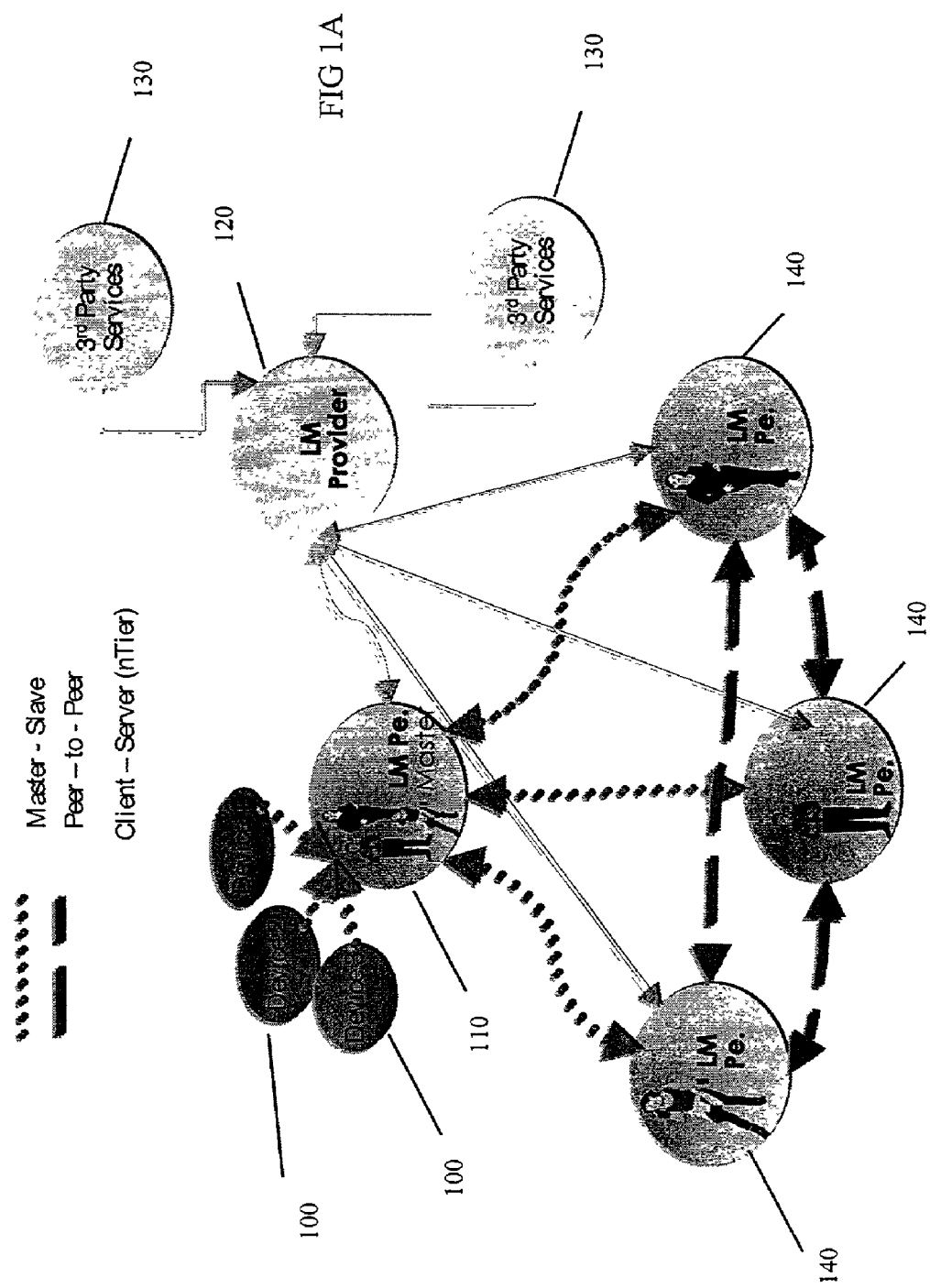

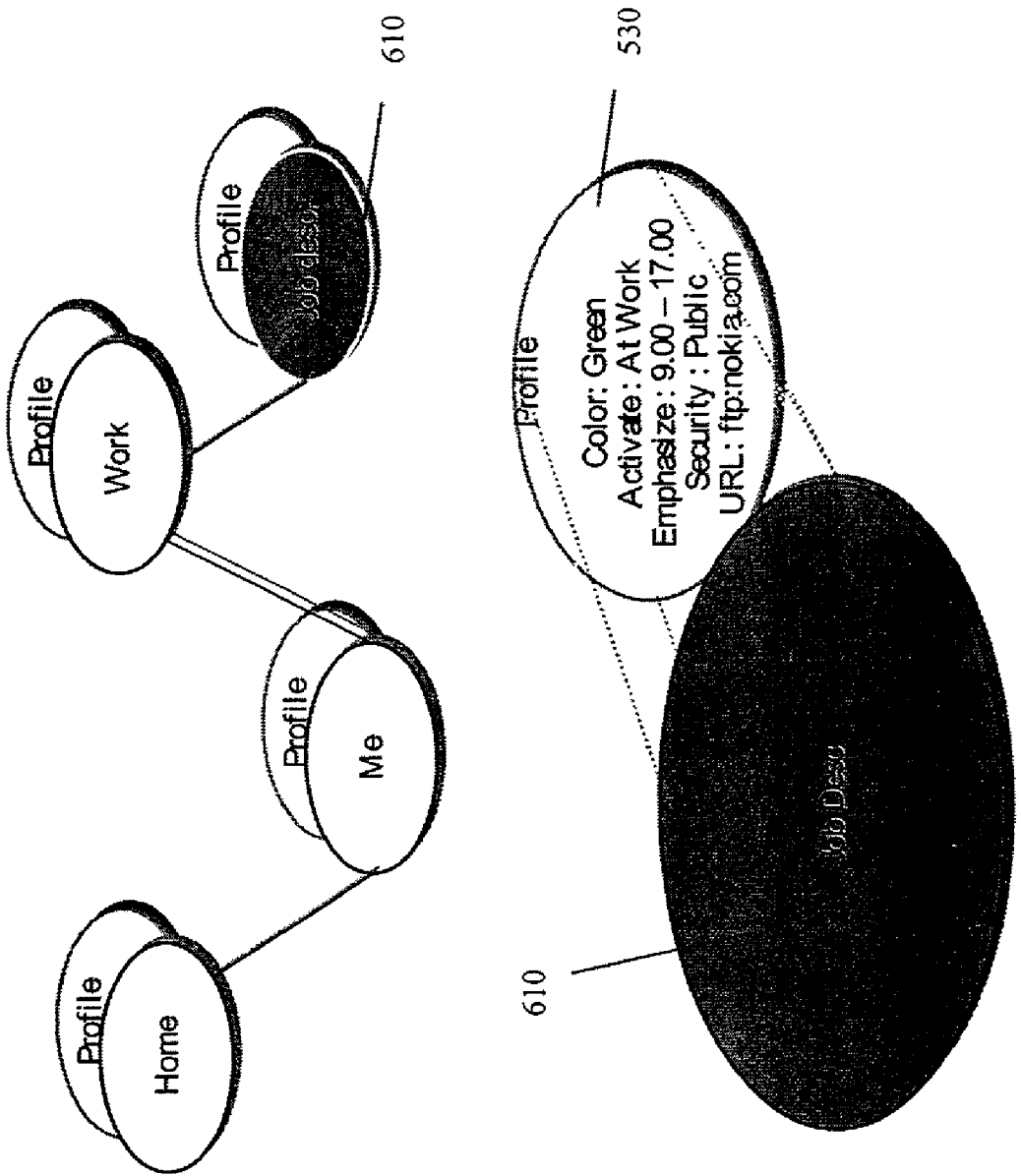

Nokia LifeMapper Personal – Mapping Hierarchy Support
FIG. 15
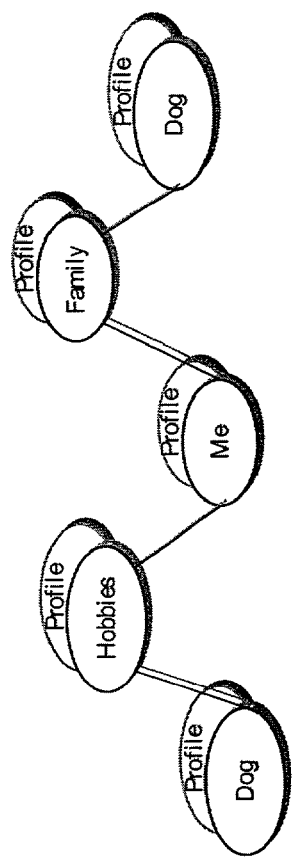
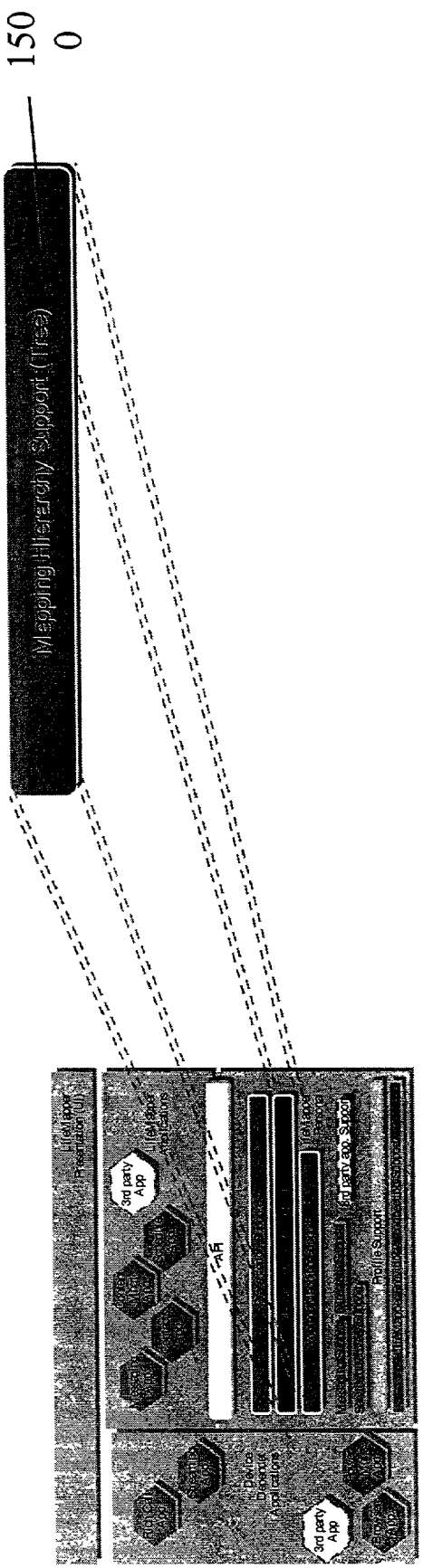

Nokia LifeMapper Personal – Content Hierarchy Support
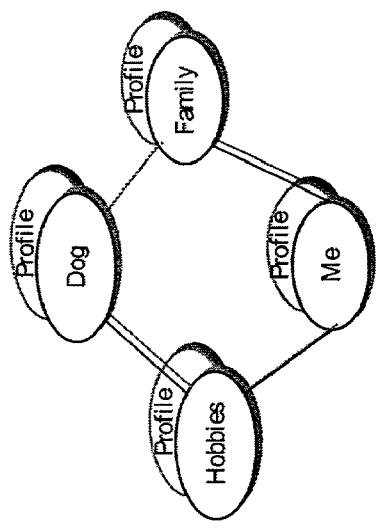
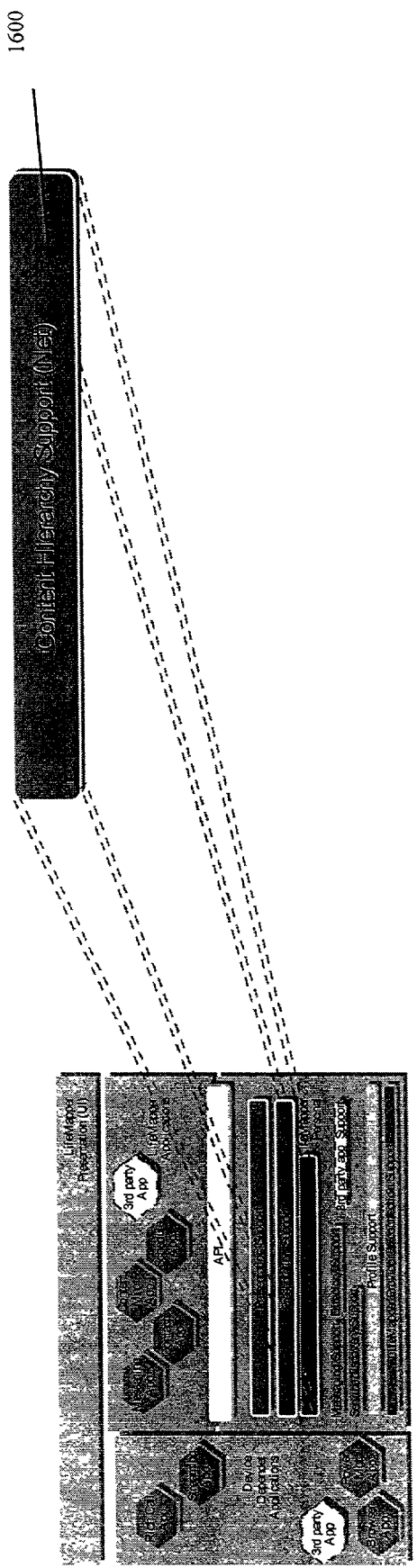
FIG. 16

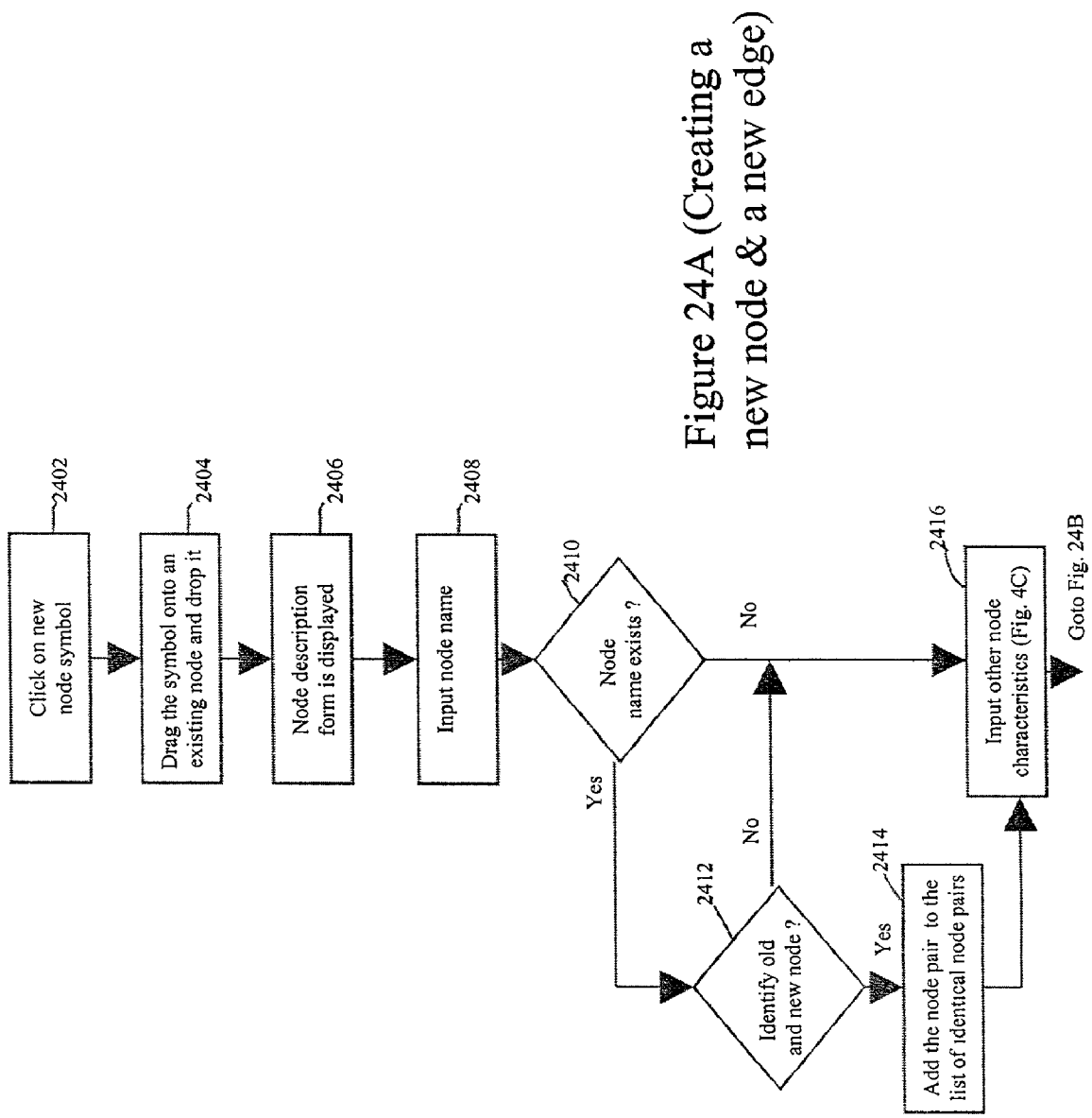
Figure 24A (Creating a new node & a new edge)

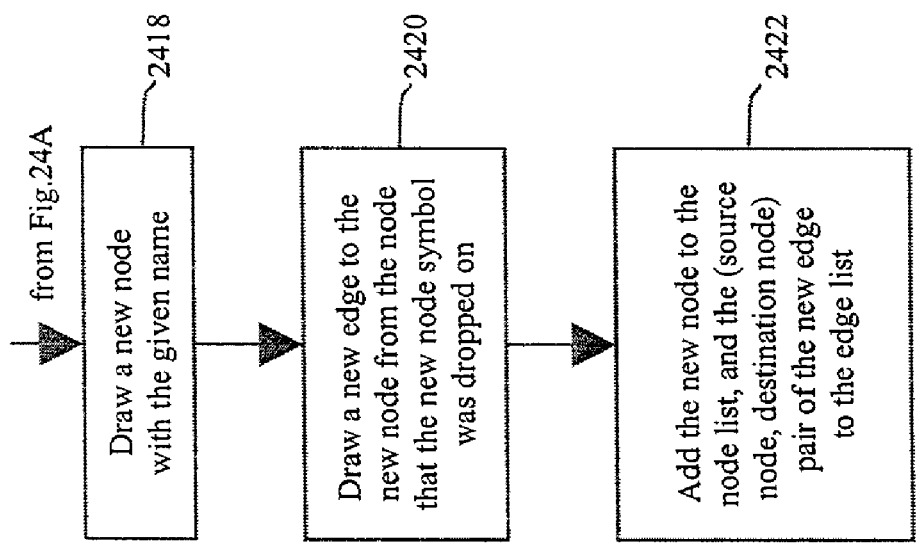
Figure 24B (Creating a new node & a new edge, cont'd)

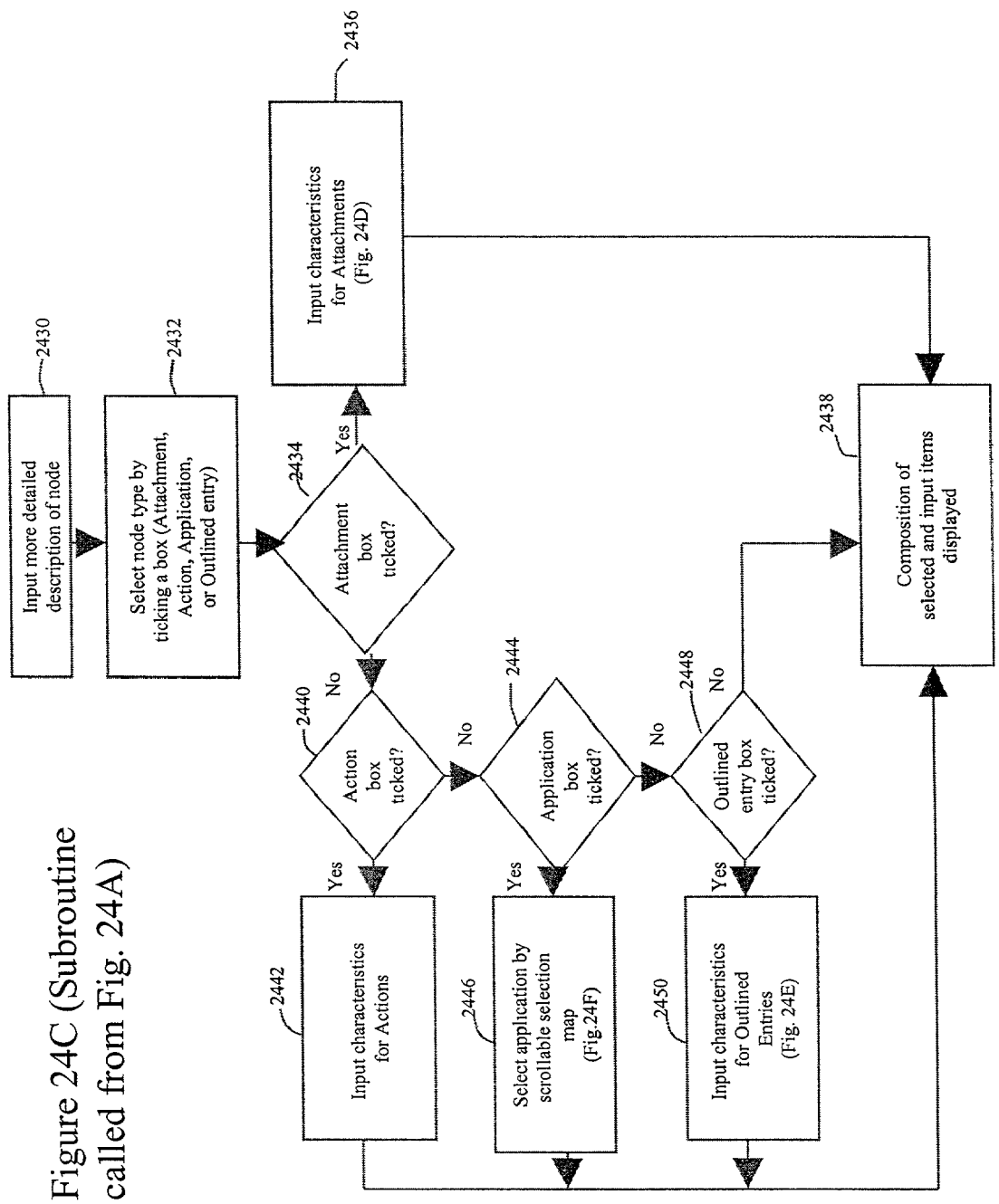
Figure 24C (Subroutine called from Fig. 24A)

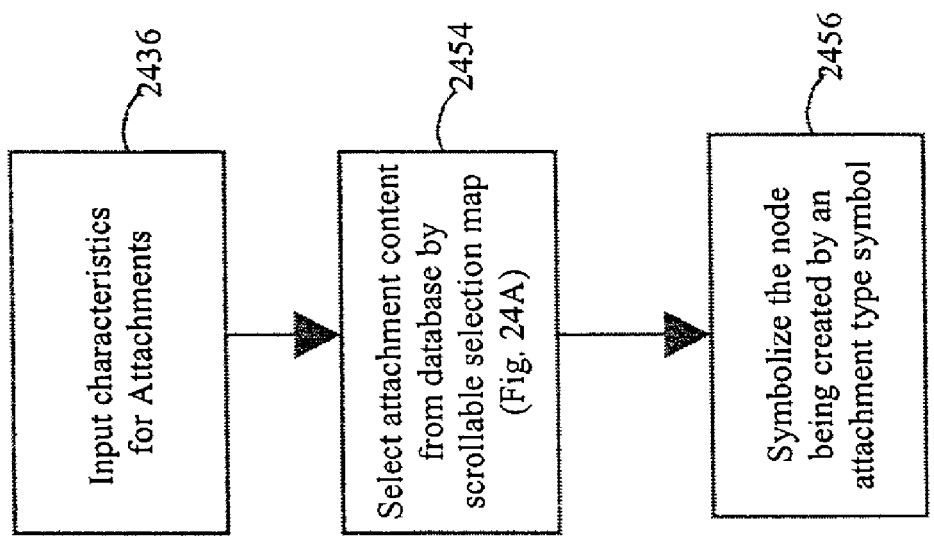
Figure 24D (Subroutine called from Fig. 24C)

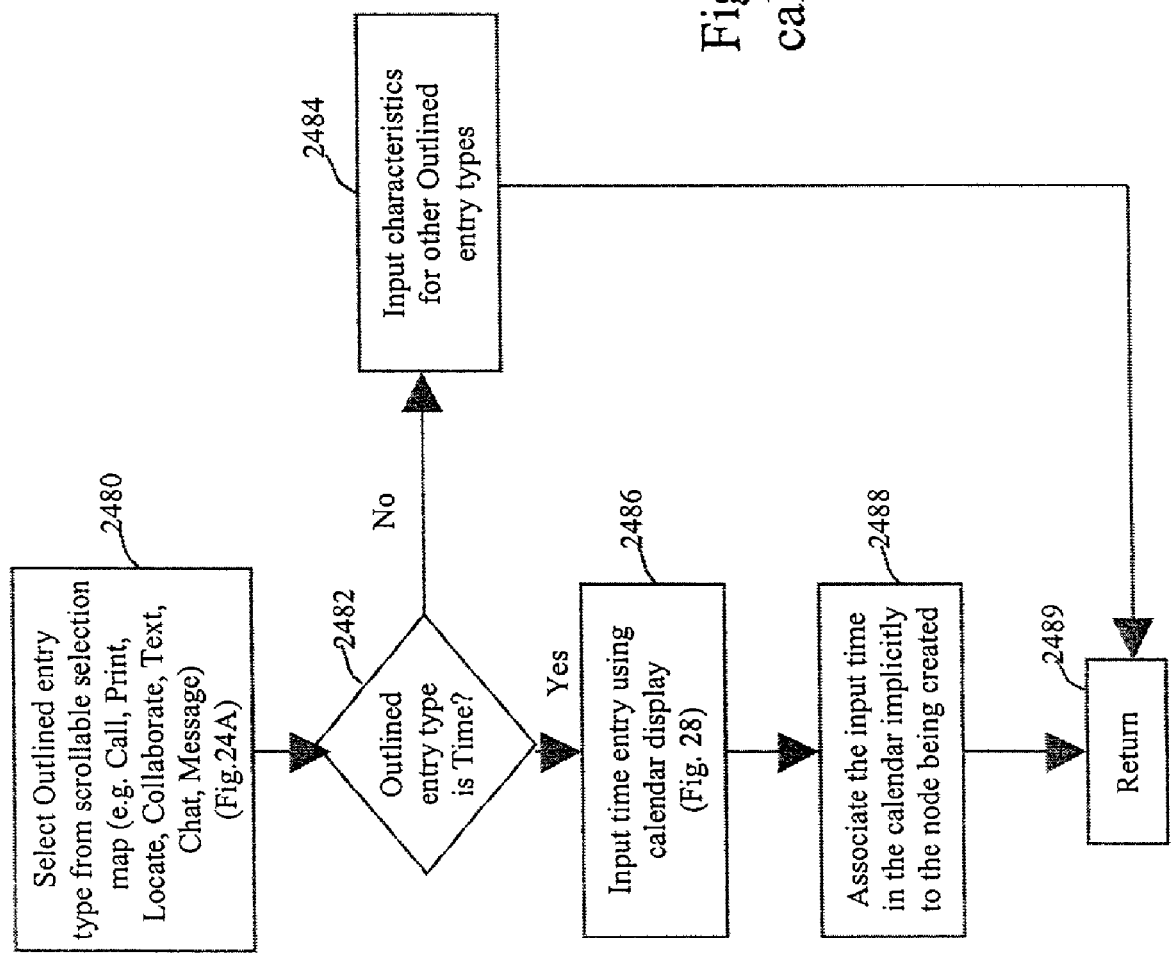
Figure 24E (Subroutine called from Fig. 24C)

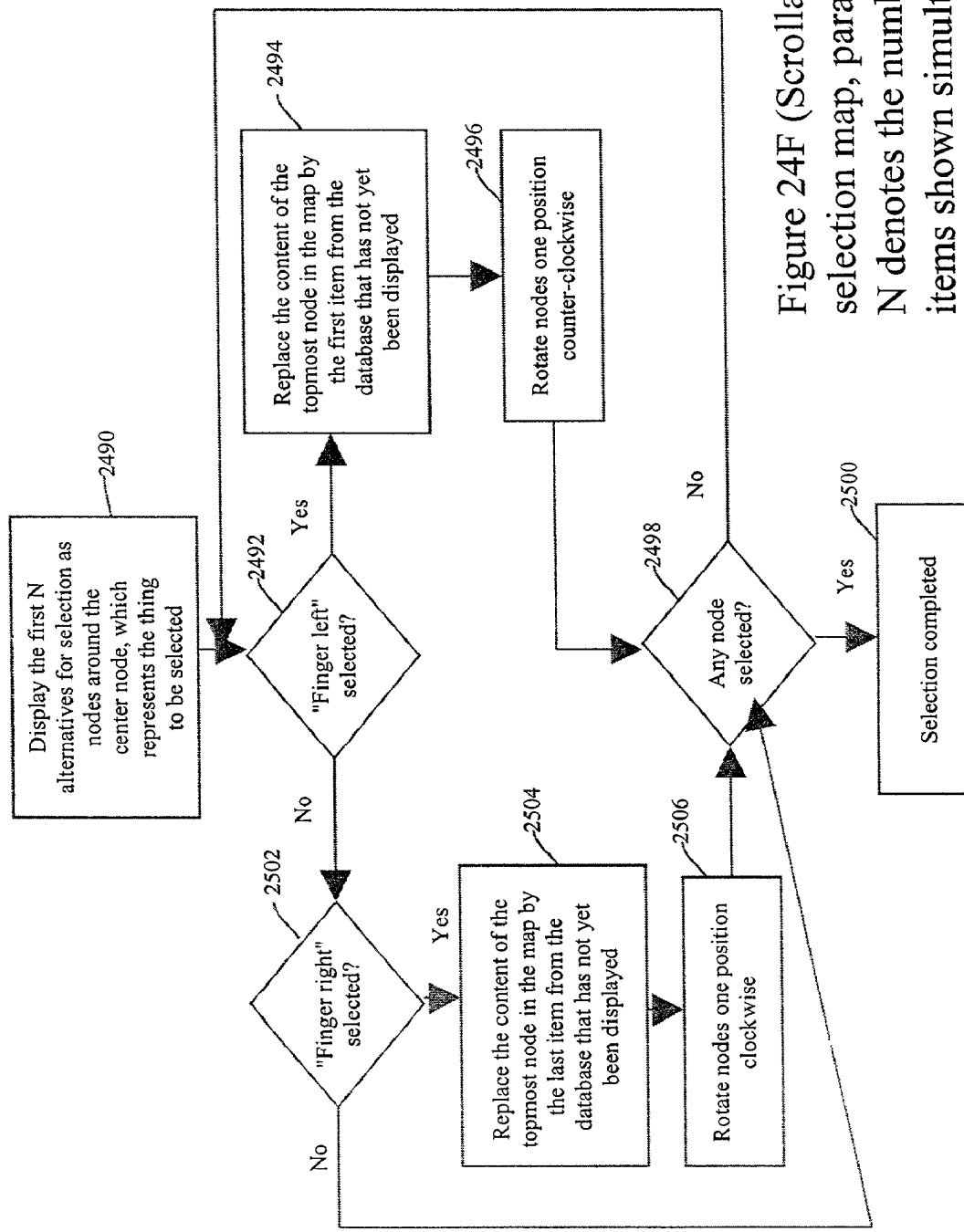
Figure 24F (Scrollable selection map, parameter N denotes the number of items shown simultaneously in the map)

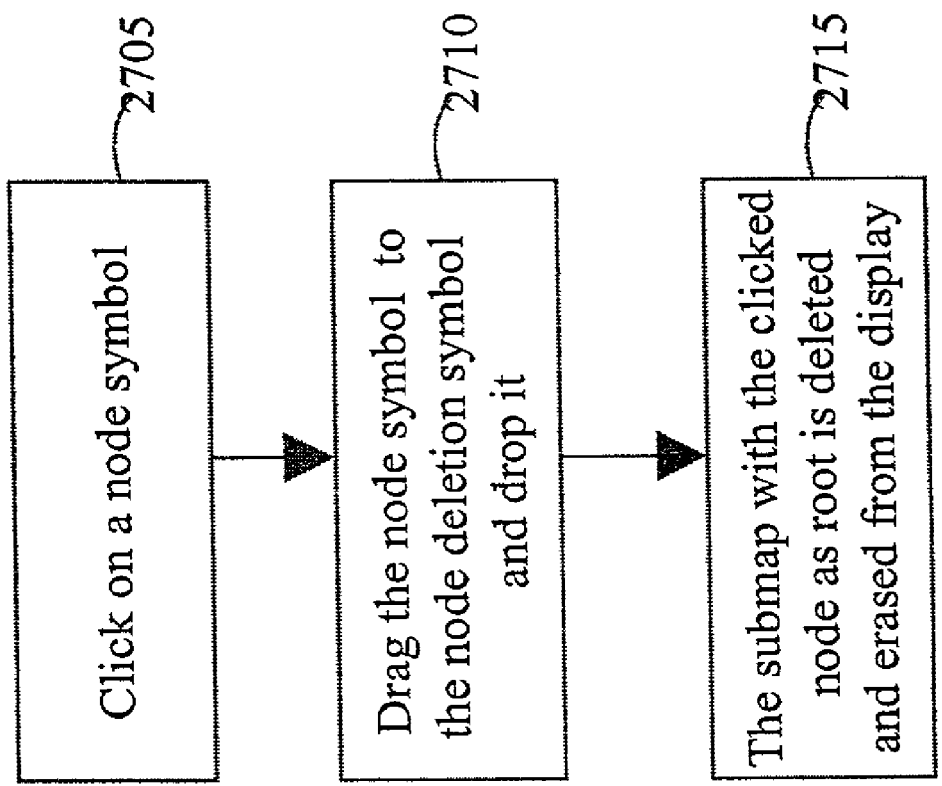
Figure 27A Deleting a submap (limiting case: a node) from a map

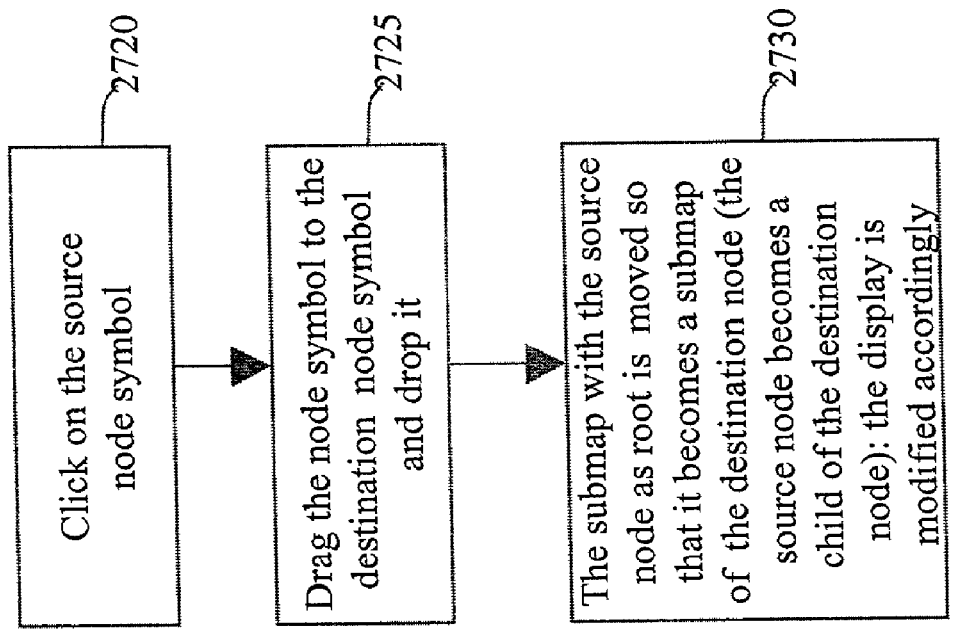
Figure 27B Moving a submap (limiting case: a node) to another place in a map

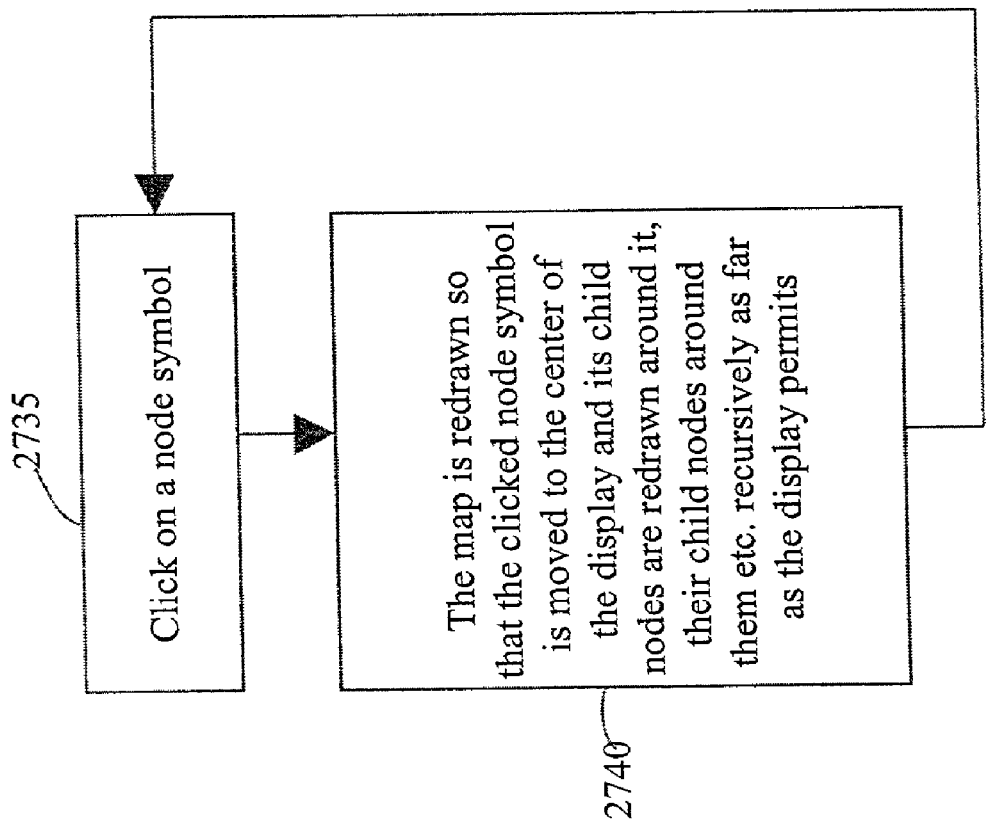
Figure 27C Navigating a map manually

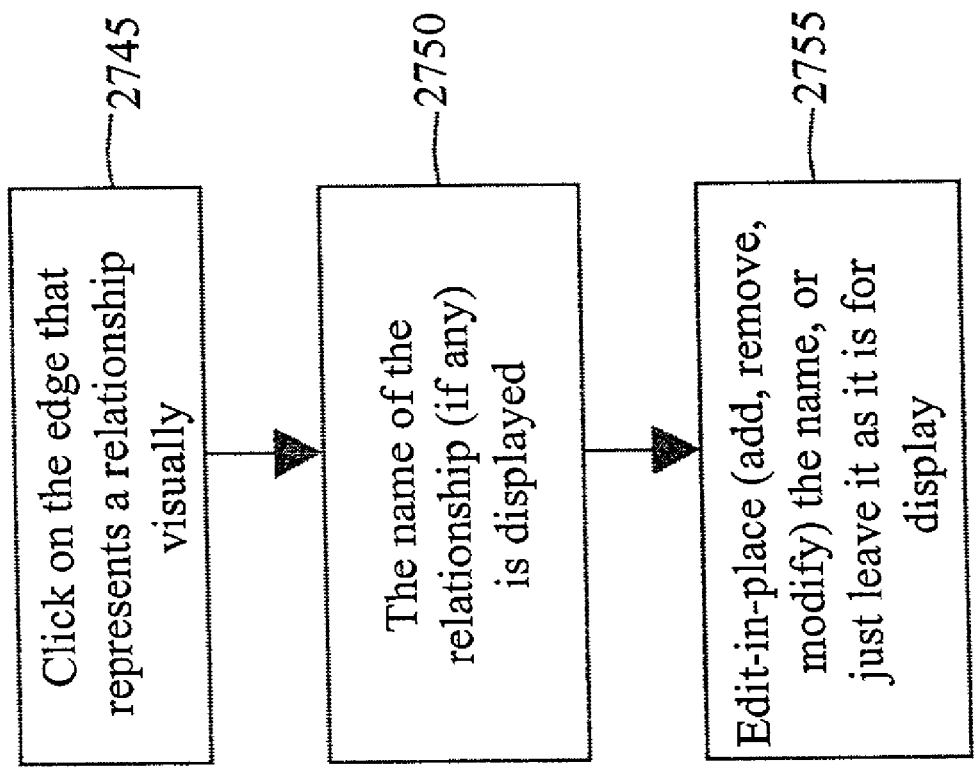
Figure 27D Editing or displaying the name of a relationship

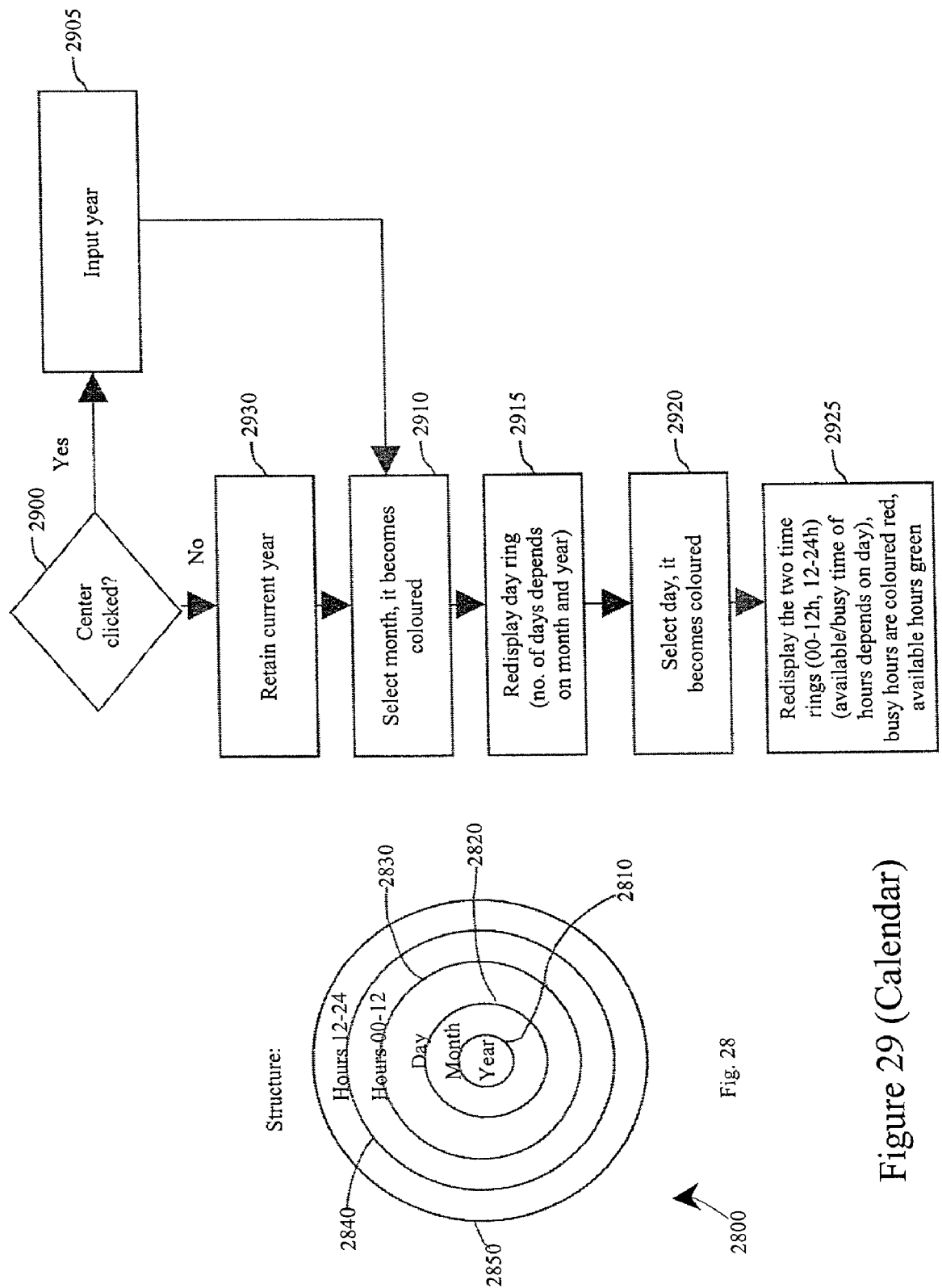
Figure 29 (Calendar)

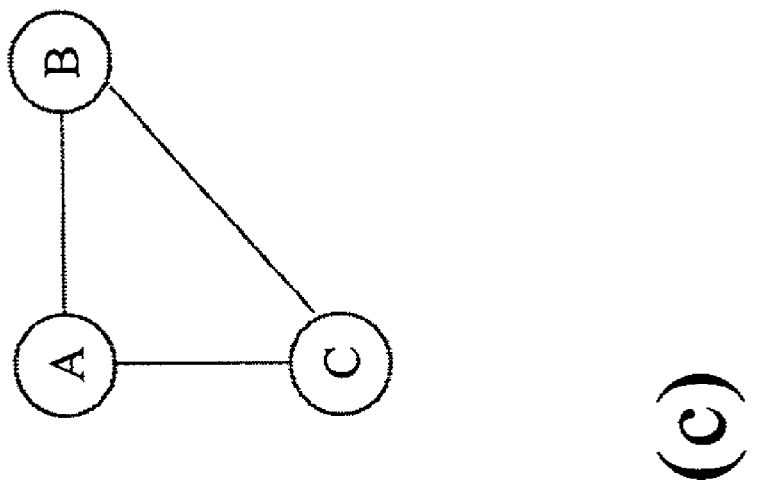
(c)
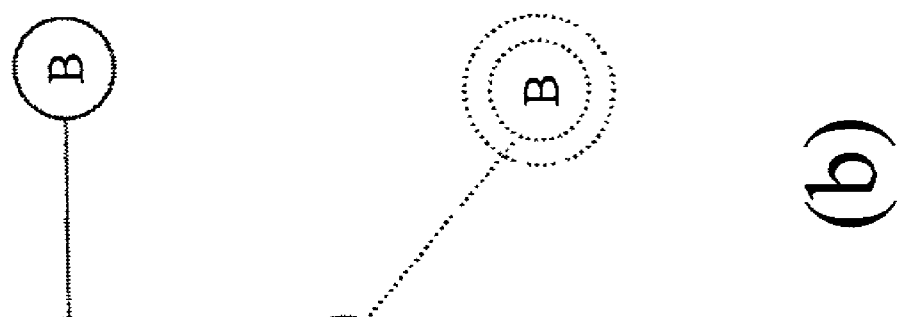
(b)
Figure 30
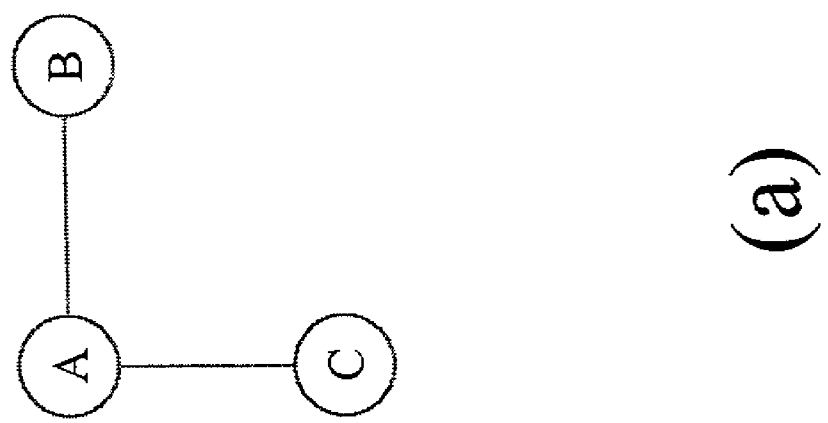
(a)

METHOD, SYSTEM AND APPARATUS FOR CONSTRUCTING FULLY PERSONALIZED AND CONTEXTUALIZED INTERACTION ENVIRONMENT FOR TERMINALS IN MOBILE USE

FIELD

A method, system and apparatus for creating user-interfaces, and more particularly a method, system and apparatus for creating personalized and contextualized interaction environment for terminals in mobile use.

BACKGROUND

User Interfaces (UIs) are generally organized in terms of hierarchical file systems. This stands in contrast to the way a user thinks, which is generally in terms of an association network of ideas in the form of graphs. However, the easiest way to organize an association network is using a data structure, which can be complicated to understand for lay users. Association networks are referred to as maps hereinafter.

In older Personal Computer (PC) systems and UIs, information has been organized along the structure of the file system of a computer. Mobile phone UIs, in contrast, have been organized task-wise, but they are neither customizable nor map-structured. These older application programs are designed just for organizing and navigating information. However, as can easily be recognized, in today's computing environment there is a great need for application programs that provide a richer system of functionality that allows users to utilize them for a wide variety of functions. The additional functions of creation, innovation, understanding, learning, communication and commerce of information have had to be accessed by means of disparate devices and application programs with various types of UIs. These functions are disparate with respect to each other on a conceptual as well as on the implementation level. Users have been forced to move from one device and/or application program to another, possibly converting information from one format to another, and/or synchronizing data between devices and to switch from one mindset to another, in performing these functions.

Further, older systems have UIs that typically organize information in terms of a hierarchical file system. The items can be pictures, videos, links to web pages, text notes, files, and/or the like. Unfortunately, such hierarchical file systems fail to relate items of information in a user-friendly manner such that a user might be able to access one piece of information from another related piece of information, when the two pieces of information are organized as different items.

Existing systems restrict customization of the UIs as well. Customization of a UI has been confined to the possibility, in some applications, of adding items to menus whose structure has otherwise been decided in advance and designed by a UI designer. For example, the WINDOWS desktop can be customized to some extent, but its menus have structures that are largely pre-programmed by the developers. Moreover, items on such systems cannot be interlinked. Such problems become even more acute when we deal with mobile systems, such as cellular phones.

Another disadvantage of existing systems is that they are device-dependent. Thus, there is a need for a method, system and apparatus for creating user interfaces for terminals in mobile use that are compatible with all sorts of terminals.

Further, there is a need for a mechanism that allows individual users to customize their own terminals in accordance with their own preferences and needs.

SUMMARY

The method, system and apparatus for creating fully-personalized and contextualized user interfaces for terminals in mobile use disclosed herein overcomes the above-mentioned disadvantages.

The method, system and apparatus provides seamless interaction across various contexts by using a content abstraction layer in coordination with an information layer. The content abstraction layer contains links to content, services and devices in the existing underlying information layer, consisting of web, mobile and stationary domains. The content abstraction layer is a knowledge layer, because it links information in the form of content, applications services and devices to their appropriate contexts, and knowledge can be defined as information associated to the mental contexts of a person. Thus the CIE allows the user to create a fully personalised map of his everyday life contexts, and to link all the information he needs to manage his everyday life to the nodes (i.e. contexts) of that map. Such a map may be thought of as a context map, and likened to roadmaps in a sense: in the same way as a road map helps a person to find his way geographically, a context map helps the user to find his way in his everyday life contexts. This mechanism is a novel way of modeling everyday life contexts and their relationships that allows seamless moving between daily roles, tasks, processes, and the like. The present context map has a network structure, which proves very useful in finding one's way geographically. The present invention offers alternative views to the underlying network structure, such as the tree and outline views. The user can choose the view to the underlying network structure of the map that he finds most intuitive and easy to use.

The disclosed method, system and apparatus for enabling users to create customized user interfaces allows a user to create user interfaces on the fly. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface.

These aspects and other objects, features, and advantages of the method, system and apparatus for establishing, monitoring and managing connectivity for communication among heterogeneous systems are described in the following Detailed Description, which is to be read in conjunction with the accompanying Figures and the claims.

BRIEF DESCRIPTION OF THE FIGURES

FIGS. 1A–1B depict the system for providing a personalized and contextualized user interfaces for terminals in mobile use;

FIG. 8 provides an overview of an Attachment node;

FIG. 15 illustrates one embodiment of the mapping hierarchy support for the architecture of FIG. 13;

FIG. 16 illustrates one embodiment of the content hierarchy support for the architecture of FIG. 13;

FIGS. 24A–24F are flowcharts illustrating an exemplary process by which users may create new nodes and edges on the maps;

FIG. 27A–27D are flowcharts illustrating the exemplary actions that may be performed on the maps;

FIG. 28 depicts one exemplary embodiment of a calendar;

FIG. 29 is a flowchart for creating and using the calendar of FIG. 28; and

FIG. 30 provides one exemplary illustration of the resolution of a graph into a tree.

Figure 1B:
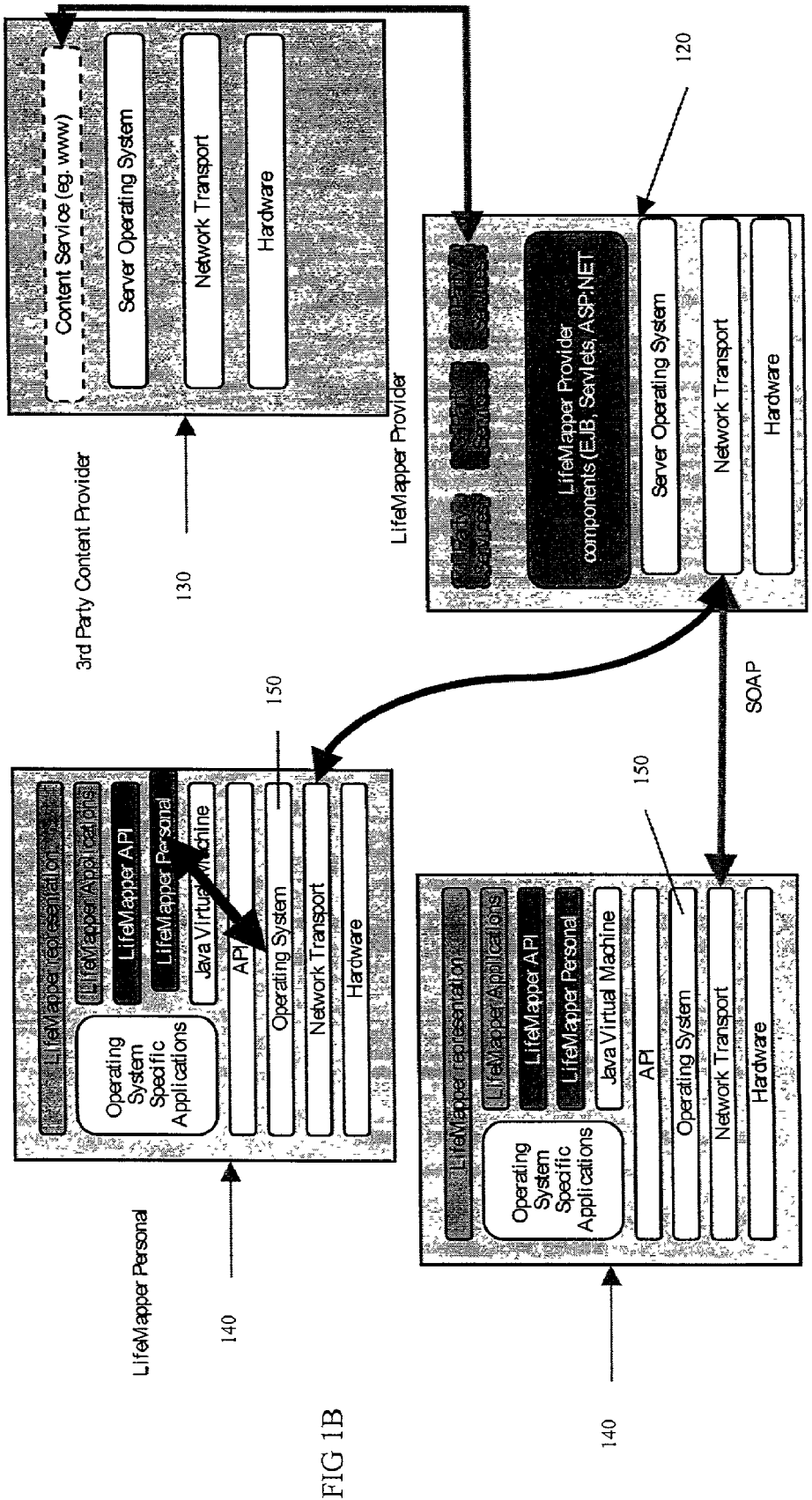

With reference to the following detailed description, the aforementioned Figures will be described in greater detail below.

DETAILED DESCRIPTION

Described herein is a method, system and apparatus for creating fully personalized and contextualized interaction environment (hereinafter referred to as CIE) for terminals in mobile use. The disclosed method, system and apparatus for enabling users to create customized user interfaces allows a user to create user interfaces on the fly. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface. The key feature of the present invention lies in the disclosed meta-level character, which is a dynamic and user-friendly application for constructing UIs and allows users to fully customize their terminals in accordance with their own preferences.

The CIE is context-sensitive in that the user may organize content, devices, applications and services into particular context in the UI of their personal CIE-supported devices. Because each node in a node map represents a context, the possible link to content, devices, applications and services that the node contains implements the "content, devices, applications and services in context" idea of the present invention. By means of profiles specific to a node, the user may also specify the visibility, emphasis in appearance, and other attributes of applications, devices, services and content in a novel, user-defined notion of context-sensitivity.

One way of implementing maps is by means of JAVA (or another object-oriented language) class hierarchies. Each node in a map may be implemented by means of a JAVA class, so that the class interface represents the node's context. A context is a collection of variables, and may be defined as:

context = sequence of typed variables

The inheritance from a node to its child node, described below, may be implemented as inheritance from a class to its subclass in JAVA. Because a map may now be implemented by means of a JAVA class hierarchy, the map must be resolvable into a tree. This is because a JAVA class hierarchy always has tree form. This requirement can always be achieved by our method of resolving a map in graph form into tree form. When a map has been resolved into a tree, a node may have several occurrences and hence several parent nodes. Combining this with inheritance implies that a map may use multiple instances of inheritance rather than just single inheritance. JAVA does not support multiple inheritance directly, but the same effect for our purposes can be achieved in well-known ways by using class interfaces.

It should be noted that a map template is the same thing as a context space, because maps may contain profiles but map templates do not. An example of a context space (i.e. map without node profiles), consisting of three contexts, is a map consisting of three nodes: Vehicle, Motorbike and Boat, defined so that Motorbike and Boat are children of Vehicle, as shown below.

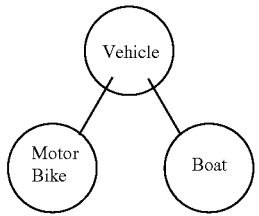

Here, Vehicle has the attributes Name of type String, and Age of type Integer. To describe these attributes, we use the following technical notation:

Vehicle = (Name: String, Age: Integer)

Furthermore, Boat inherits the attributes of Vehicle, and in addition has the attribute Model of type String, i.e. technically:

Boat = (Name: String, Age: Integer, Model: String)

Profiles define values of node attributes, and so in the above example map the following profiles exist:

(Name = "Marianne", Age = 12) for Vehicle    and
(Name = "Marianne", Age = 12, Model = "Flyer89") for Boat The profiles have the same values for the attributes Name and Age, because it has been defined that Boat inherits the Vehicle. The user may afterwards change the values, so that, for example, the Name attribute of Boat is assigned the new value "Jane".

Moreover, the user may give or sell his map and/or the map template (i.e. context space) that consists of the map without the node profiles, to other users. Then, another user might, for example, define the attributes of Boat so that they represent the respective attribute values of his own boat. This might result in the following profile:

(Name = "Diana", age = 4, Model = "Lygaia44").

Abstracting from this particular example, a context is a sequence of typed variables, such as $(x_1: A_1, \ldots, x_n: A_n)$. Here, $x_i: A_i$ means that variable $x_i$ is of type $A_i$. A profile is a sequence of definitions of values of variables, such as $(x_1=a_1, \ldots, x_m=a_m)$. When a user gives or sells his map to others, the recipients are not able to modify the node profiles. This is appropriate when the others want to use the map as a link collection to existing content, applications, devices and services. On the other hand, if the others want to use the map to organize their own content, it is appropriate to give or sell to them a map template. Namely, a map template is a map whose profiles are stripped away. The others may then define the profiles according to their own needs of organizing their own content.

CIE inheritance in maps complies with the JAVA notion of inheritance also in selectivity. The user that constructs the map may select which attributes a child node inherits from its parent node, and the child node need not inherit all attributes from the parent.

It should be noted that hereinafter the word "terminal" is used to indicate a mobile phone, a personal digital assistant, a laptop computer, a hand-held computer, a desktop PC, a digiTV, and/or any similar computing device. It should be noted that only some types of terminals may be carried along by mobile users. The user can access his personal virtual workspace device-independently, i.e. by using any CIE-enabled computing device that happens to be near him, wherever he happens to be.

According to the invention, users are able to organize their information/UIs using maps, which relate different types and items of information. The system and method for construction of UIs is access-, content- and device-independent, and actions may be made a function category of the UIs. Examples of the various devices that may be used include:
  PC environment: Linux, MS Windows, MAC and/or the like.
  Handheld devices: Symbian, Pocket PC, Windows CE, J2ME, PersonalJava and/or the like.
  Mobile Devices: All J2ME and PersonalJava compliant devices, WAP/XHTML and/or the like.
  Other devices: JINI, OBEX, Local Operation Network (LON), which may be only accessed using the present invention (as a result, devices such as refrigerators and washing machines can be controlled by the system of the present invention, as will be explained in more detail below).

Examples of the various types of access that may be used include:
  TCP/IP based environment and/or the like.
  Mobile Devices: GPRS, 3G and/or the like.
  Handheld Devices: WLAN, Bluetooth and/or the like.
  PC environment: WLAN, Bluetooth, ADSL and/or the like.

Examples of the various types of content that may be supported include:

XML based content easily accessible with any device, and/or the like.

MIME based file-type identification that is dependent on viewer, and/or the like.

In addition, the system and method for construction of UIs may be person-dependent, so that the system is fully customizable and includes user created content. The system and method may also be time dependent so that a different device may be in use at different times and access to the system may be obtained from all devices, and user defined profiles may be used to allow time enabled services, which are explained in more detail below. The system and method may be location dependent as well, to allow different services at different locations, with location identification based on user (such as user definable locations). The system and method may further be device-dependent to allow location identification using technologies such as GPS, GPRS and/or the like.

Two or more users can collaborate simultaneously with each other in performing these functions by terminals, using Bluetooth, WLAN, Internet, GSM, GPRS, UMTS connections and/or the like. The connection type depends on terminal. For example, a Personal Computer (PC) may use a fixed Internet connection, whereas a mobile phone may use a GPRS connection in a collaboration situation. The system may optionally be implemented in a peer-to-peer system that enables convergence of communication, information management and learning in interfacing them uniformly to the user, as will be explained in more detail below. Because the exact design of the system does not restrict the use of the disclosed invention, it is believed that the scope of the present invention is not limited by the system design.

The invention provides seamless interaction across various contexts, which is achieved by introducing a new content abstraction layer. The new layer contains links to content, services, applications and devices in the existing underlying layer, consisting of web, mobile and stationary domains. In short, the new layer is a knowledge layer, because it links content, services, applications and devices to their appropriate contexts, whereas the existing layer is an information layer.

As will be described in more detail below, the present invention enables a user to interface various types of terminals in mobile use. The user can access the same information regardless of where and when he needs it and/or the terminal being used. According to one embodiment, it is possible to restrict access to select information, based on some criterion. For example, an employer may restrict access to certain confidential files to the physical premises of the employer. As will be clearer from the discussion below, information is more intuitively organized than in present systems.

In accordance with one embodiment of the invention, if the user wants to perform an action that he has customized into his UI, he first moves the symbol to the center of the display by pointing at the symbol, and then double-clicking thereon to perform the action.

The terminal is conceptualized as a tool for uniform organization, navigation, creation, innovation, understanding, learning, communication and commerce of information. In other words, the present invention acts as a management tool for information on a computing device. The convergence of communication, information management and learning is supported is by a method for interfacing them uniformly to the user. Further, the user has complete freedom to customize the way he interfaces to a terminal.

In accordance with the present invention, the system for constructing UI's may be run at home, at school or work, on terminals and/or the like. At home, the system may be run on terminals connected to a master device, or on the master device itself, as will be described below via Bluetooth, WLAN technology and/or the like. At school or work, the system may be run on terminals connected to the master device via Internet connections provided by X Service Providers (xSPs). It should be noted that the master device may also be a service purchased from a service provider. On cellular terminals, the system may be run anywhere via wireless connections provided by cellular network operators, such as GSM, GPRS, UMTS operators.

The above-mentioned master device may be any computing device that stores data, and communicates with the external world via Internet. The master device communicates via Bluetooth, WLAN or LAN connections with terminals and/or any other devices, such as coffee makers, refrigerators and/or the like. One may also purchase a master device service from a service provider, if one does not want to have one of one's own.

The system for creating UIs may run on top of the JAVA programming language, and more particularly on a JAVA VIRTUAL MACHINE, which runs on an operating system such as LINUX. However, any Operating System may be used, as long as they support JAVA. The user may interact with a terminal by means of some kind of a pointing device, which may be dependent on the terminal type. The pointing device can be a touch screen pen, a mouse, arrow keys on a keyboard and/or the like. Terminals may also have a text-inputting device, such as a keyboard, a virtual keyboard on a display device, or a touch screen together with a pen and handwriting recognition functionality.

According to one embodiment, the disclosed system architecture is a peer-to-peer system, which will be described below.

As is described in greater detail below, the user's content is organized around maps, and resides in a map database in the user's master device. When a user inspects or updates his maps, a copy thereof is also transferred temporarily from his master device to the terminal he is using, and the modifications are transferred back to his master device. This updating can be done either manually by the user, or set to take place automatically on a user-determined periodic basis.

With reference to the Figures, various embodiments of the method, system and apparatus for creating UIs to fully customize their terminals in accordance with the users' own preferences will now be described in greater detail. It is to be understood that the tasks shown in the Figures and described in this Detailed Description can be sequenced in many different orders to achieve the desired result. The order or sequence of tasks illustrated in the Figures is merely intended to be exemplary of the concepts defined herein.

FIGS. 1A–1B illustrate one exemplary embodiment of the system in accordance with the present invention. As shown in FIG. 1A, a plurality of devices 100 may be connected to a CIE master device 110. The CIE master device 110 communicates with service providers, having a central server in one embodiment, via any network connection. A family or a similar group of people may use a common CIE master device 110, which may be any computing device with JVM. The end user may choose the device 100 they want to use. Personal CIE-supported device 140, along with the CIE master device 100 both communicate in Client-Server mode with servers running CIE service providers 120, to obtain services. The personal CIE-supported device 140 is to be used by individual end users. The personal CIE-supported device 140 with the same chosen CIE master device 110 communicate therebetween in Master-Slave mode (e.g. using applications on the master device and controlling third party devices such as refrigerators or coffee makers via the master device) and with one another in Peer-to-Peer mode (e.g. collaboration and exchanging maps). These third party devices may use JINI, OBEX, LON or similar control means. In addition, two CIE slave devices 140 that have different masters may communicate Peer-to-Peer with each other.

The CIE provider 120 may contain, for example a backup service, which is important because the user's content may be distributed across various devices. It would be very cumbersome to manually backup all of these devices separately manually.

The CIE master device 110 contains each individual user's maps as submaps, and may control the user's household appliances like refrigerators and washing machines.

FIG. 1B provides a closer view of the structure of the personal CIE-supported device 140, the CIE service providers 120 and the third party providers 130, in accordance with one embodiment. The personal CIE-supported device 140 comprises a JAVA-based control layer on personal operating systems 150, such as MICROSOFT Windows, LINUX, POCKET LINUX, APPLE, BSD, and/or the like. According to one embodiment, the CIE service provider 120 and the third party providers 130 may be comprised of an xSP server middleware layer for the service connections with the personal CIE-supported device 140.

In accordance with the present invention, the CIE software is installed on personal devices 140 that are JAVA-enabled. The software creates a unified trusted operating environment for all personal CIE-supported devices 140, which can formulate together a shared user-definable virtual workspace. As is apparent, any of the devices can act as a master device 110 while other devices 140 act as slave devices.

Figure 2:
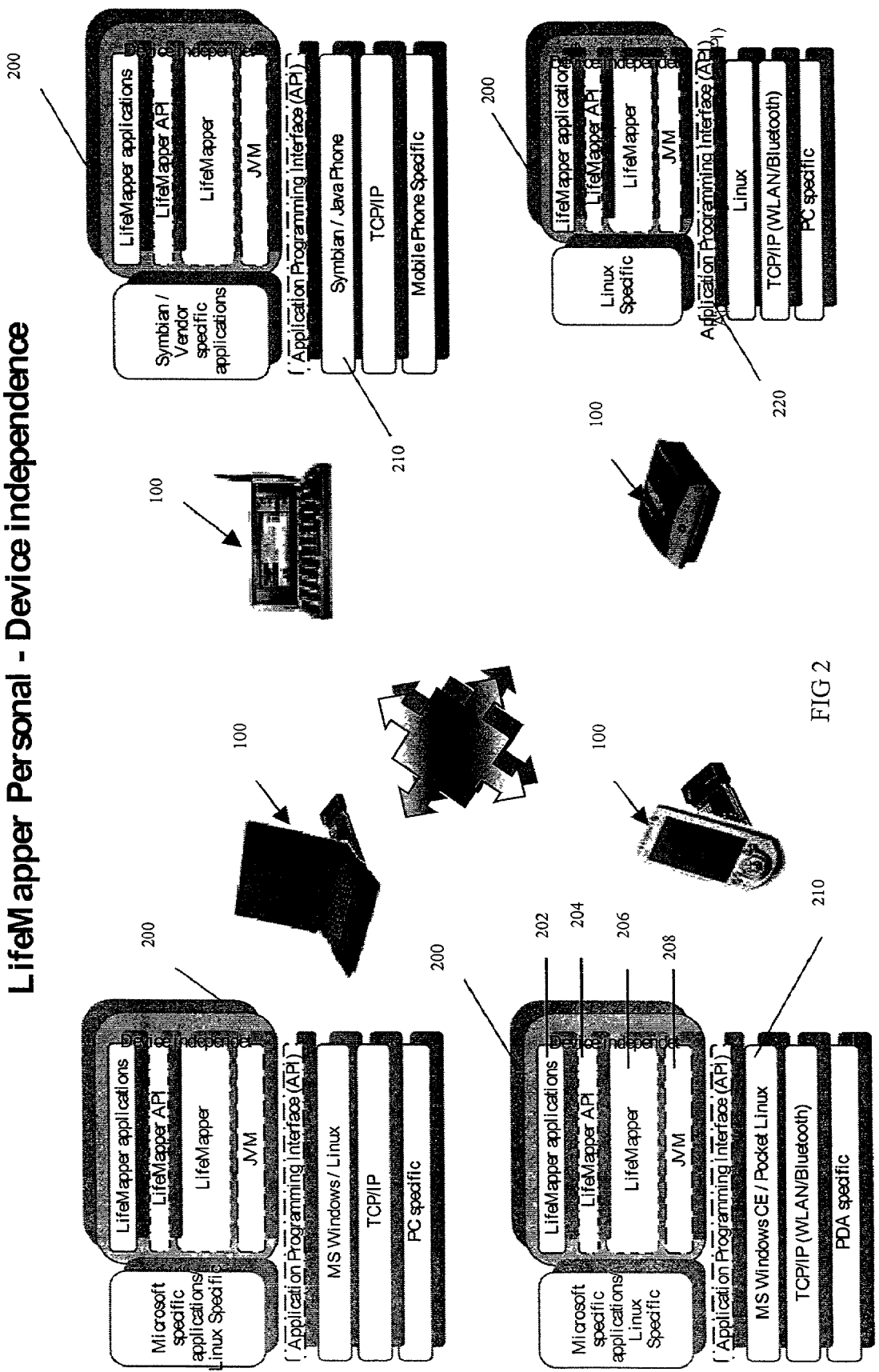
FIG. 2 illustrates various devices that are supported by the system of FIG. 1.

FIG. 2 depicts the wide array of devices 100 that may be supported by the CIE disclosed herein, such as a laptop, a personal digital assistant (PDA), home devices and/or the like. FIG. 2 illustrates the concept of virtual workspace, wherein the user accesses the same workspace in a device-independent manner. The user may inspect and manage his personal information in the same way regardless of the terminal device he is using. Each device 100 is provided with a CIE software package 200 that may comprise CIE applications 202, CIE API 204, the CIE software 206, and JVM 208. The CIE software 200 is device independent.

Each device 100 is further supported by an appropriate operating system 210 that interfaces with the CIE software package 200 via a compatible Application Programming Interface (API) 220.

Figure 3A:
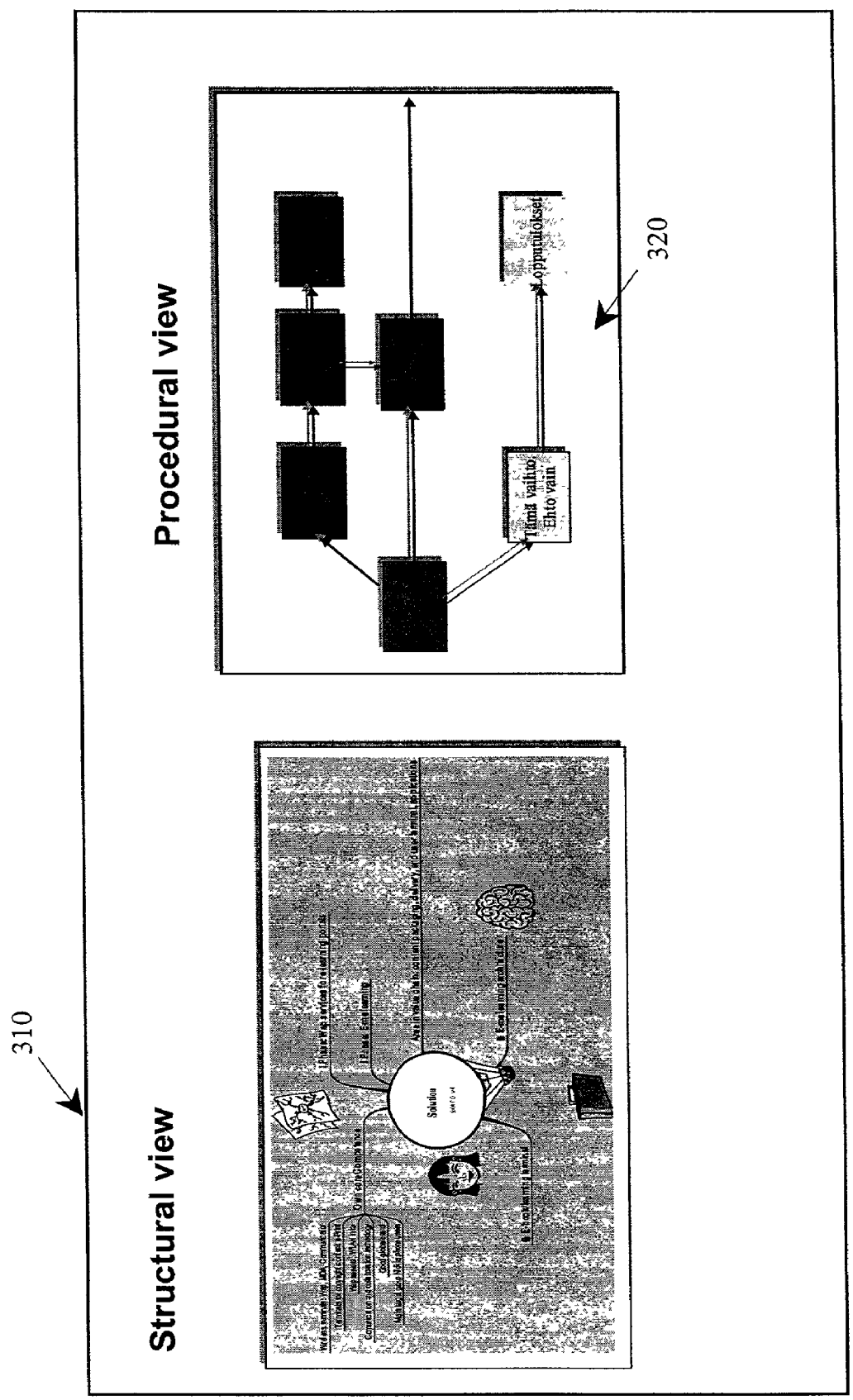
FIGS. 3A–3B depict various views for viewing the information using the system of FIG. 1.
Figure 3B:
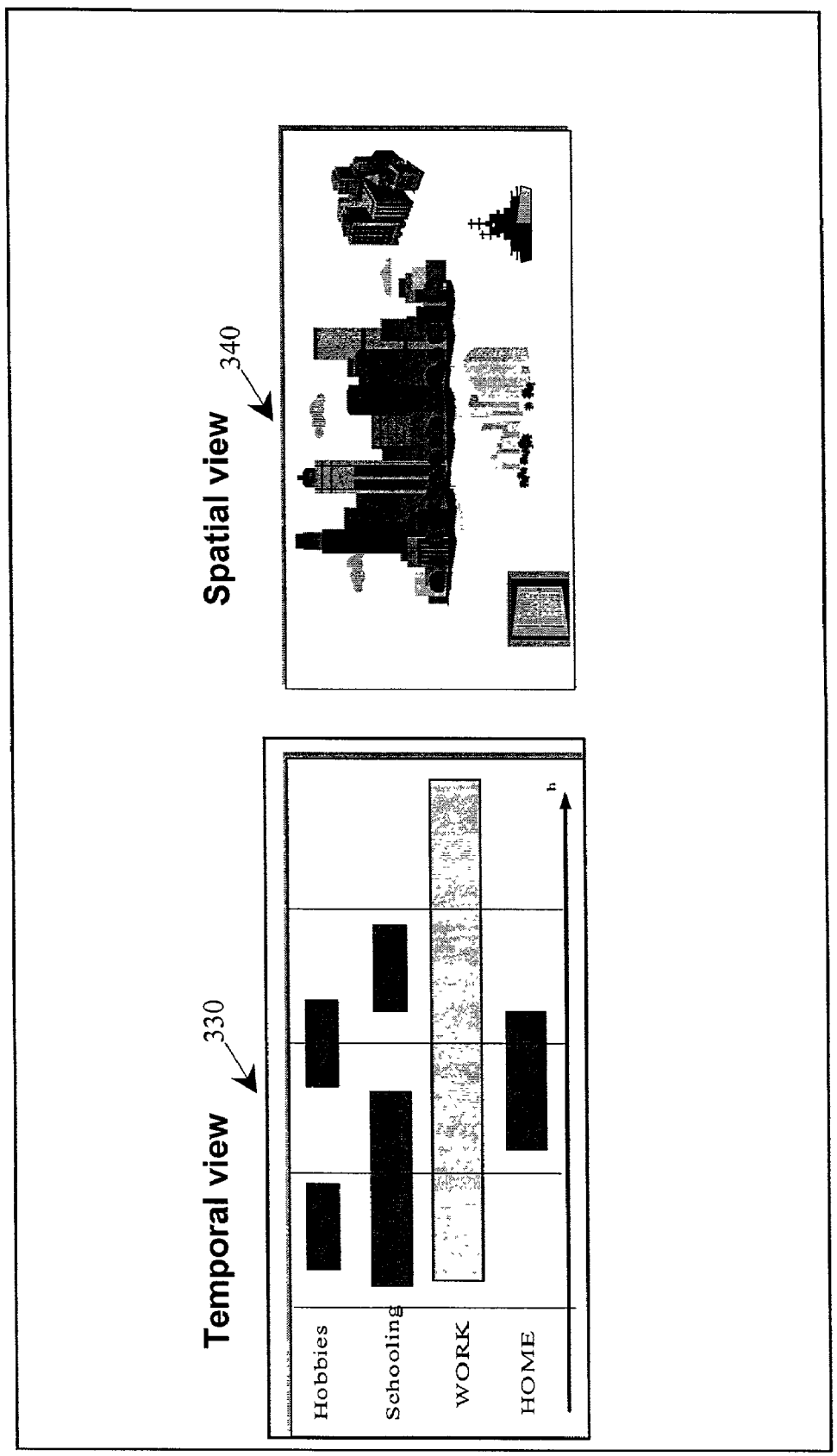

FIGS. 3A–3B illustrate the various views that may be exposed to a user, depending on the user's own preference for the UI. The process of switching between various different views allows a user to inspect his information map in terms of different aspects. As shown, the structural view 310 allows viewing of information that is organized in terms of the main object, such as what the object is, why it is in its given form, and who (human players, other objects or processes) impacts the given object. The piece of knowledge is displayed by means of an ordinary map, which will be described in more detail below. If the user desires, he may switch the view to a procedural view 320, which is similar to a flowchart for the procedure or process involved. The user may also switch to a temporal view 330, which organizes and displays information in a temporal chart in terms of duration, time schedule of one or more activities and/or the like. The user may also select to display their information is a spatial view 340, which depicts the information in an ordinary geographical map.

In the event that there is not enough information for the view conversion, the present system may optionally provide a notification to the user informing about the lack of enough pertinent information. According to the invention, the user can generate views in various ways, including directly from a given map, by combining information from several databases by means of a knowledge management engine and/or the like.

Figure 4:
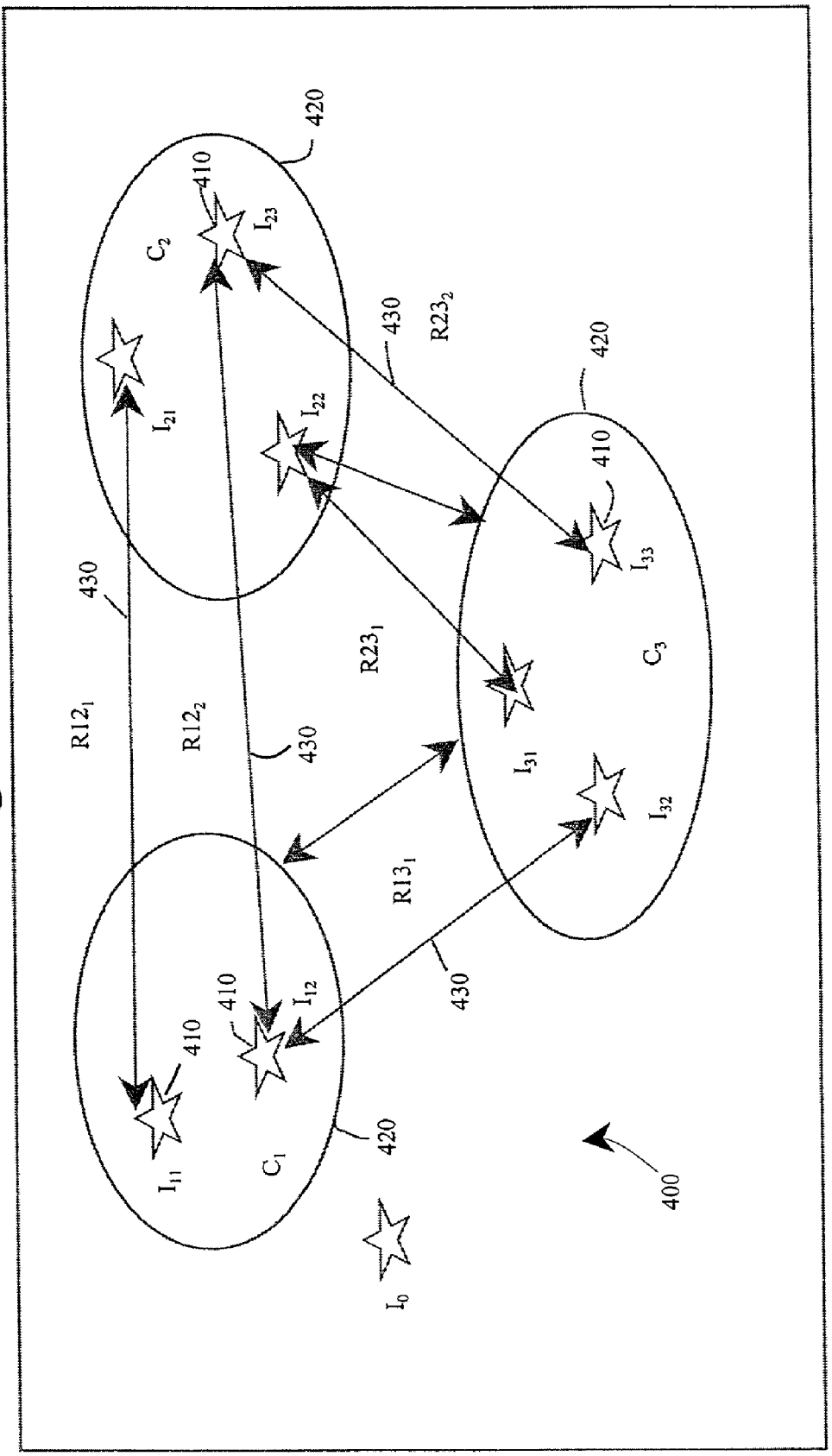
FIG. 4 illustrates one exemplary embodiment of a map in accordance with the present invention.

FIG. 4 depicts one embodiment of a map, in accordance with the present invention. As shown, a map 400 comprises a plurality of individual objects 410, wherein the individual objects 410 may be organized by categories 420. More than one individual object 410 may be related to each other as well as more than one category 420 may be related to each other through the use relationships 430. It should be noted that relationships exist between an individual 410 and a category 420. The placement of an object 410 in a category 420 implies a relationship between the object 410 and the category 420. Thus, there are relations between objects $I_{11}$, $I_{12}$ and category $C_1$, objects $I_{21}$, $I_{22}$, $I_{23}$ and category $C_2$, and objects $I_{31}$, $I_{32}$, $I_{33}$ and category $C_3$. As noted above, an object may be related to more than one category. For example, $I_{22}$ is related to category $C_2$ as well as category $C_3$. In short, an individual object 410 may belong to any number of categories 420 (including, to zero categories (e.g., $I_0$), or to more than one category (e.g., $I_{22}$)). There may also be relationships between a category and another category, such as the relationship between $C_1$ and $C_3$.

Each individual 410, category 420 or relationship 430 may also have any number of associated attributes. The term node is used hereinafter to refer to individuals 410 and categories 420, and the word edge is used to refer to relationships 430 in the map 400, when discussing the visual representation of the map 400, and when discussing the map on the data structure level (as opposed to the conceptual level).

Individuals 410 and categories 420 may be further subdivided into notes, actions, applications, attachments, outlined entries, and/or the like. A note node may contain a link to another map.

Each terminal has its own API that may support an application. For example, a call application may be supported by mobile phone APIs but not by DigiTV APIs. A terminal may also support actions that are defined in terms of applications derivatively. For example, the action of calling home may be supported by mobile phones but not DigiTVs. In other words, according to one embodiment, terminals primarily support applications, as well as derivatively actions.

Figure 5:
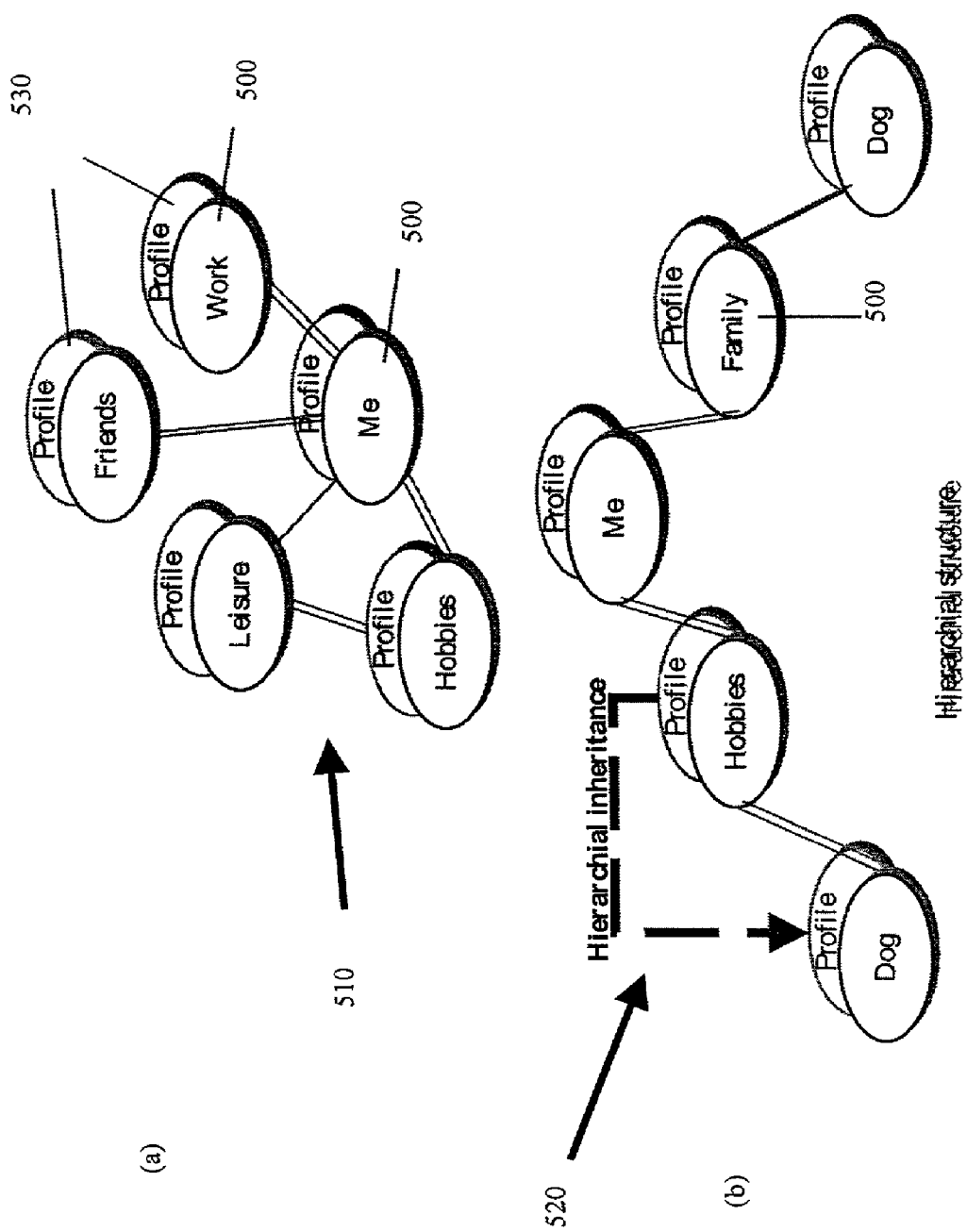
FIG. 5 depicts the different embodiments for organizing the core elements of the present invention.

FIG. 5 depicts a node map with a plurality of nodes 500, in accordance with the present invention. A node map may be organized as a net structure 510 or in a hierarchical structure 520 as a tree. The node 500 is the core element of the CIE. The personalized CIE is based on the interlinked nodes 500. Each node 500 is given a name by the creator.

Each node may have a profile 530. The purpose of the profile 530 varies depending on the node-type. In accordance with one embodiment, in the hierarchical structure 520, a node 500 can inherit the profile of its parent node 500. The profile 530 consists of attributes and values. The collection of attributes is called a context. In the CIE, each node is a context, whose name is the name of the node 500. Moreover, each node 500 may have a profile 530 that specifies the values of the attributes of the context. Content (i.e. data) may be represented and transferred in XML format.

According to one embodiment, the node description form has a button called "Profile". If the user clicks this button with a pointing device while filling in the form, a new window opens for defining the profile 530 of the node. There the user may define which attributes the profile 530 contains, and which values the attributes have. Therefore profile definition also derivatively defines the context that the node represents.

A map is a network of contexts, possibly with profiles. A map can also be called a context space. A map without any profiles is called a map template. Nodes 500 may inherit attributes with or without their values from their parent nodes.

Figure 6:
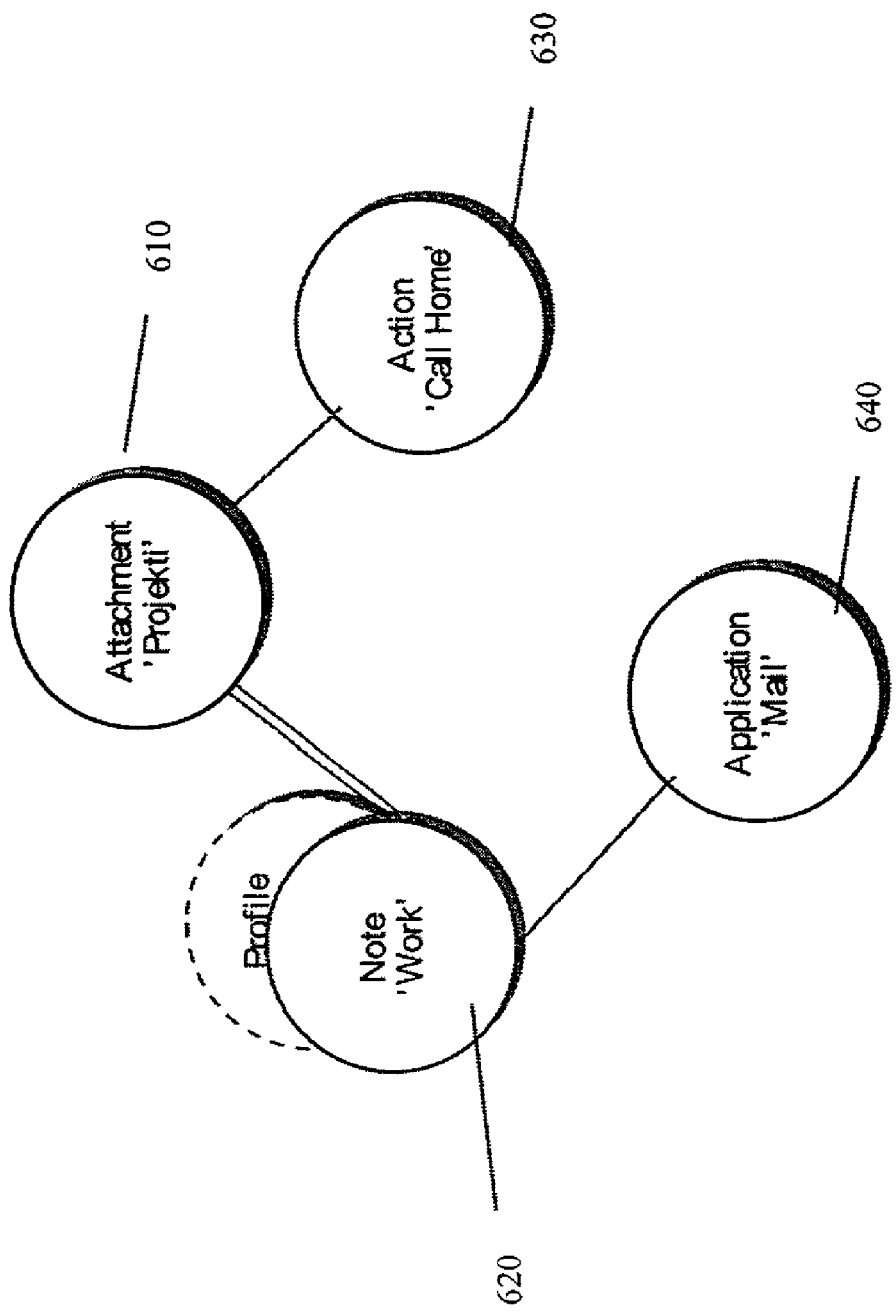
FIG. 6 illustrates various nodes that are used in the present invention.

As illustrated in FIG. 6, a node can be of various types, such as an Attachment node 610, a Note node 620, an Action node 630 or an Application node 640. An Attachment node 610 has an attachment locator linked to it. A Note node 620 is a single node with a name. An Action node 630 is a node with built-in capacity of creating nodes, removing nodes and running node applications (as a macro). An Application node 640 is a node with a built-in application functionality. Alternately, an application node 640 may be a link to any application, such as a mail program or a schedule tool. Double-clicking a previously defined application node 640 by a pointing device starts the application. When an attachment that has been created previously is opened for viewing or editing, the application by means of which it was created is launched to do this.

An attachment node 610 may be for any file, such as for a picture file, video file, sound file and/or the like. A note node 620 may contain a link to another map.

One of the attributes of an application node 640 or action node 630 may be "Activate". Its value in the node's profile is a place associated with the user, such as "At Home" or "At Work". These places are specified by the user. When the user is using CIE at a place that is a value of the "Activate" attribute of a node profile, the node is displayed as Active. Otherwise the node is displayed as Passive, which means that the node cannot be run. For example, a user may have one messaging application instance that is Active at home, and another that is Passive at home. This use of the "Activate" attribute applies also to attachment nodes. It can be used to restrict the possibility of opening an attachment file to specific locations.

Figure 31:
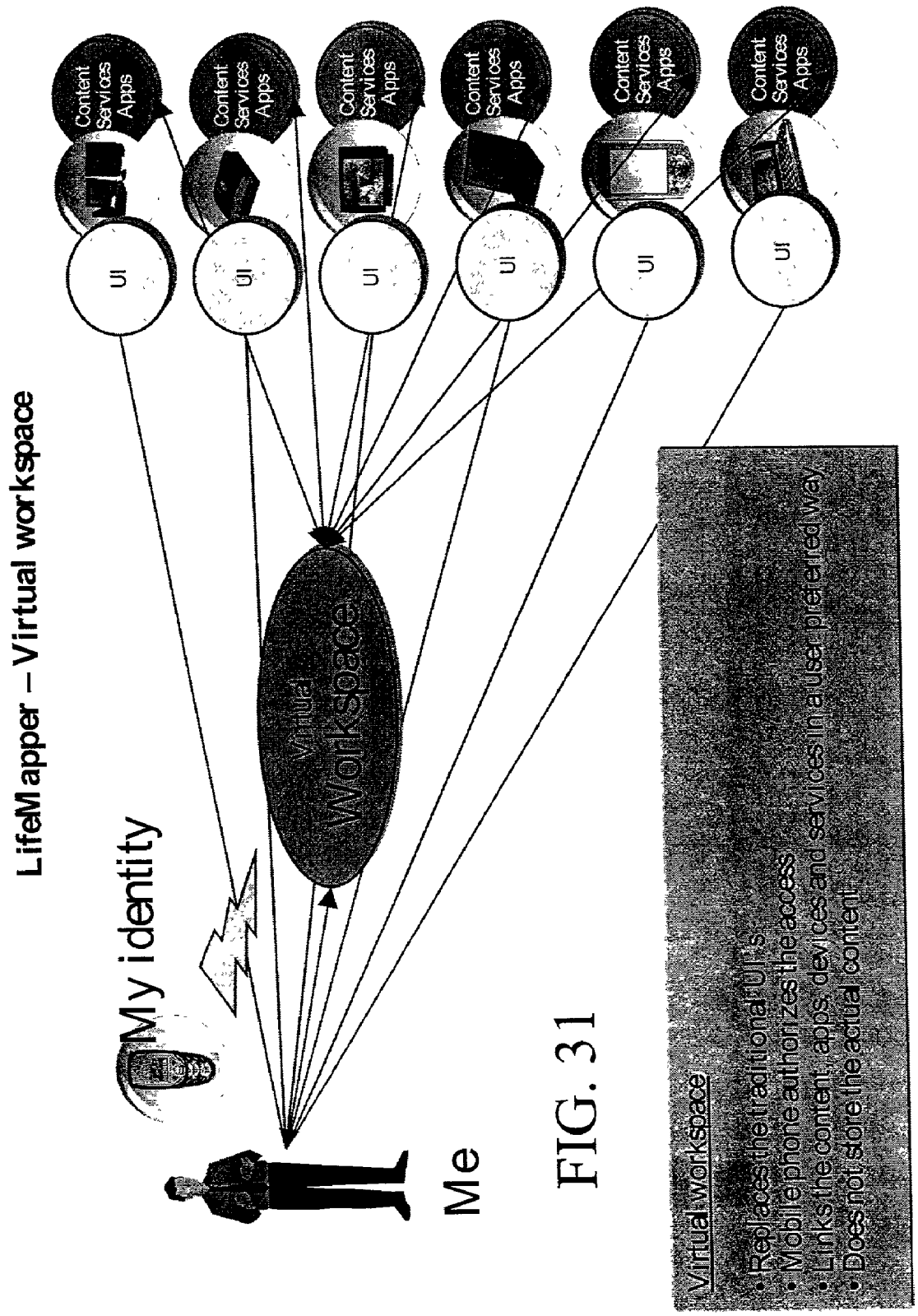
FIGS. 31–32 illustrate the embodiment where information is sensored.
Figure 32:
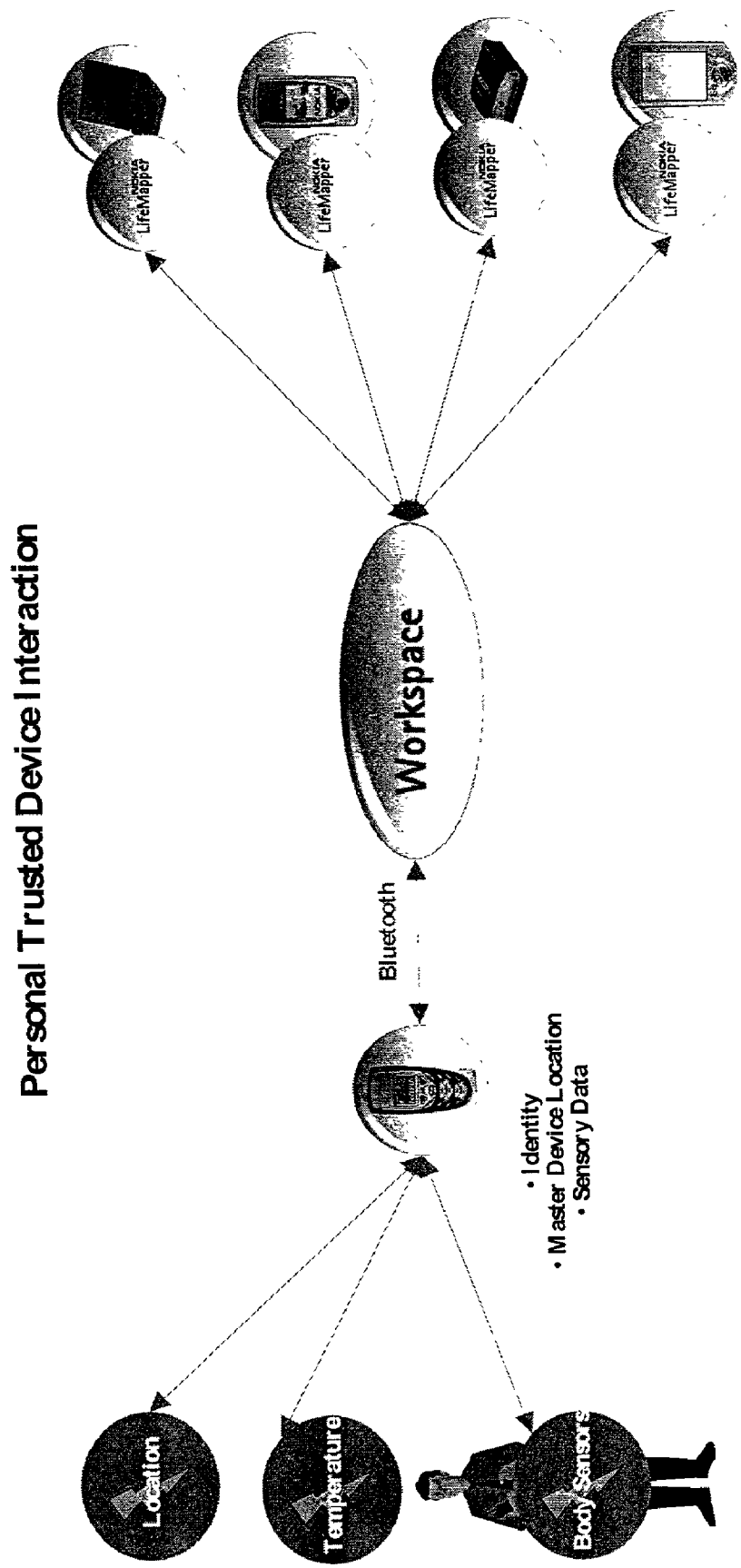

Referring momentarily to FIGS. 31–32, these figures shed light on the issues of sensored information in relation to CIE, authentication, and device-independence. The location of a user may be communicated to the computing device (with CIE-enablement) to manage his personal (virtual) workspace, by means of a mobile phone (or similar device) via Bluetooth and/or the like. A mobile phone may thus communicate location, temperature and other kinds of sensored information, as well as the location (address) of the user's master device, to the user's virtual workspace. The user may also authenticate himself to any CIE-enabled device by means of a mobile phone (or similar device). The Subscriber Identity Module (SIM) of a mobile phone (or other similar means) store his identity information, and the identity information is transmitted to the CIE-enabled device via Bluetooth. This authentication submits the CIE-enabled device to his disposal, so that it shows his personal (virtual) workspace until he ends the session. Thus, the user may access his personal (virtual) workspace from any CIE-enabled device anywhere (e.g. at home, at school, at work, in public places of the society etc.) just by authenticating himself by means of a mobile phone (or similar device). The CIE thus replaces the various disparate UIs of the CIE-enabled devices so that the user has a uniform way to manage his personal information in a device-independent way at any time and place.

Returning back to FIG. 6, according to another embodiment, an application node 640 or action node 630 may be Active or Passive if the application or action requires a specific API. For example, the phone application or "Call home" action is Active if the device in use has the JavaPhone API, otherwise it is Passive.

According to one of the embodiments, one or more nodes may be invisible in the UI. In other words, the user may specify that an application node, and possibly also its child nodes (i.e. subnodes) be invisible, whereas the subnode copies are visible. The motivation is that the subnode copies are associated to their proper contexts and the user wants to see his content only in context, but keep the totality of the subnodes specific to a given application (the subnodes of the application node) hidden.

It is also possible to switch between the two alternatives of showing and hiding such hidden application nodes and their subnodes. To allow this, the user interface contains (in addition to the symbols for constructing a new node and deleting a node etc) a new symbol to allow for switching between these two views, which is useful, for instance, in the case of the messaging application, if the user wants to inspect his messages either in their respective contexts, or in their totality as subnodes of the Messaging application. In addition to the Messaging application, the schedule/calendar, search and contacts applications function in a similar manner.

Figure 7:
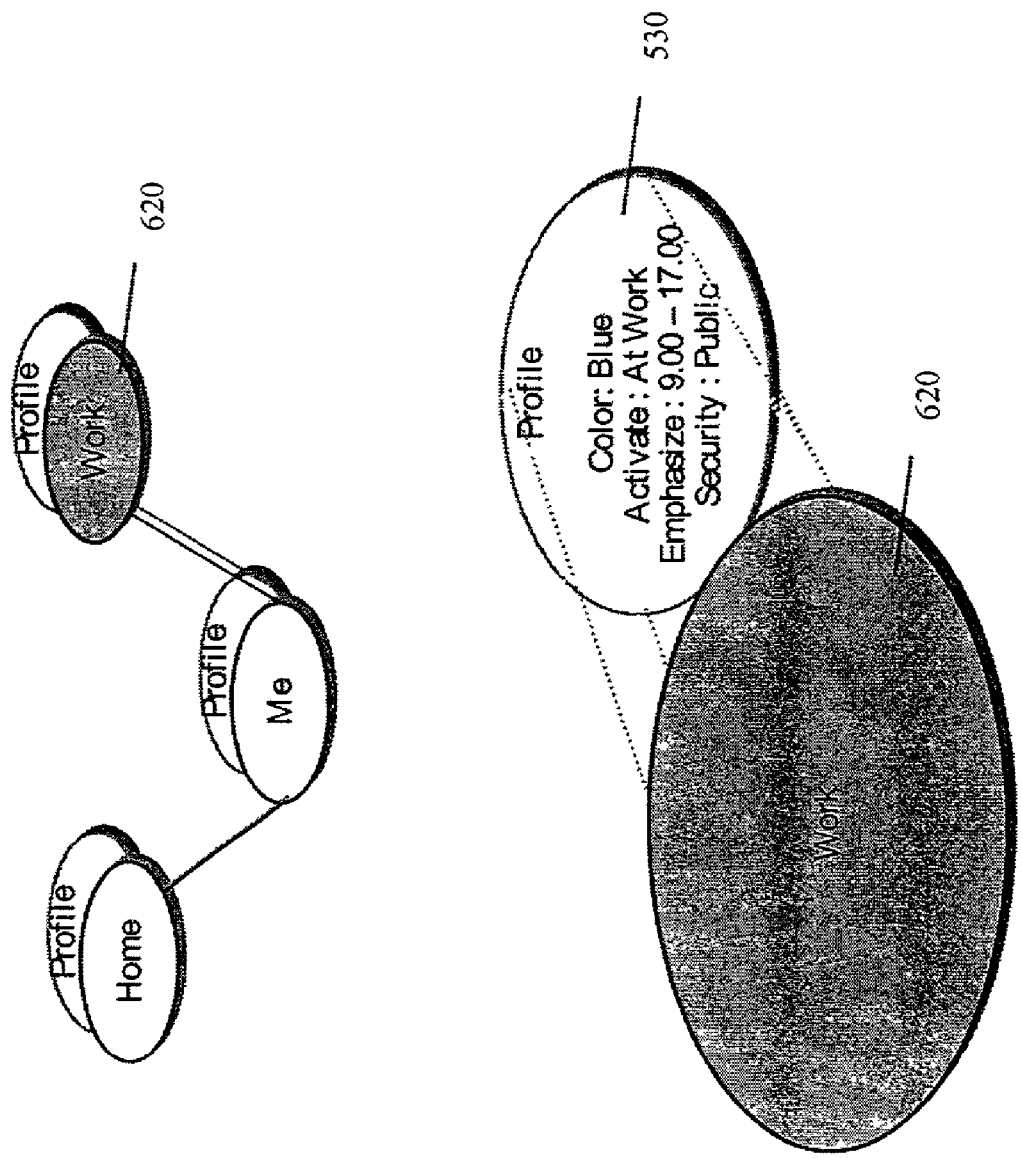
FIG. 7 provides an overview of the Note node.

FIG. 7 illustrates a Note node 620, which may have a name and an optional description. A Note node 620 can be linked with all the other node types 620 and may be used to organise and categorise information within the CIE. A Note node 620 may have a profile 530 associated therewith, as mentioned above. In combination with a Note node 620, the profile 530 can be used to categorize information, or for creating user defined automation for the nodes. The profile 530 may also be used to define the security of the node, such as whether the node is to be Public, Private or Custom.

A Note node 620 may, for instance, have the attribute "Color" with value "Blue". The context (without types, for simplicity) in this example node is (Color, Activate, Emphasize, Security). The Emphasize-attribute is used to specify when the node is displayed with emphasis.

FIG. 8 provides an overview of an Attachment node 610. Similar to a Note node 620, an Attachment node 610 may have a name and an optional description. An Attachment node 610 has a Uniform Resource Identifier (URI) defined and can launch an application in order to download and view an attachment. The Attachment node 610 can also be linked to other nodes and also to link file content within the CIE. An Attachment node 610 may also have an associated profile 530. The Attachment profile can be used to limit access to a specific file or device. Similar to the Note profile, the Attachment profile may also be used to define the security of the node, such as whether the node is to be Public, Private or Custom.

Figure 9A:
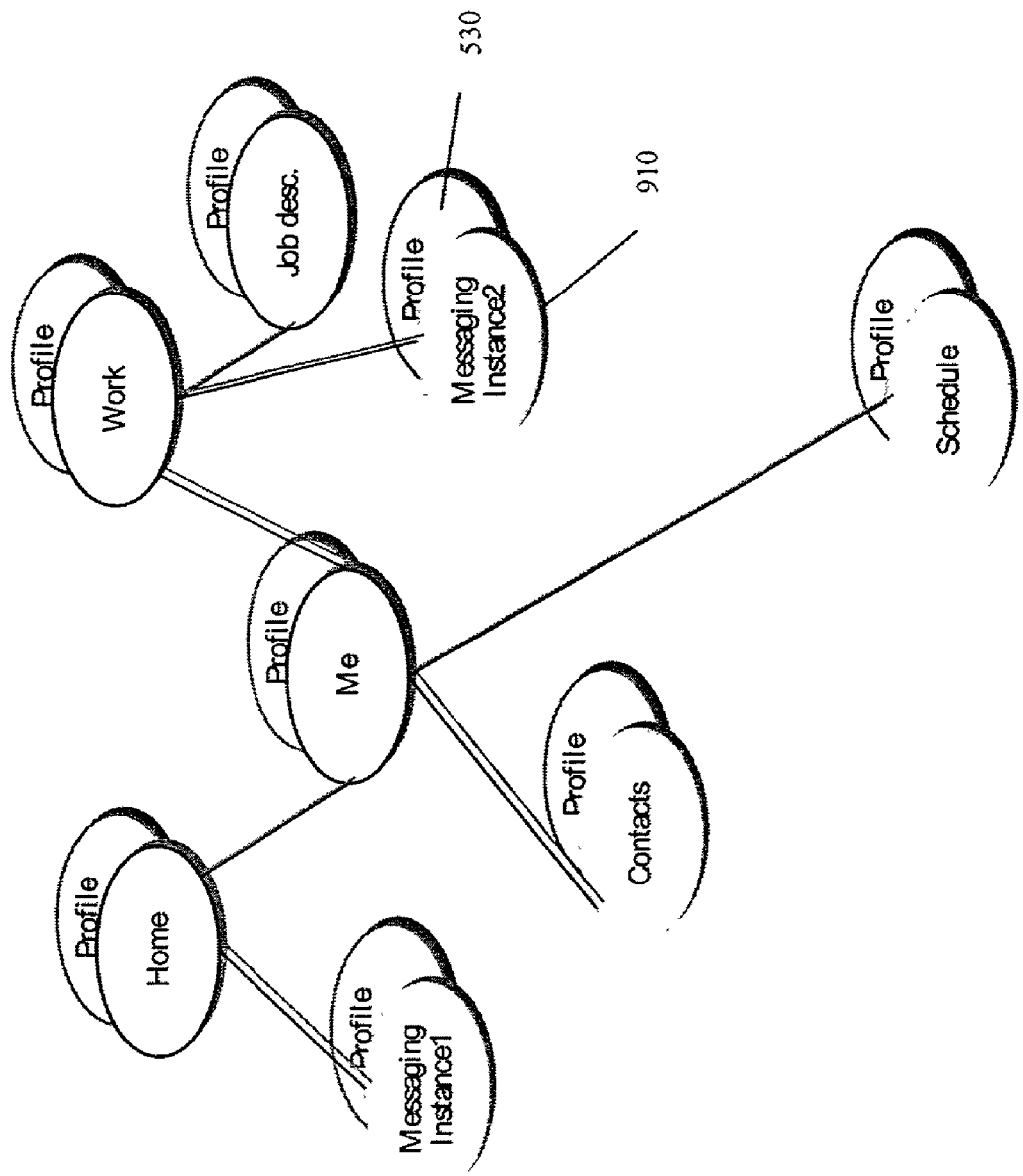
FIGS. 9A–9C provides an overview of an Application node.
Figure 9B:
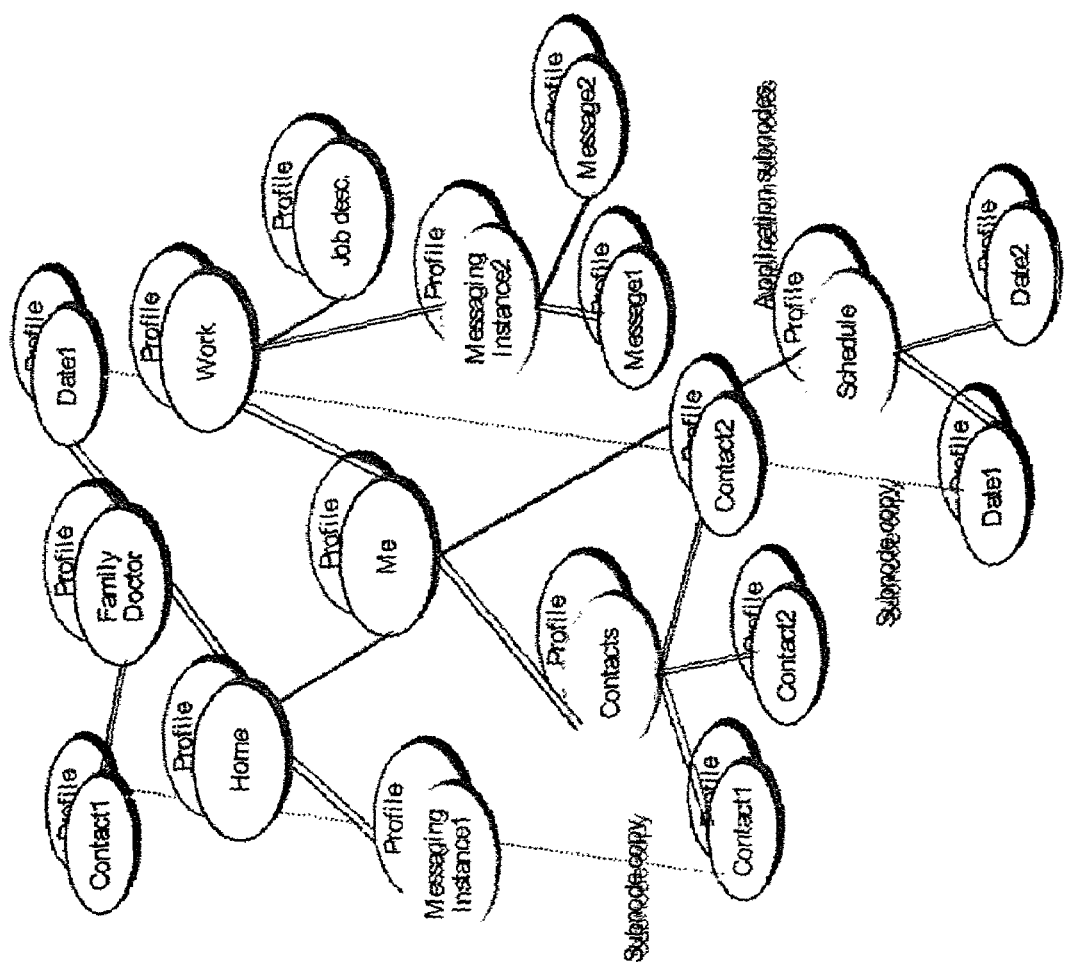
Figure 9C:
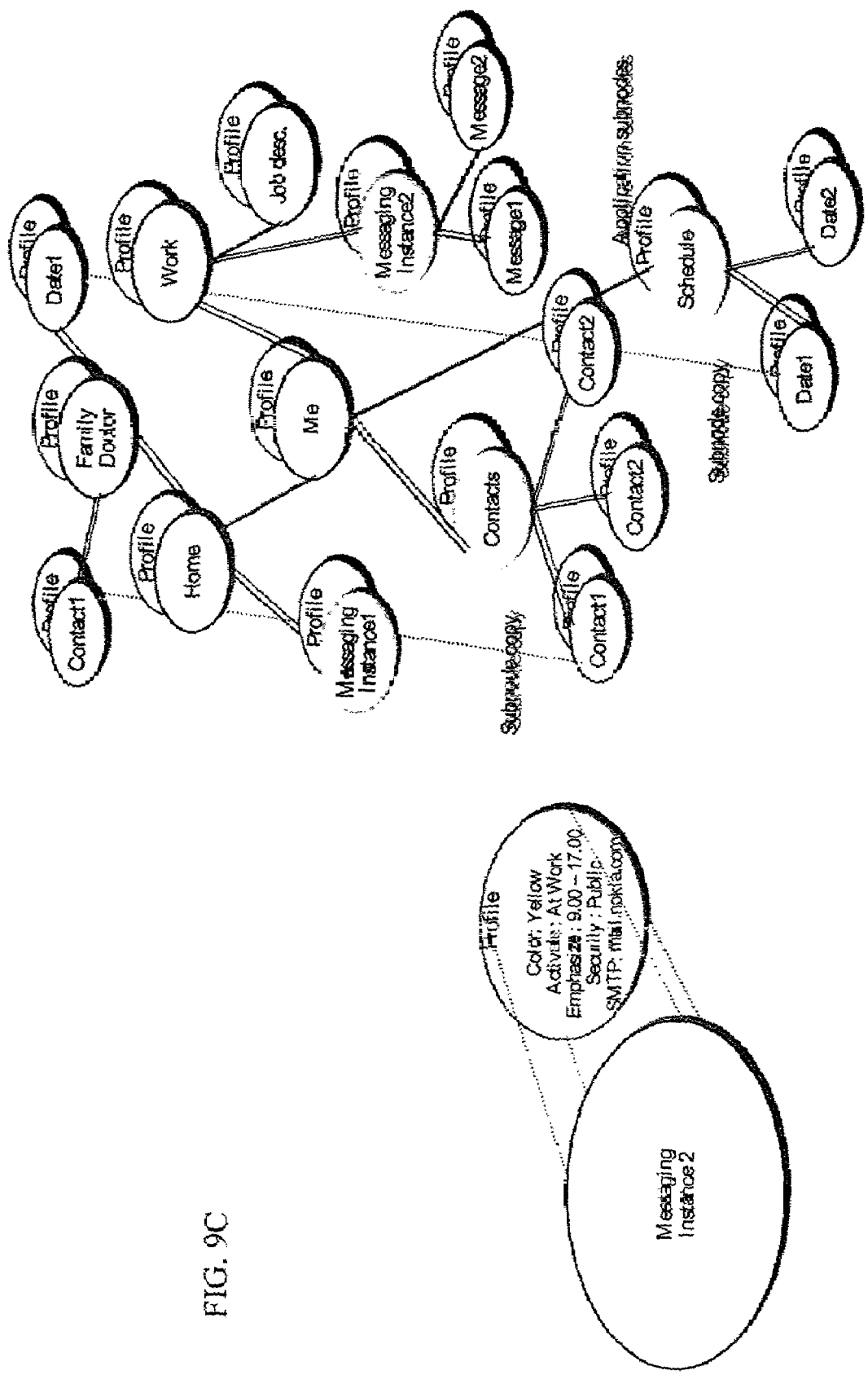

FIGS. 9A–9C provide an overview of the Application node 640. FIG. 9A shows Application nodes 610, which can have several context sensitive node instances. For example, the messaging application 910 may have two different instances distinguished by profile: one for work-related messaging, and the other for home related messaging. Work and home are examples of contexts. Contexts may be classified into subject contexts (e.g. Work, Private), physical contexts (e.g. Home, Office, Car) and social contexts (e.g. Family, Friends). One may use an attribute ContextType in a node profile to specify which class of contexts the node represents, which may have one of the values Subject, Physical, and Social. The CIE is able to provide the user with a view of the user's map that contains just the nodes that represent subject contexts, together with their interrelations (i.e. those relationships that connect two subject context nodes), and similarly for physical and social contexts. This visualization is achieved simply by hiding the nodes that do not have the specified attribute value, and the relationships that do not connect two nodes with the specified attribute value.

An analogous classification of nodes may be made on the basis of roles. Thus, a node profile may contain the attribute Role, which can have, for example, one of the values Work, Private, and Study. Again, the CIE is able to provide the user with a view of the user's map that contains just the nodes belonging to his work role, together with their interrelations, and similarly for private and study roles.

The functionality of the Application node is defined by the underlying CIE application. The CIE application may be CIE-specific or device-specific. The CIE application can have several context sensitive node instances. Some of the CIE-specific applications may include messaging, contacts, schedule, to do lists, while device-specific applications may include a rich call, collaboration, refrigerator control, VCR control, and/or the like. The CIE applications can be created by a third party, using CIE API.

FIG. 9B shows application-specific subnodes, such as application templates, which are the same thing as "outlined entries." These subnodes may have copies in the map. For instance, all contact nodes may be children of the contacts application node, in addition to having copies linked to the contexts where they are used. For instance, my doctor's node may have an associated node with his contact information, and in addition this latter node may be a subnode of my contacts application. An application node 610 can have application specific subnodes, such as application templates. In addition to application nodes, a copy of a subnode can be linked with all the other node types. An application node 610 itself can be hidden and the subnodes create the visual part of the application.

FIG. 9C illustrates application node profiles. One may, for example, configure their Messaging application's Work instance by a profile differently from the same application's Home instance. For instance, the attribute "SMTP" for the mail server may have different values for the two instances. One may also use these profiles 530 to specify what kind of services they want in a particular context. The profiles 530 control the application node 640 instances, such as services and configurations for external services, application specific configurations and/or the like. One application can have several profiles 530, depending on the context used. The profiles 530 are used to define the security of the node.

Figure 10:
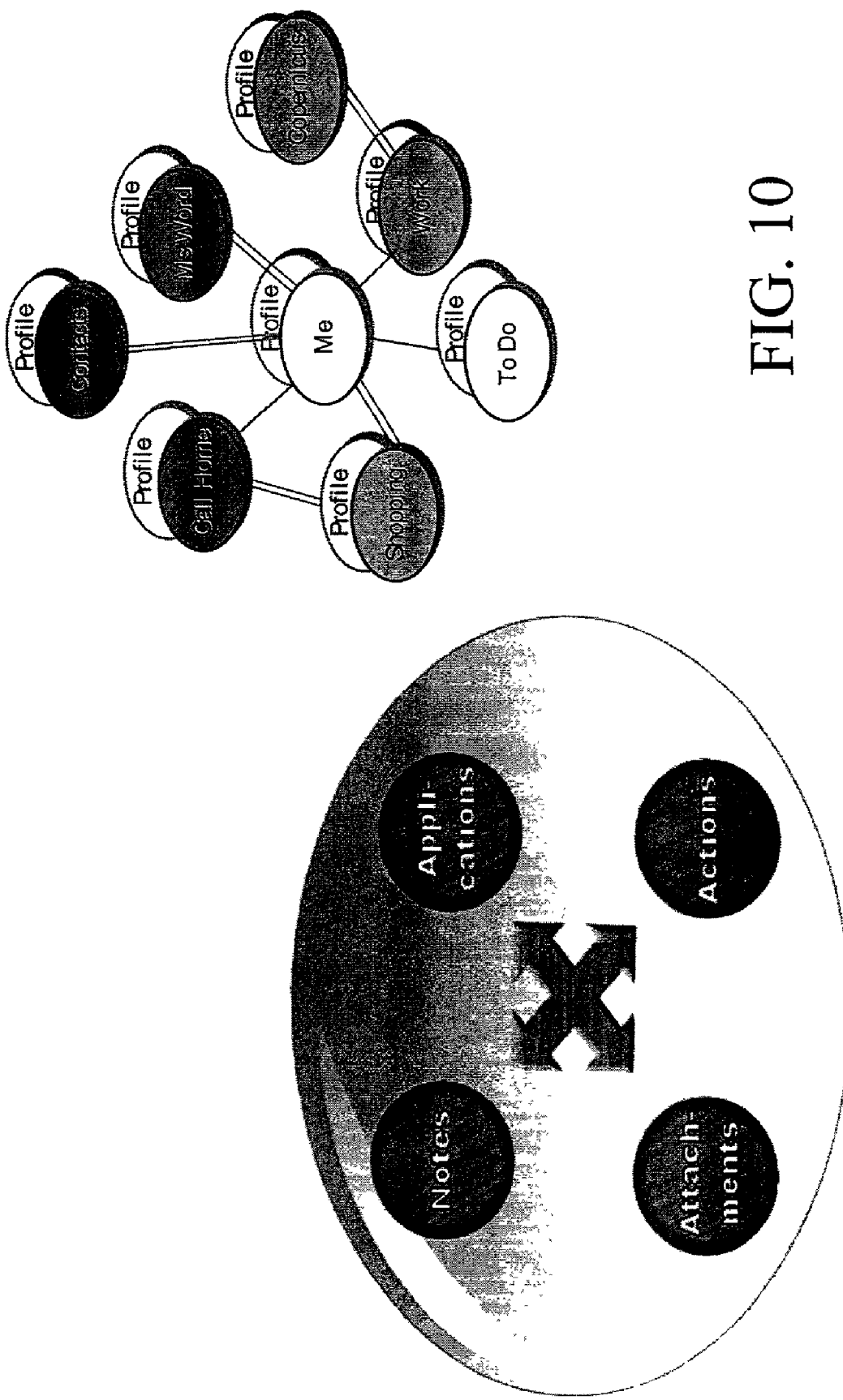
FIG. 10 provides an illustration of a personal workspace in accordance with the present invention.

FIG. 10 provides a general illustration of maps. To characterize the user's personal (virtual) workspace, the user must define a map to describe and manage information about his lifestyle. The workspace consists of user defined notes, applications, actions and attachments, in the form of nodes. The nodes can be freely interlinked, and all sorts of linkages are possible, as mentioned above. A user may map her own information based on the nodes and their associative combinations.

Figure 11:
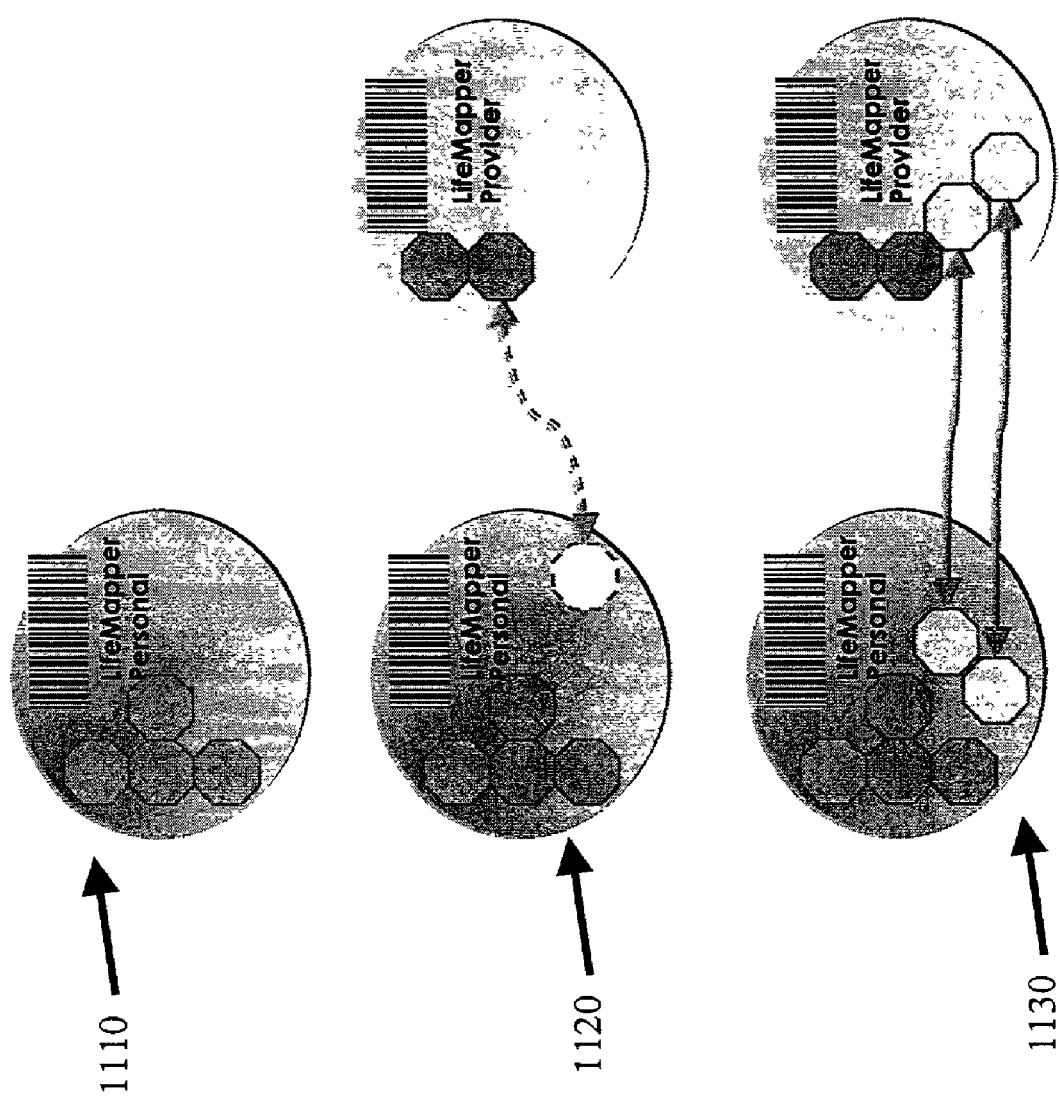
FIG. 11 provides an illustration of the different categories of the Applications that may be supported by the system of FIG. 1.

FIG. 11 shows the various categories in which applications can be grouped. Applications may be classified into three groups as follows. One group of applications is core applications 1110, such as calendars, contacts, FileMapper software (for locating files in a device-independent environment), communication packages, such as messaging, chat, voice and the like. Another group of applications is session applications 1120 that are downloaded for specific session, such as collabra for peer-to-peer communication, profiling, groups, commerce, search and/or the like. A third group of applications is Downloadable applications 1130, such as third-party applications, icons, backgrounds, different Mapping Templates, and/or the like.

Figure 12:
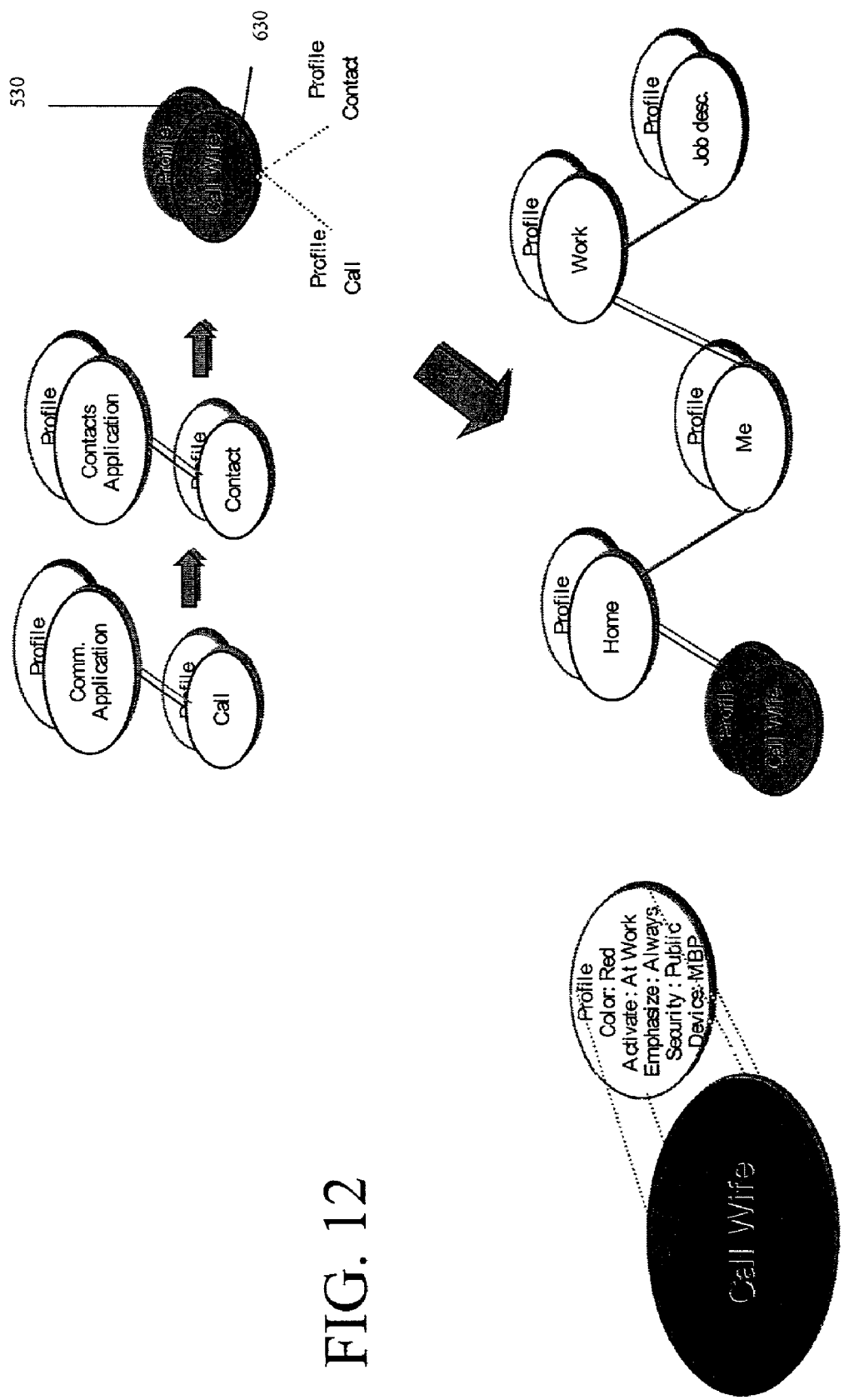
FIG. 12 provides an overview of an Action node.

FIG. 12 provides further information of the action node 630, mentioned above. The action node 630 creates an action based on the combination of other nodes. The action node 630 can be linked with all the other node types, and is used to create 'shortcuts' within the CIE. The action node may have a profile 530, which may be used to limit the access to a specific device, and to define the security of the node.

Figure 13:
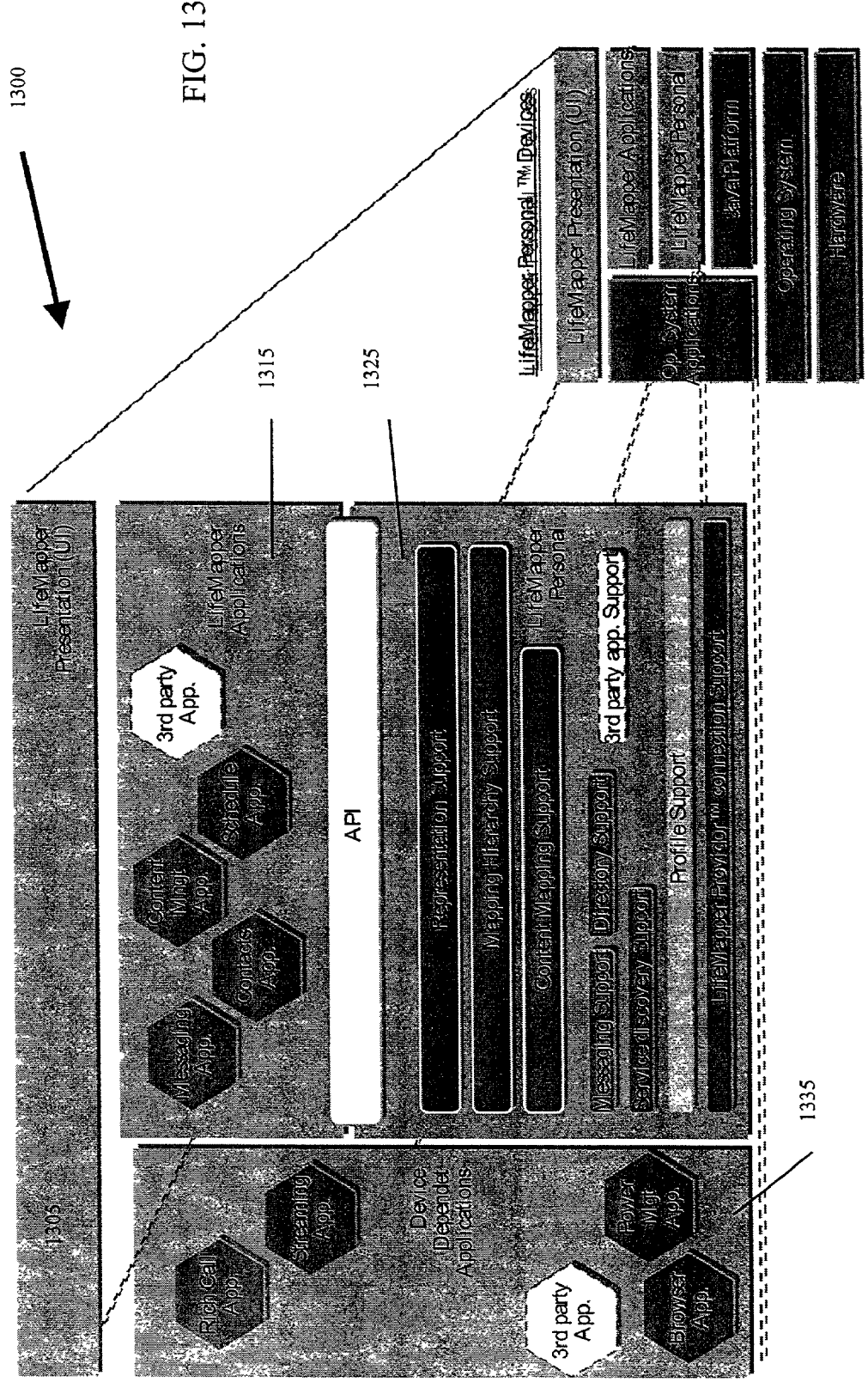
FIG. 13 illustrates the system architecture for an end user.

FIG. 13 depicts the architecture of personalized CIE devices, which includes software enablement layers. The architecture 1300 comprises a CIE user interface 1305. The architecture also comprises applications that can run in the CIE environment. For example, the CIE applications 1315 may include messaging applications, contacts/address book applications, content management applications, schedule applications, and the like. In addition, the CIE applications 1315 may include any compatible third-party applications.

The architecture 1300 also includes personal CIE software 1325 for running the personal CIE devices, which includes representation support, mapping hierarchy support, content mapping support, messaging support, directory support, service discovery support, profile support and CIE service provider connection support. In addition, the personal CIE software 1325 may include third-party application support software.

The architecture may further include device dependent applications 1335, such as streaming applications, power management applications and the like.

Figure 14:
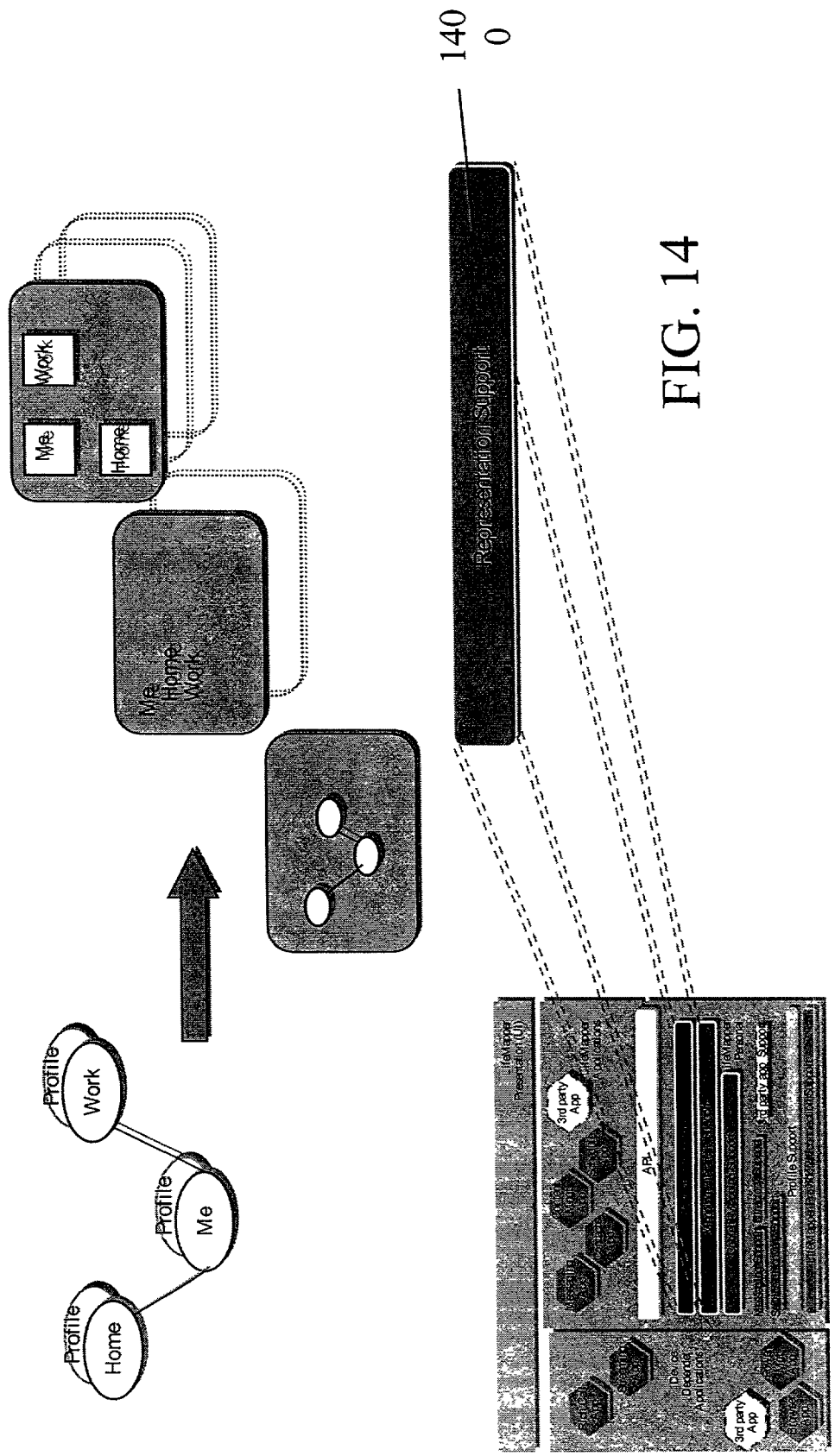
FIG. 14 illustrates one embodiment of the representation support for the architecture of FIG. 13.

FIG. 14 illustrates the representation support component 1400 of the architecture in FIG. 13, which supports different ways of displaying maps visually.

FIG. 15 illustrates the mapping hierarchy support 1500 component of FIG. 13, which allows conversions between graph and tree forms in displaying maps. The mapping hierarchy support 1500 allows support of several instances of the same nodes.

FIG. 16 illustrates the content hierarchy support 1600 component of FIG. 13. The content hierarchy support 1600 component supports the underlying network data structure for maps. The content hierarchy support 1600 component ensures that there is unique instance of a node. The content hierarchy is created automatically by the system.

Figure 17:
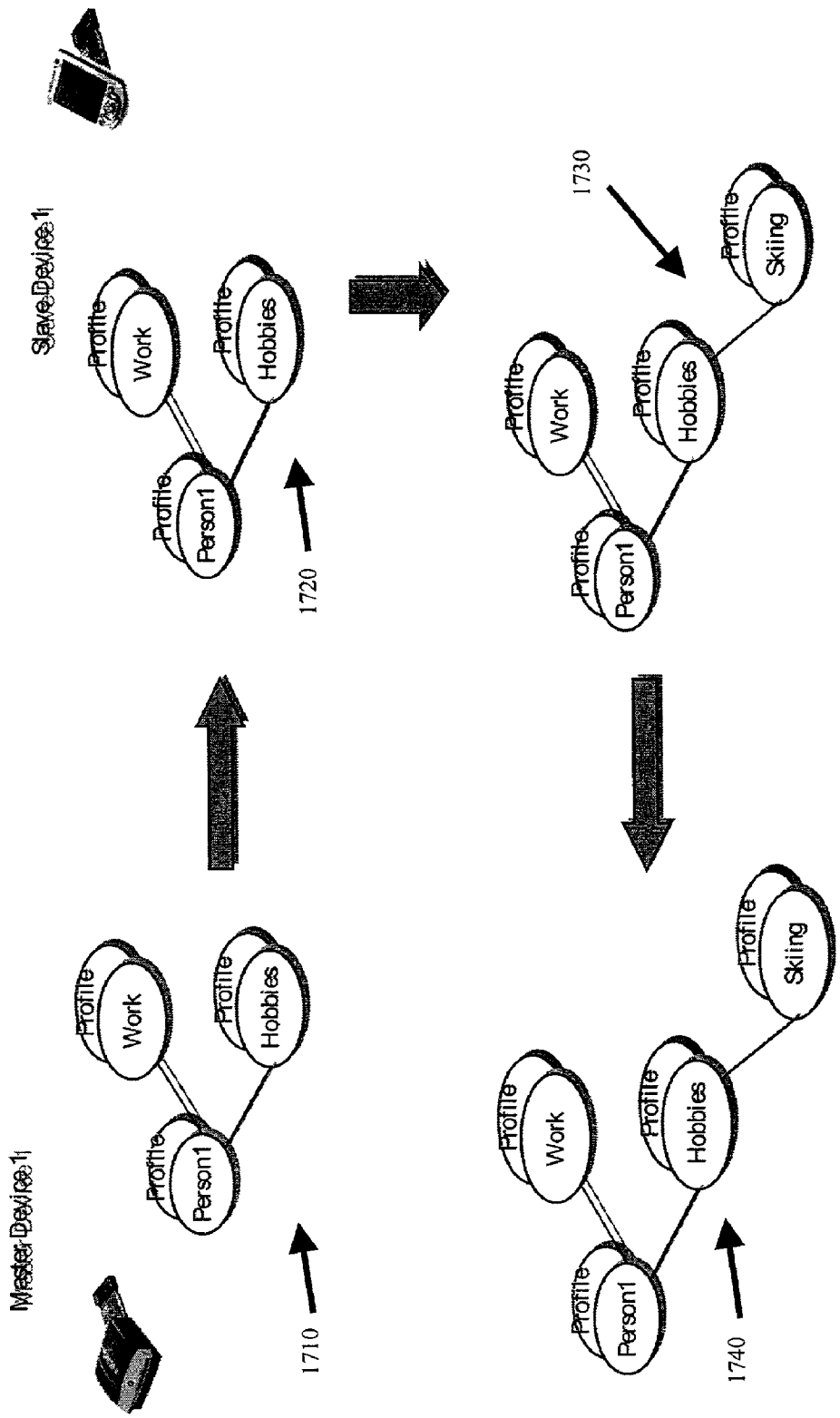
FIG. 17 depicts the master-slave communication for one embodiment of the system of FIG. 1.

FIG. 17 illustrates the example of a master-slave communication. The figure illustrates the example of updating a map whose original is in the master device, using a slave device, with a new node "skiing". As shown, at stage 1710, the master device transmits the appropriate relevant information regarding an end user's CIE to the user's CIE-supported device. The user may, at stage 1720, decide to update his CIE to reflect that skiing is one of his hobbies. At stage 1730, the node map is depicted with skiing as one of the user's hobbies. Finally, at stage 1740, the user's CIE-supported device transmits the updated information to the master device.

Figure 18:
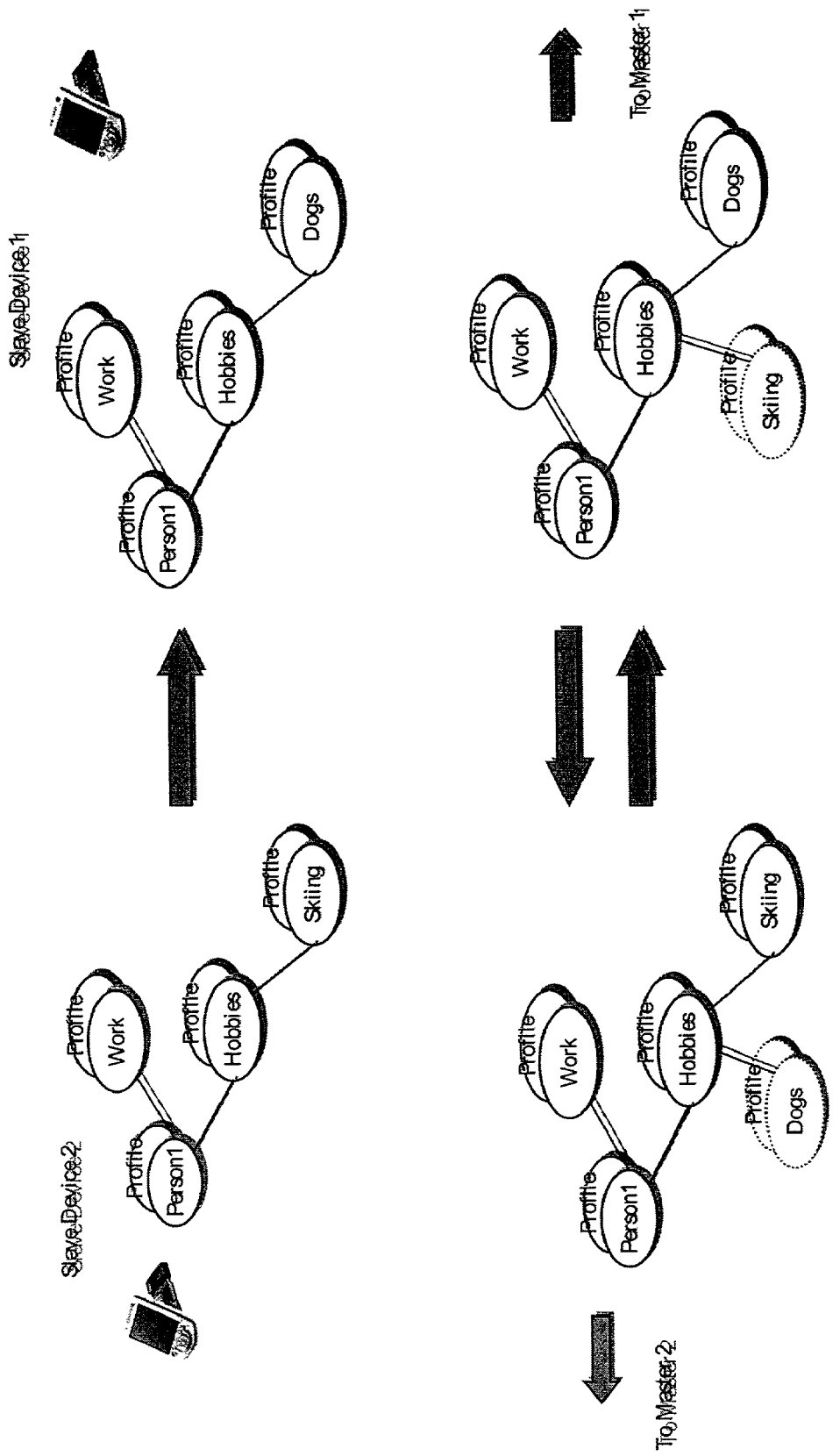
FIG. 18 depicts the peer-to-peer communication for one embodiment of the system of FIG. 1.

FIG. 18 illustrates the example of peer-to-peer communication. Two slave devices exchange nodes, one giving a "Dogs" node to the other, and the other giving "Skiing" back. The changes are subsequently updated to the master device of each respective slave. Peer-to-peer communication may have two different forms, according to whether the devices are slaves of the same Master or not. If they are not, then submaps are copied from one map to another. However, if they are Slaves of the same Master, then there is only one map in the Master's map database, so copying submaps does not take place. Thus, if there is a modification so that there is just one Master device instead of two, then the map in the Master would just be updated so that the Hobbies node has two children (i.e. Skiing and Dogs).

Figure 19:
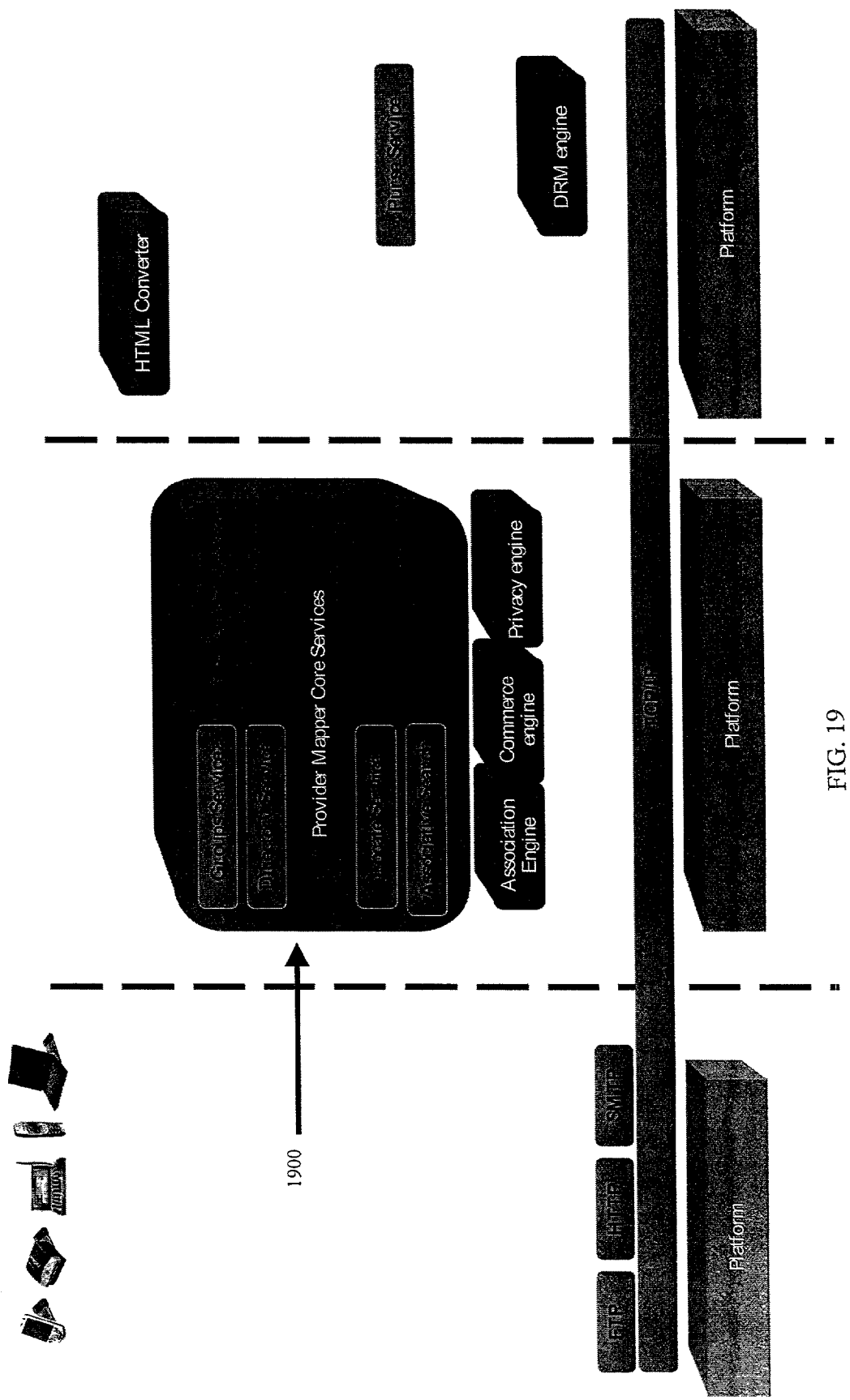
FIG. 19 illustrates an architecture for a service provider.

FIG. 19 illustrates one embodiment of the CIE provider architecture 1900 for a CIE provider. The CIE provider architecture 1900 provides for group service, directory service, and other similar services.

Figure 20:
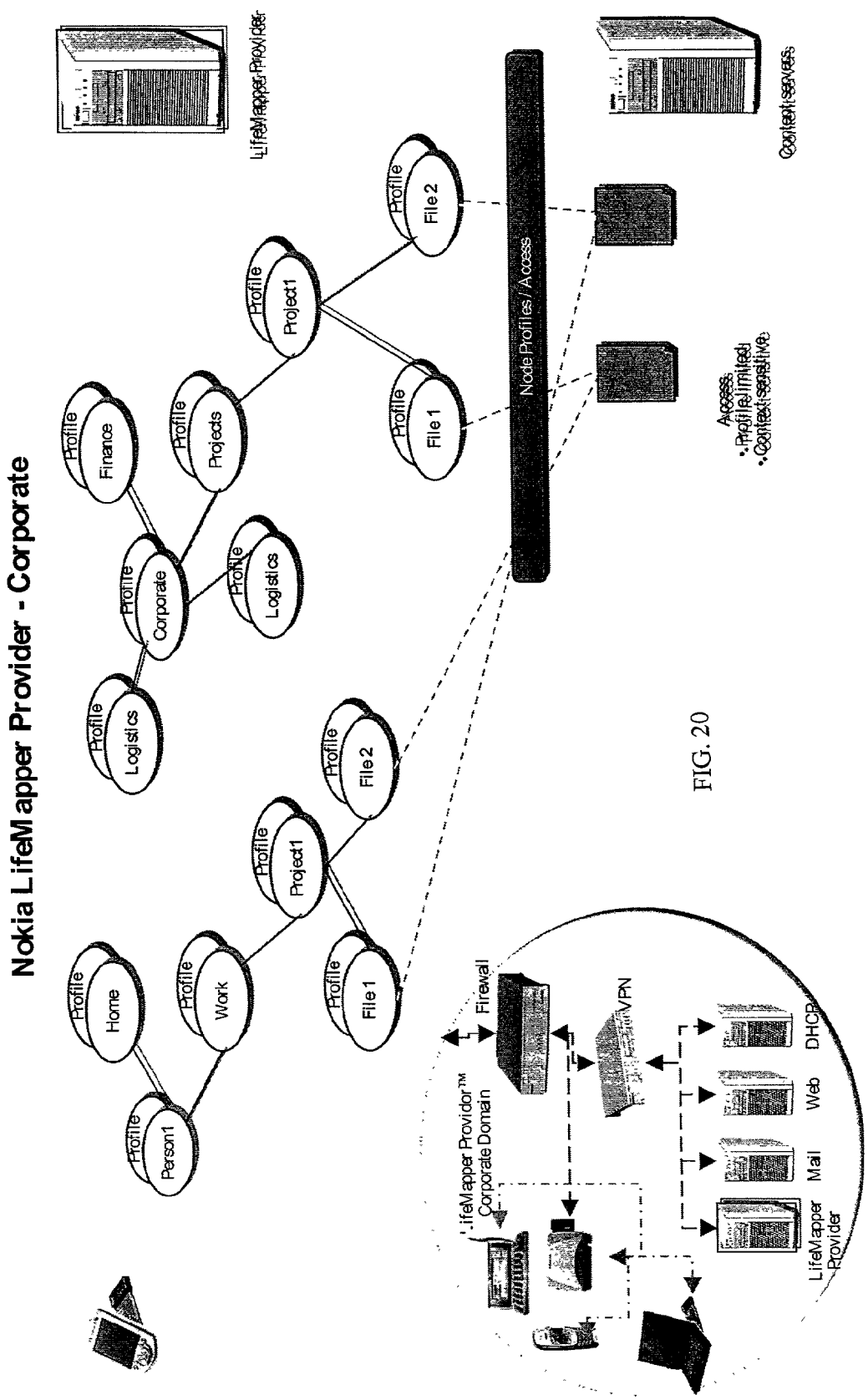
FIG. 20 is an illustrative example of the architecture for a service provider in a corporate setting.

FIG. 20 illustrates the use of the CIE in a corporate setting. For example, a corporation may wish to restrict access to certain files by using node profiles that include security information.

Figure 21:
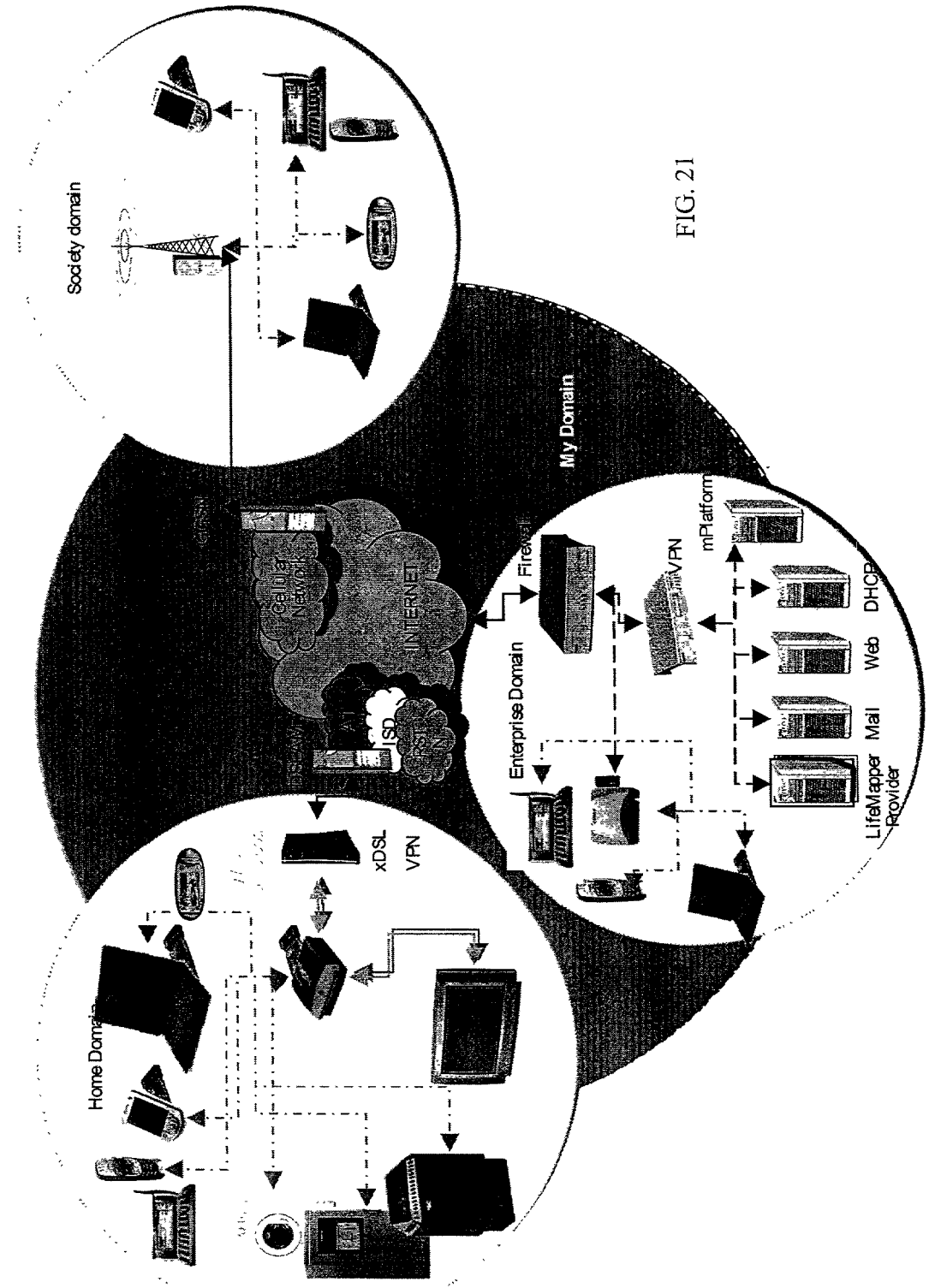
FIG. 21 provides an overview of the infrastructure for system of FIG. 1.

FIG. 21 shows the CIE infrastructure, including home domain, enterprise domain, and society domain. There is a new concept called "My Domain" which covers all the mentioned domains, because a user is provided with a virtual workspace spanning all of the aforementioned domains and the present Internet domain, which provides transportation and contains service providers, as well as the present cellular network domain.

Figure 22:
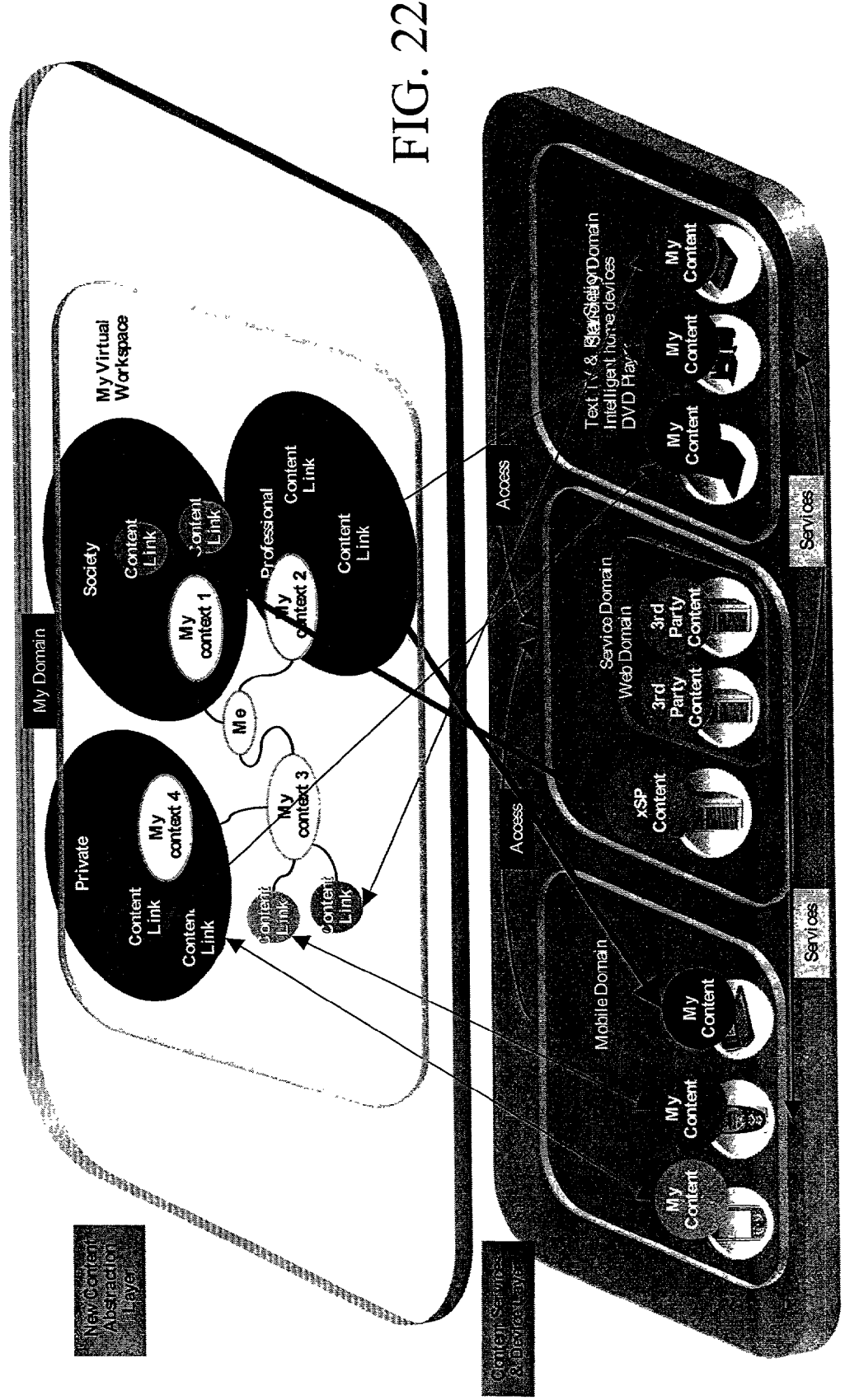
FIG. 22 depicts the components in the end user's content domain.

FIG. 22 illustrates the architecture of "My Domain" in more detail. The architecture includes a new abstraction layer, containing the user's map (My Virtual Workspace). The map contains links (blue lines) to content, which is distributed across various devices, in the mobile, service, and stationary technological domains, which currently exist. The mobile and stationary domains access the service domain to access services.

Figure 23A:
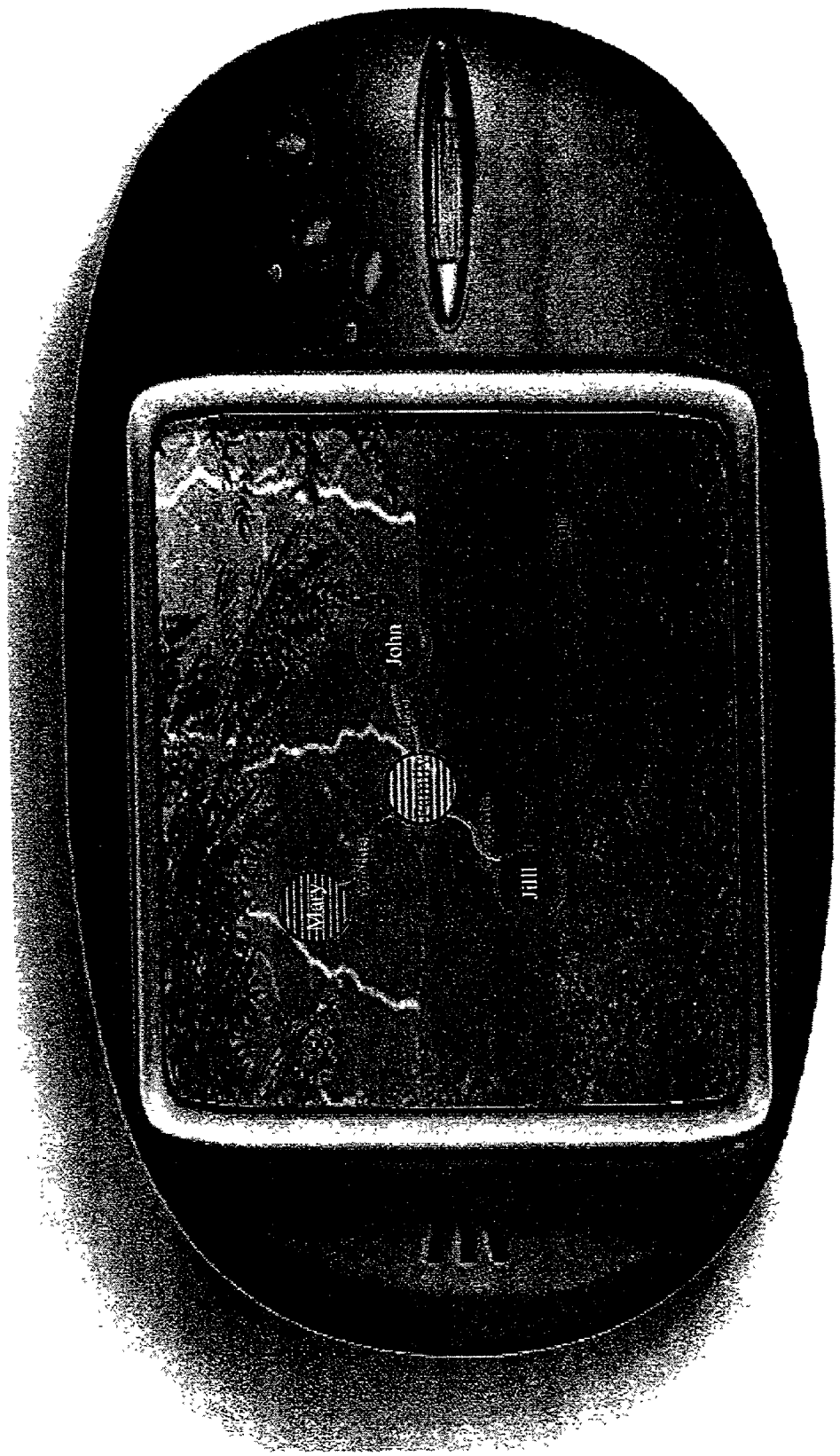
FIGS. 23A–23O are screenshots illustrating one embodiment of navigating the maps provided by the present invention.
Figure 23B:
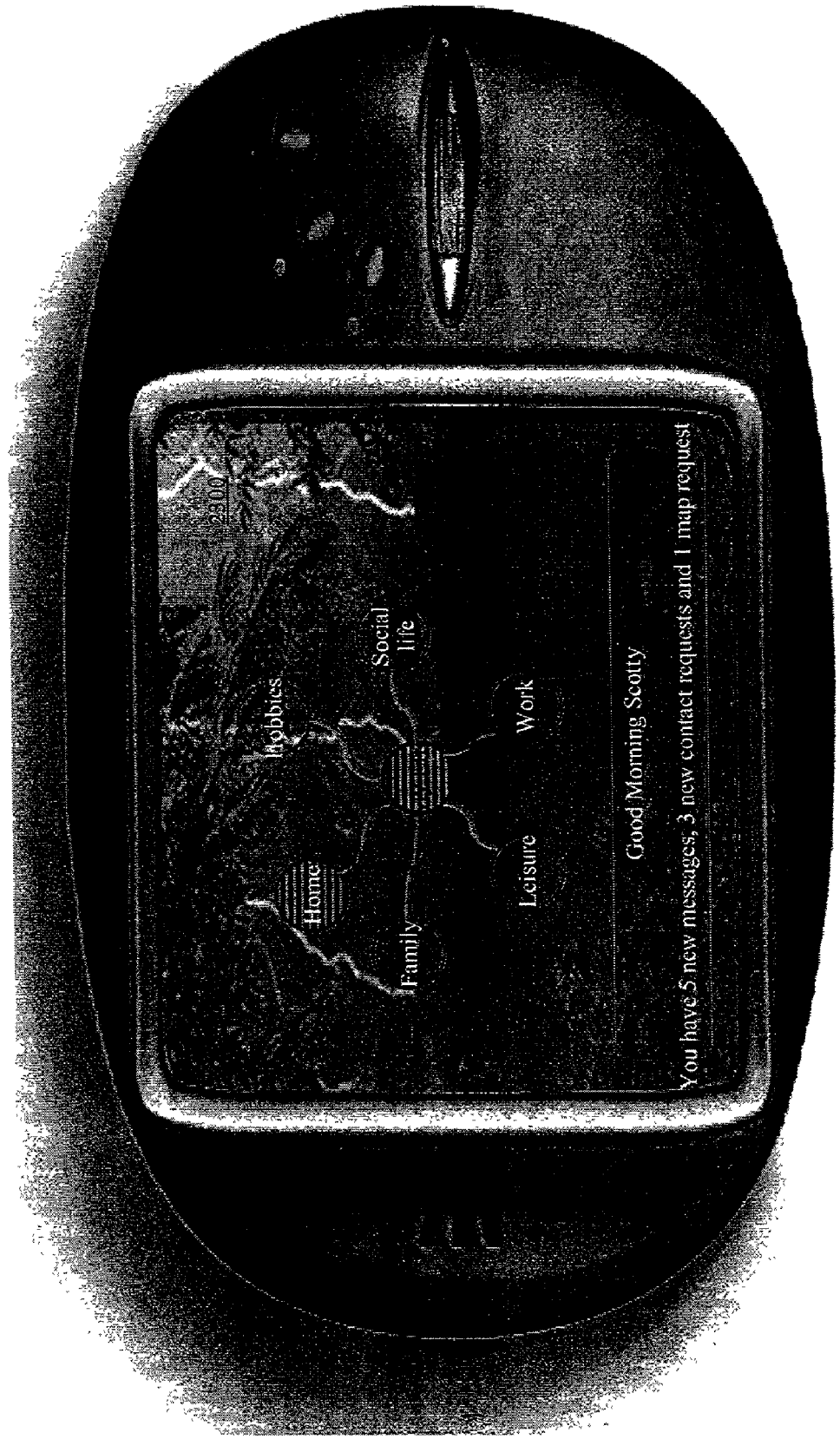
Figure 23C:
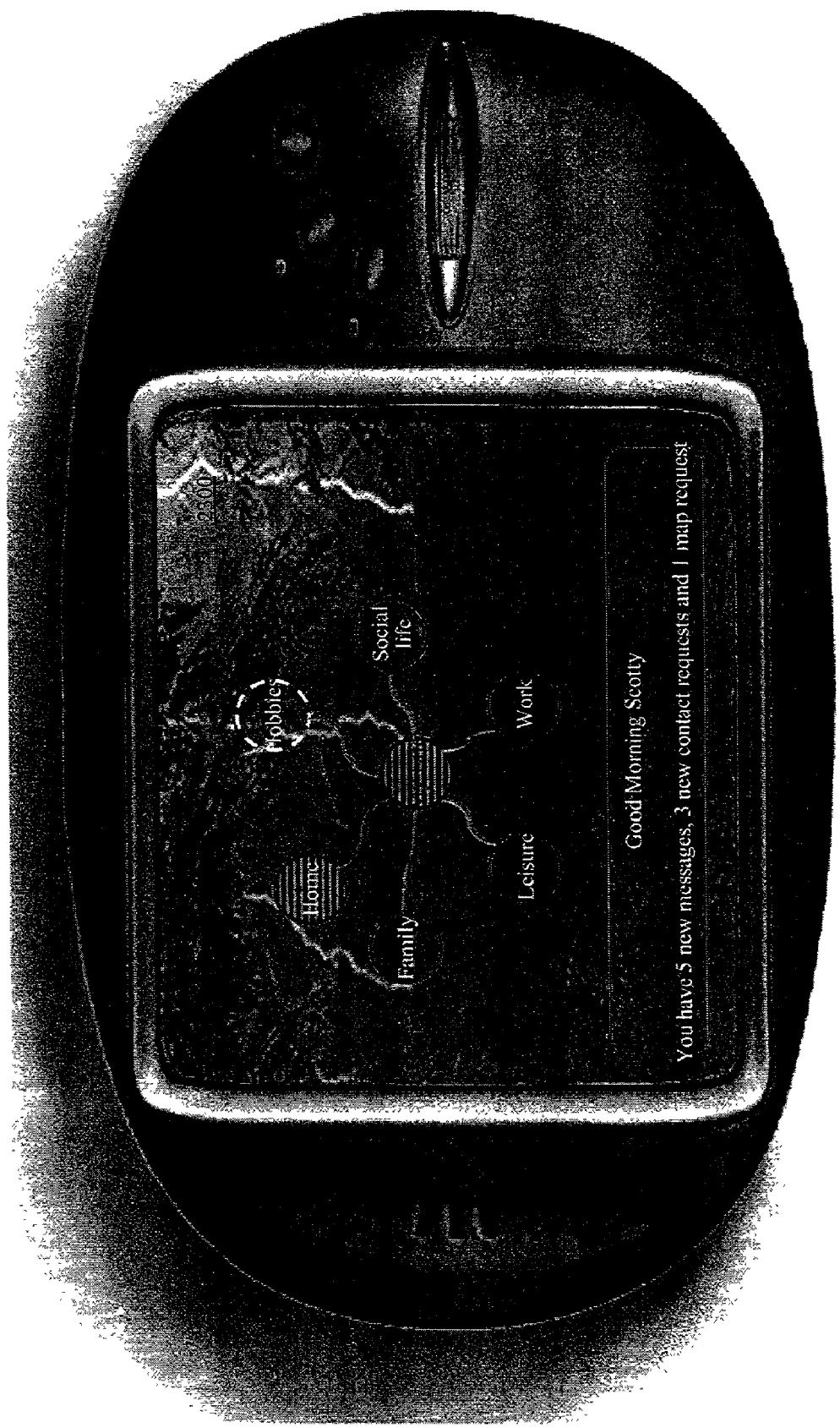
Figure 23D:
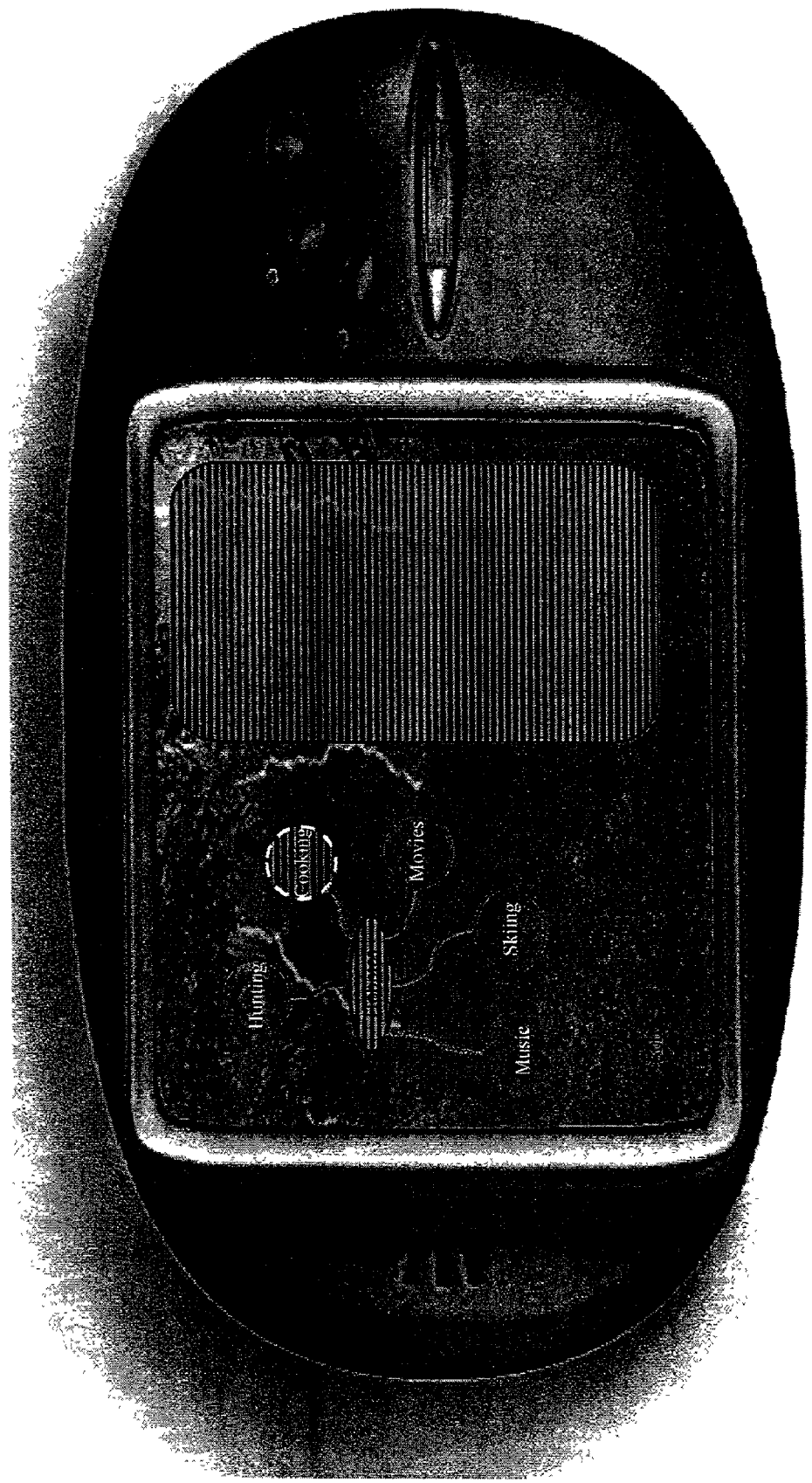
Figure 23E:
Figure 23F:
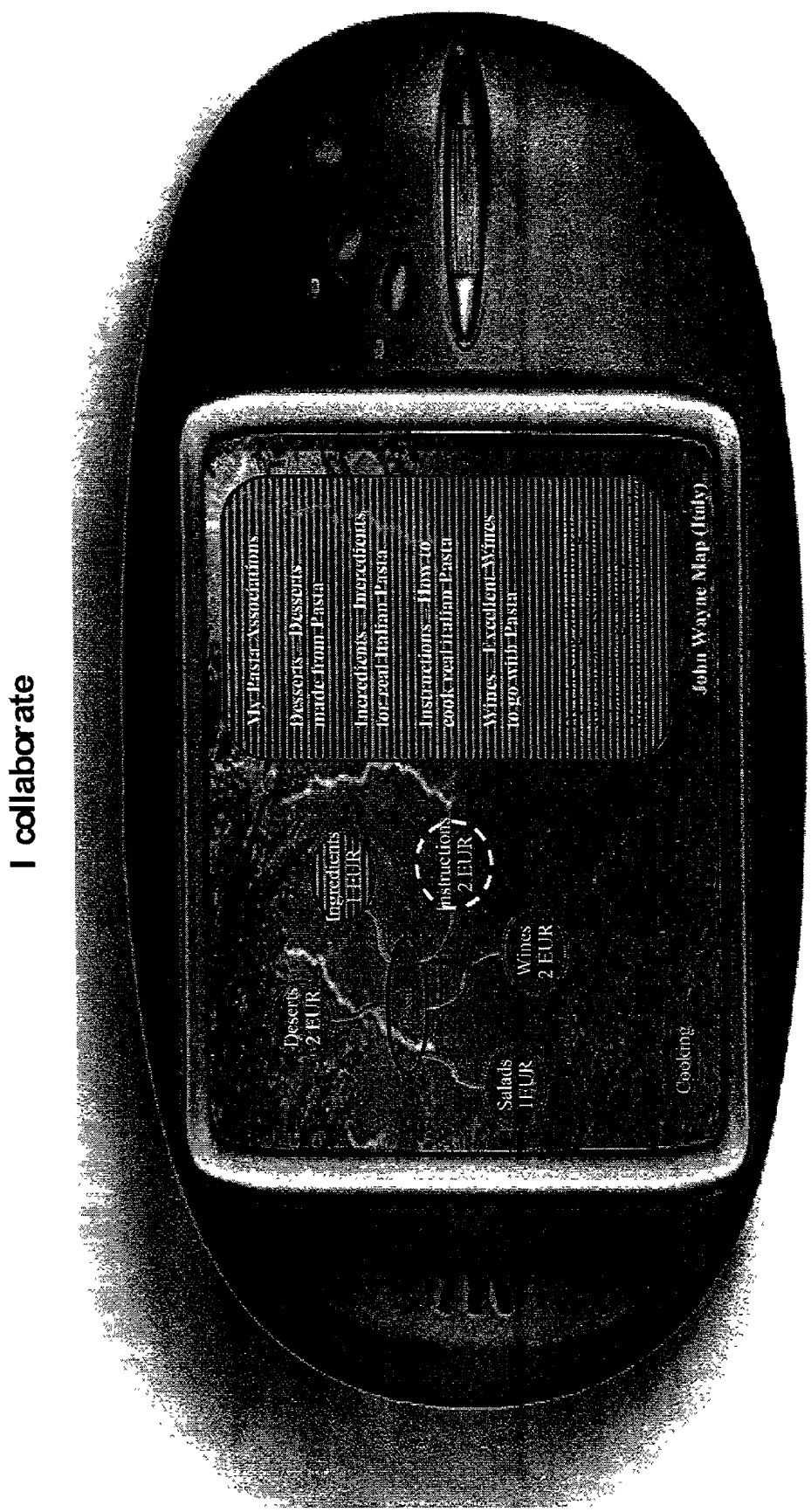
Figure 23G:
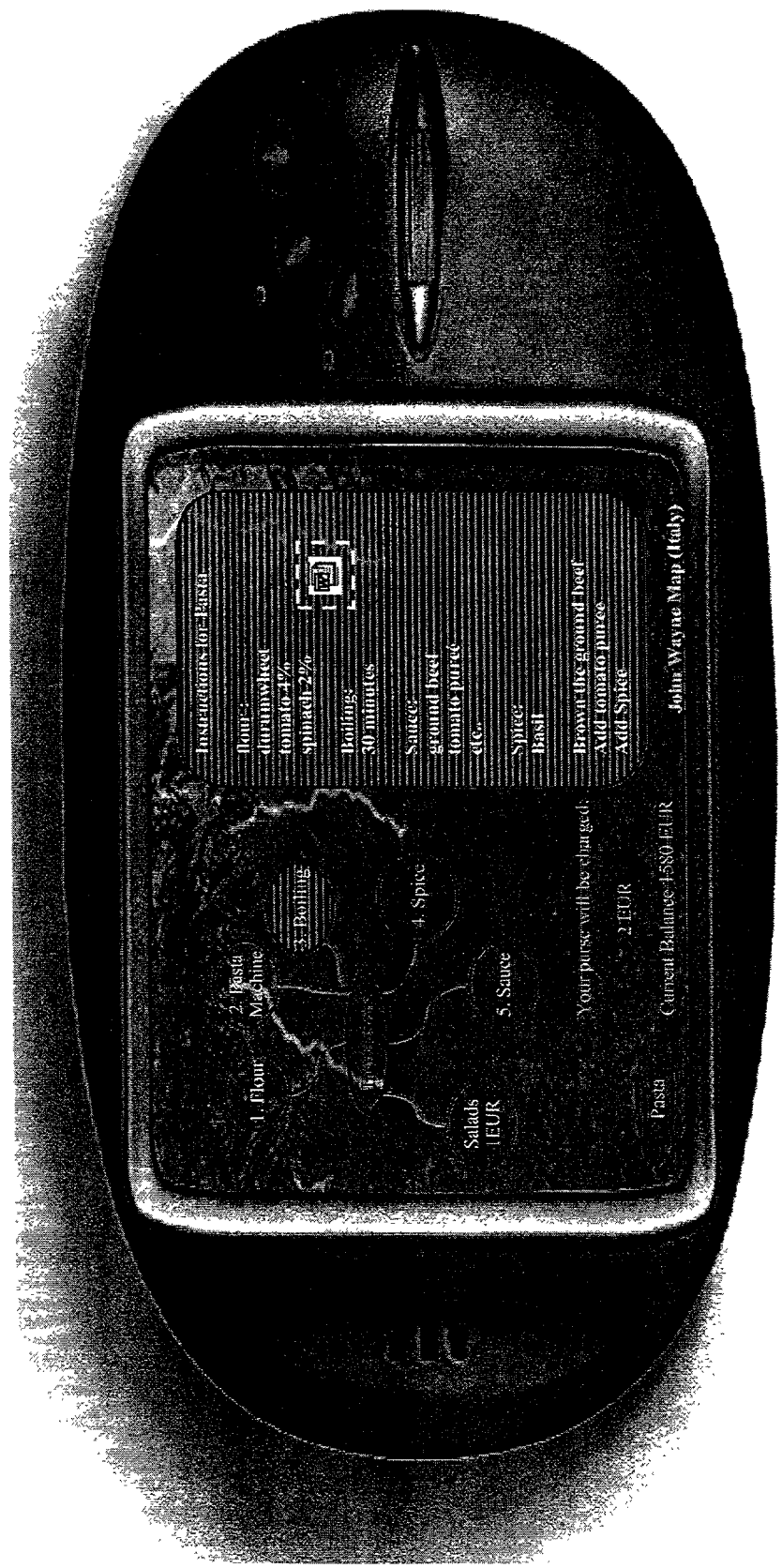
Figure 23H:
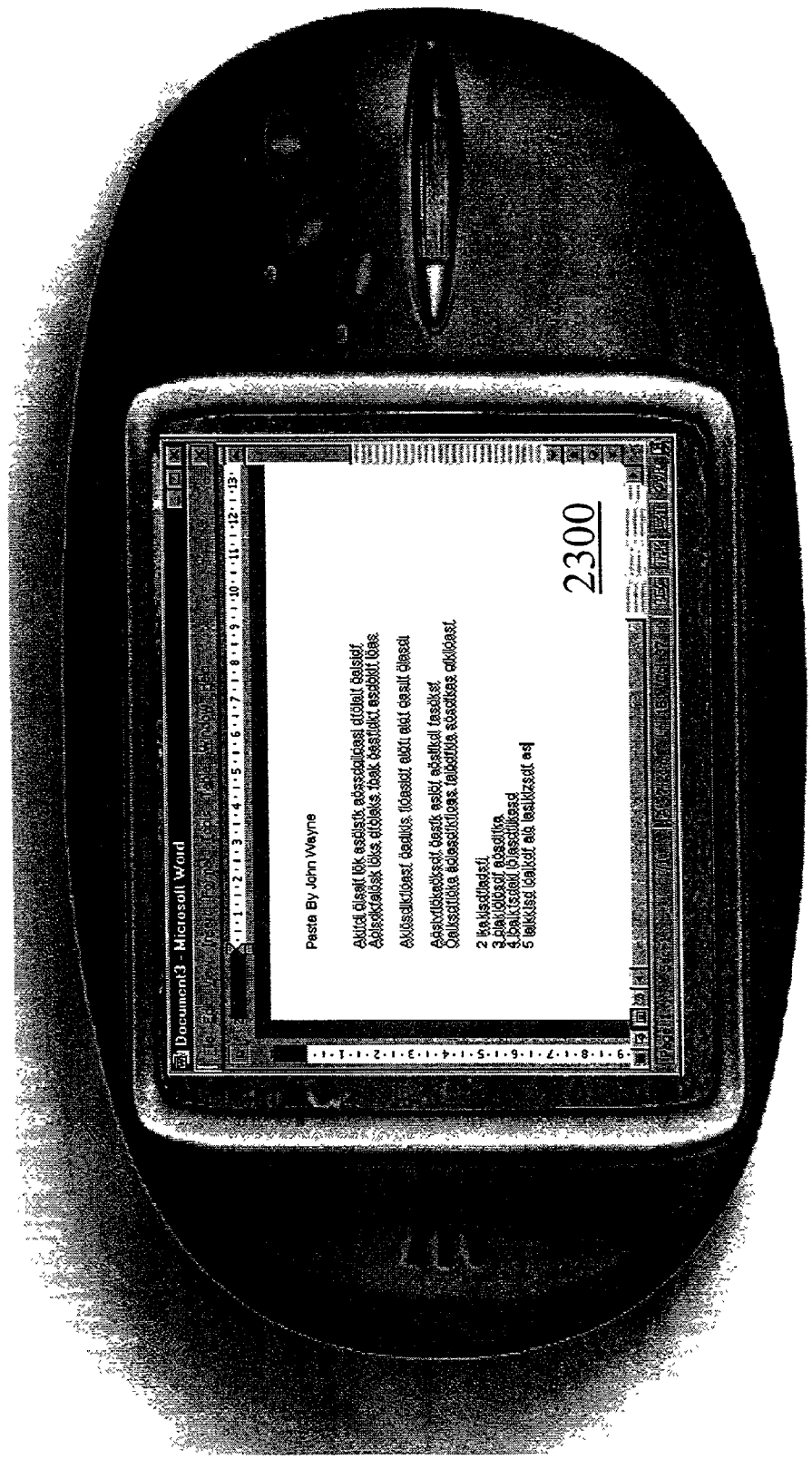
Figure 23I:
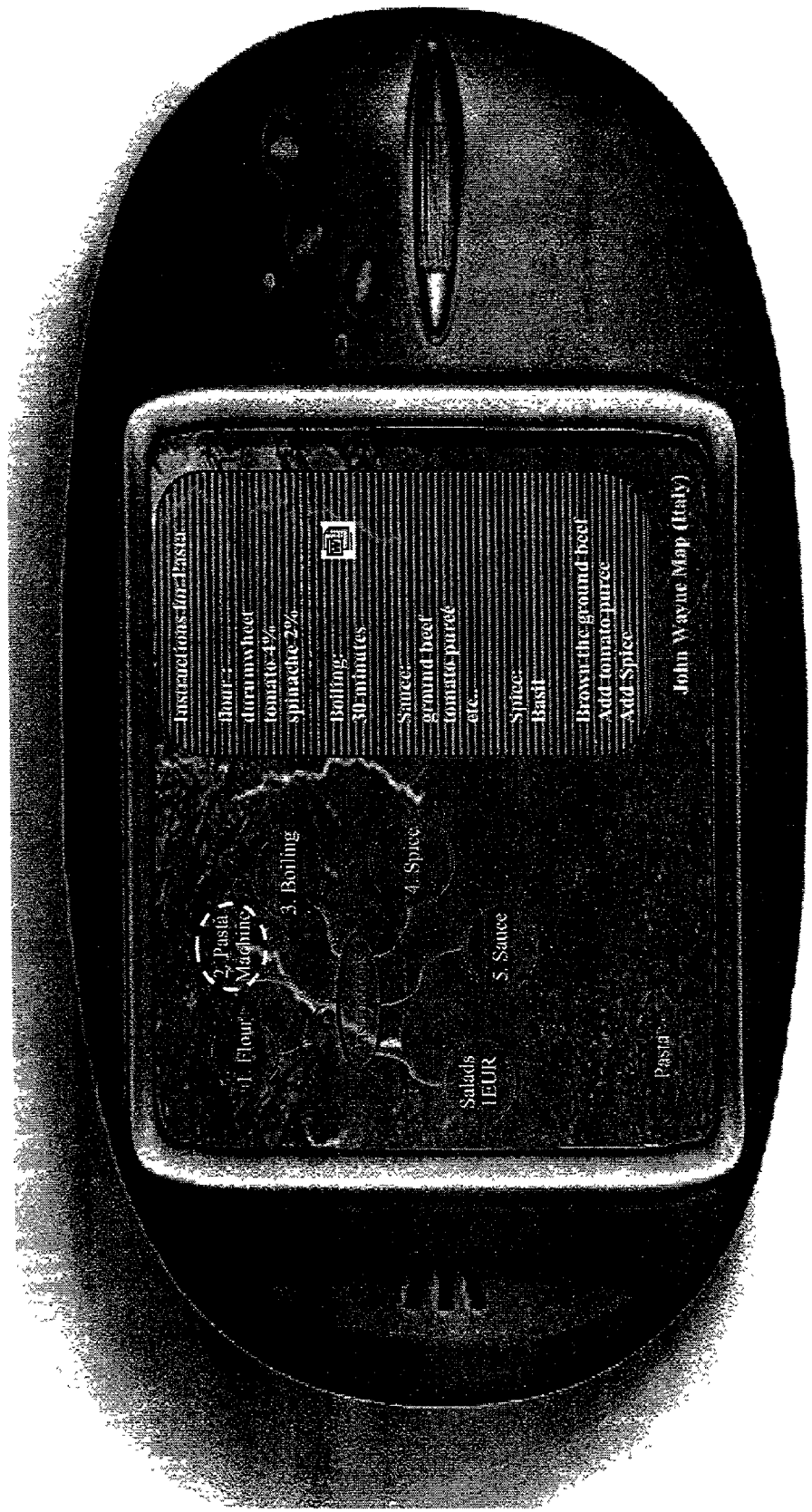
Figure 23J:
Figure 23K:
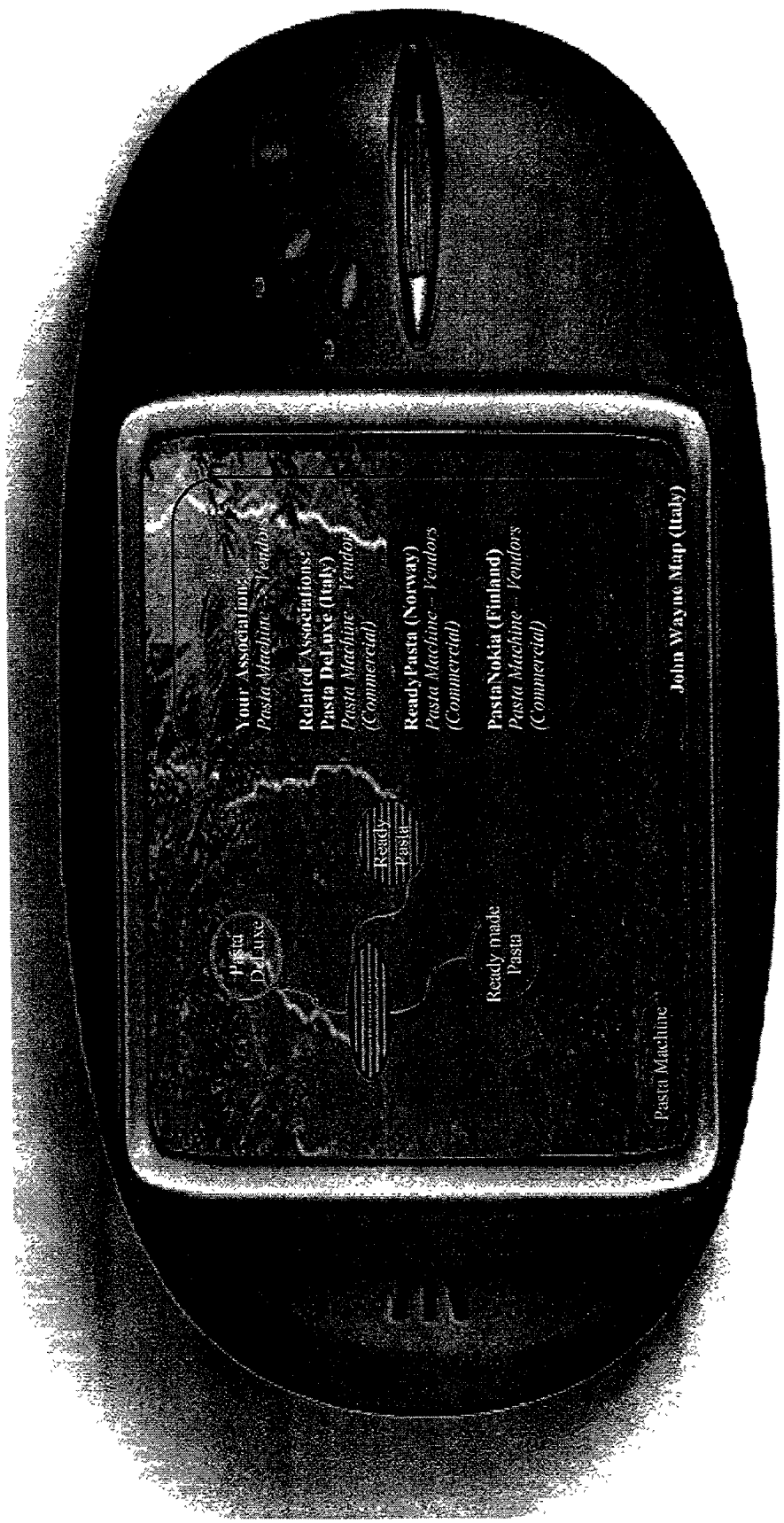
Figure 23L:
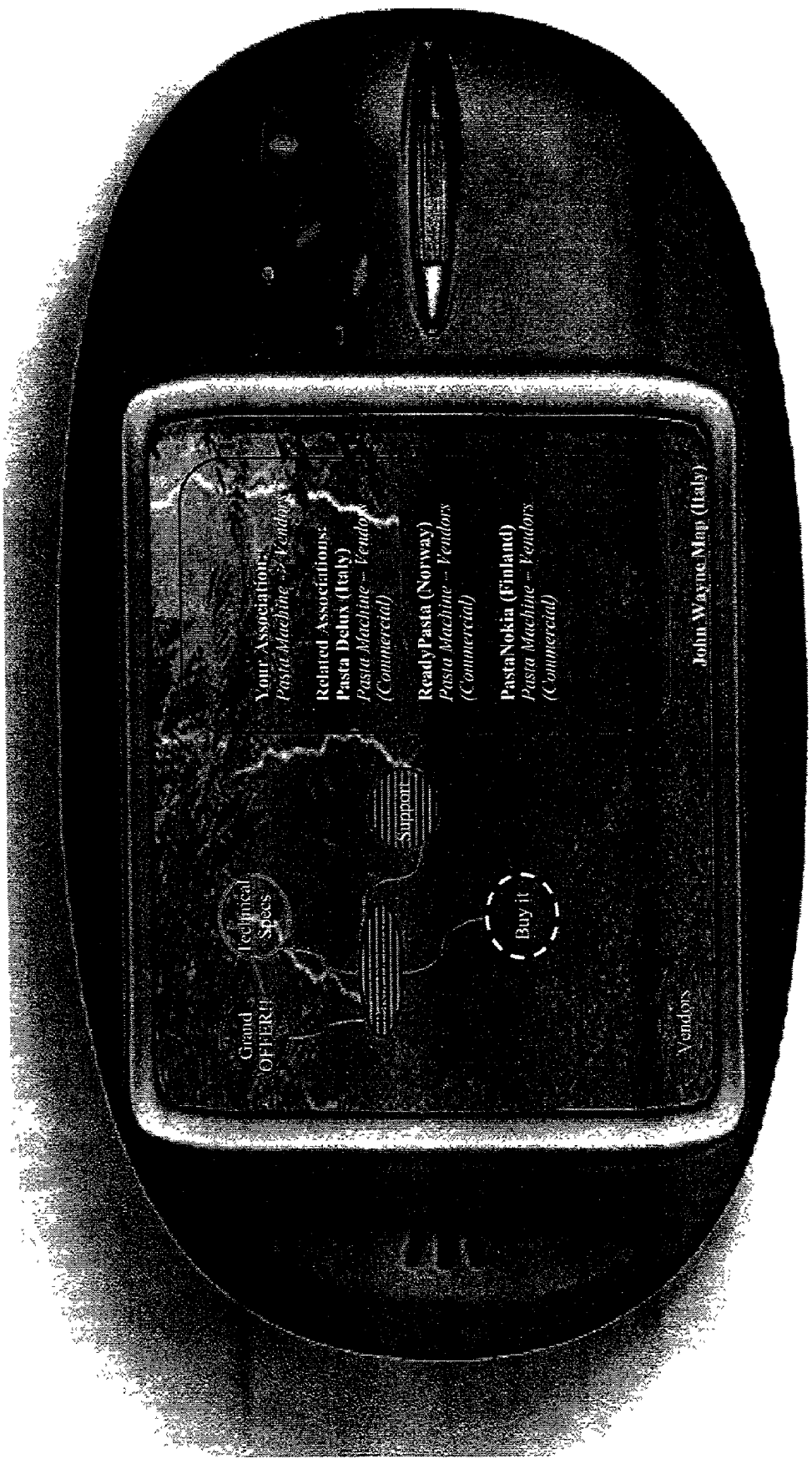
Figure 23M:
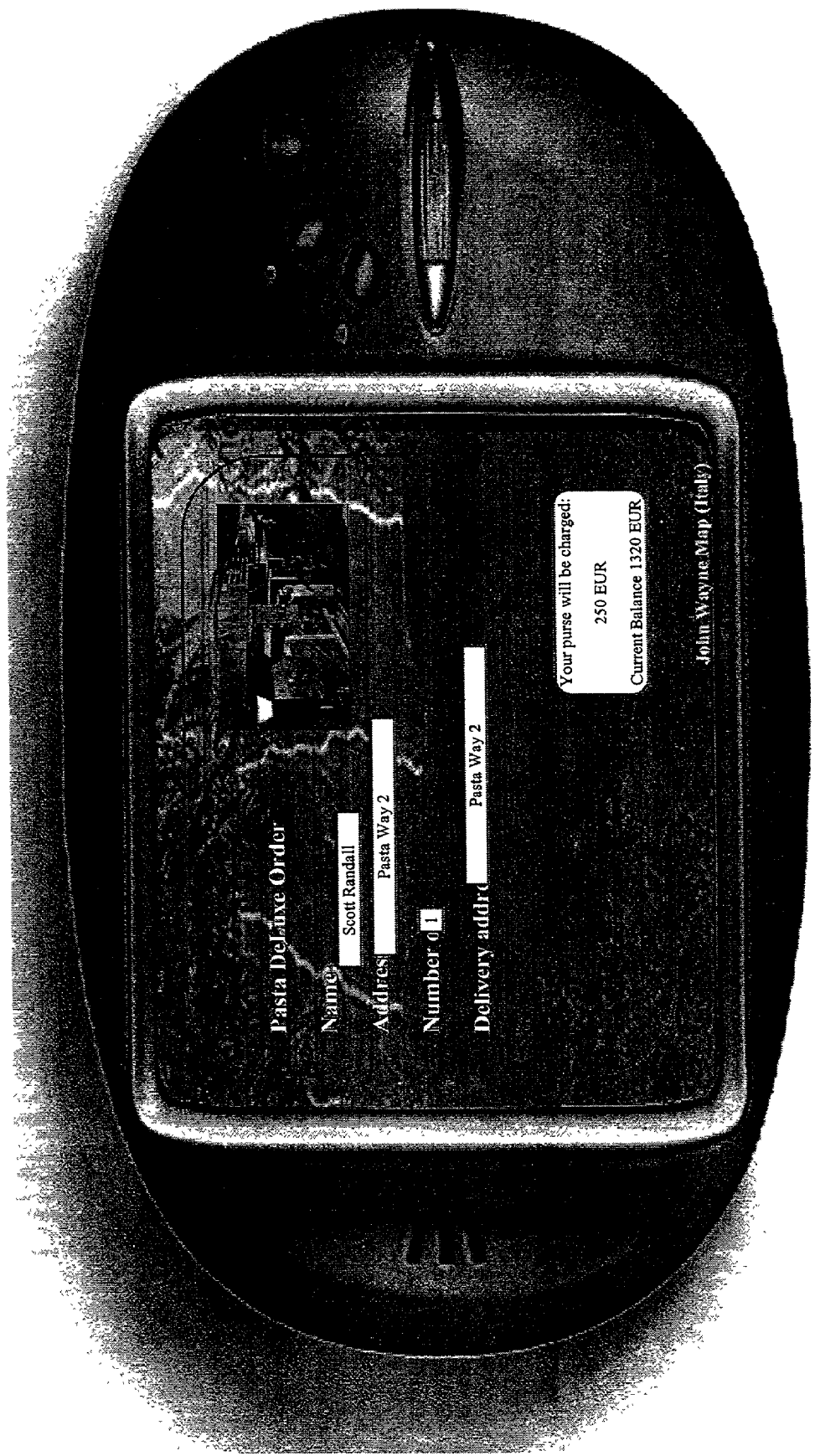
Figure 23N:
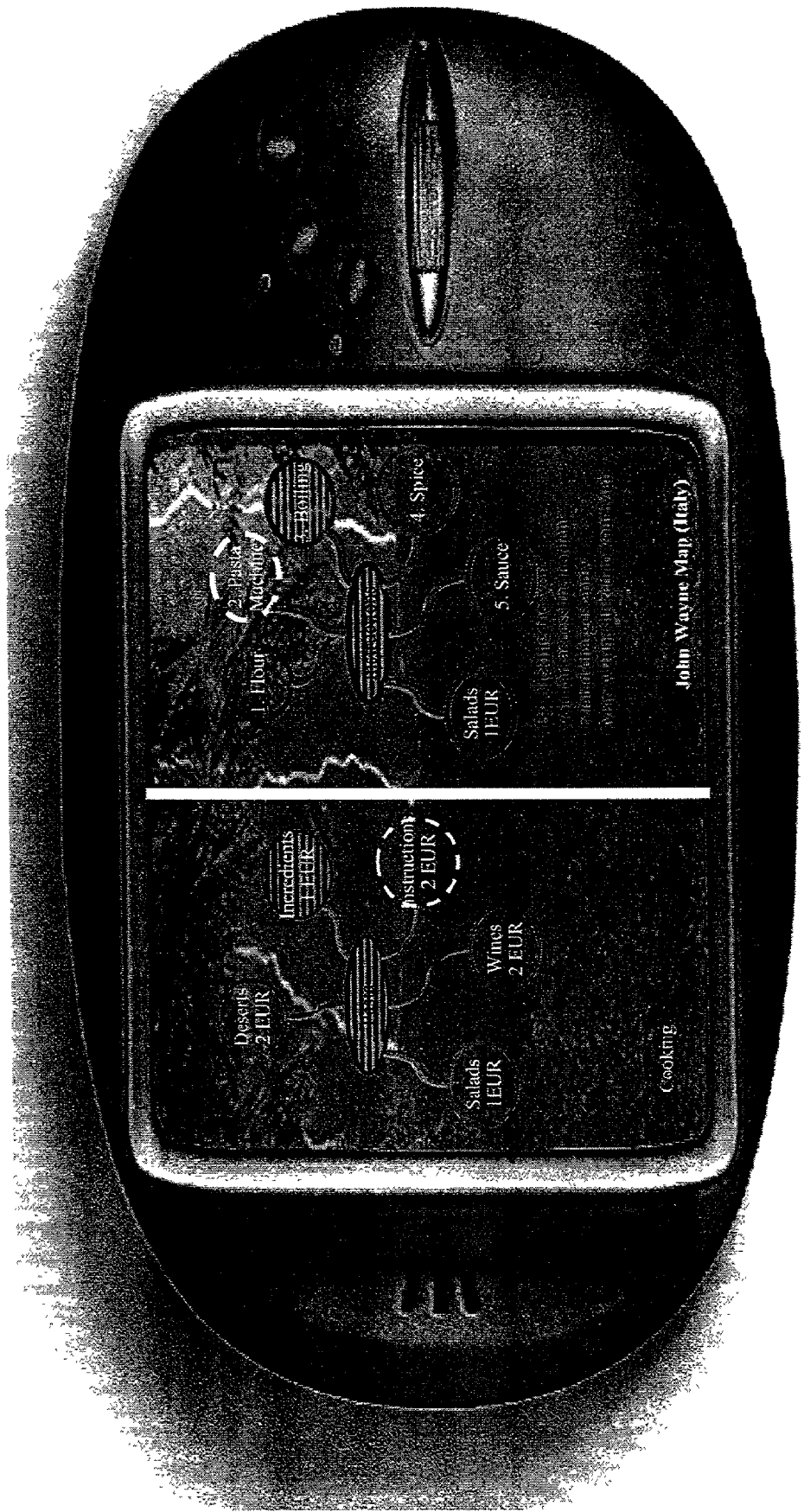
Figure 23O:
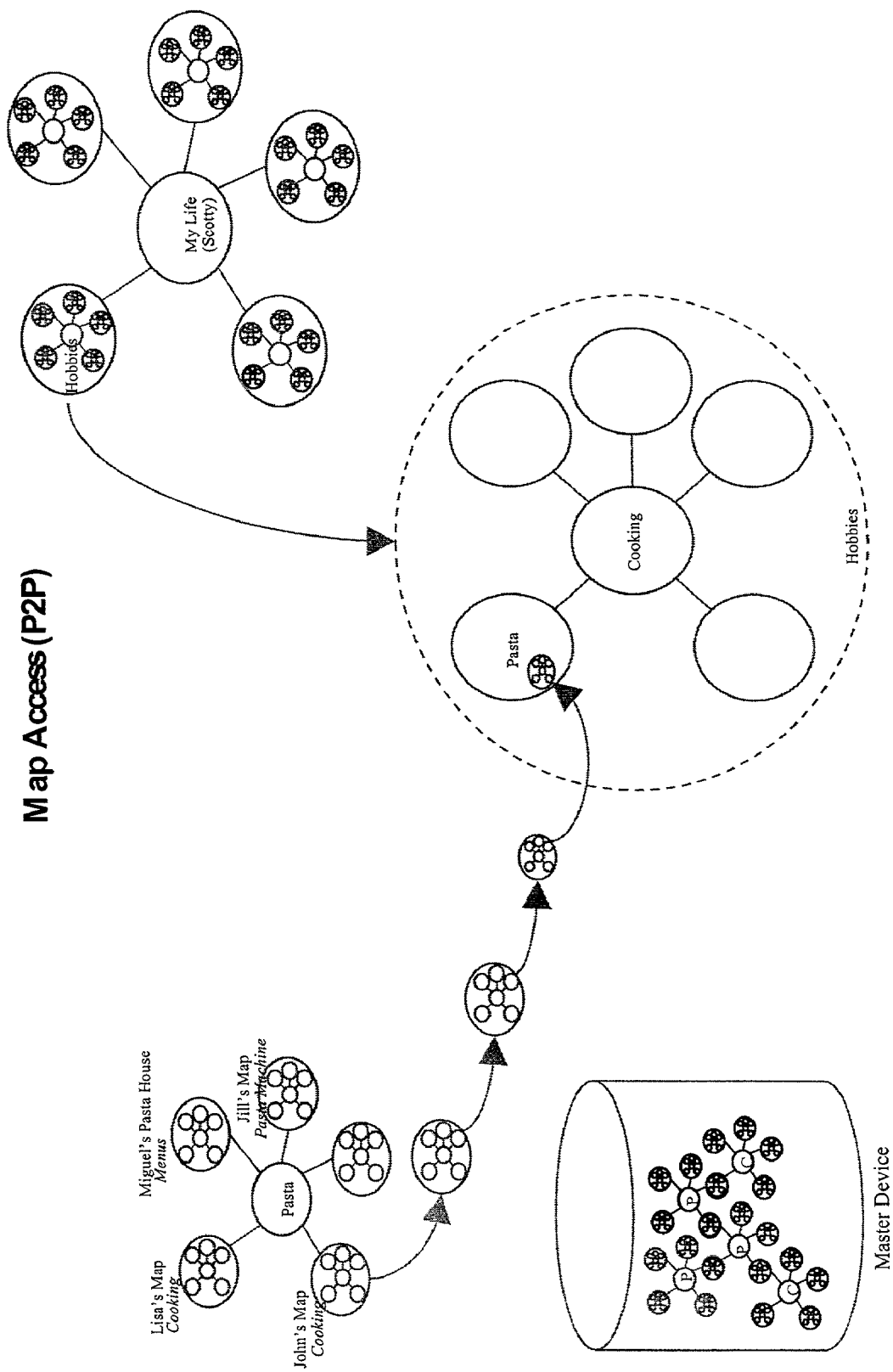

FIGS. 23A–23O illustrate one embodiment of navigating the maps provided by the present invention. It will be understood that the exemplary user interfaces displayed in this manner are intended to be illustrative, rather than limiting, and that any user interface may be provided or created by the user as well as any mechanism for providing visual feedback may be employed.

FIG. 23A depicts the example of a map that comprises the user's family. As shown, "Family" represents a category 2320, and "John", "Mary" and "Jill" are individual members 2310 thereof. The family relationships are labeled so that "John" is the "father", "Mary" the "mother", and "Jill" the "daughter" of the family, where father, mother and daughter are the defined relationships 2330.

It should be noted that individuals 2310, categories 2320 and relationships 2330 might be given any name by the user. Similarly, individuals 2310, categories 2320 and relationships 2330 may be represented visually in any manner desired by the user, as long as the map structure is abided by. For example, in one embodiment, a yellow circle may represent categories 2320, a blue circle may represent individuals 2310, and branches may be used to represent relationships 2330. In another embodiment, the user may choose to use the same kind of visual representation for both individuals 2310 and categories 2320.

FIGS. 23B–23N illustrate the possibility of leaving relationships 2330 unnamed. In one embodiment, the default setting in the CIE leaves relationship names implicit. To depict that the user has named a relationship 430, a dot in the middle of the edge that represents the relationship 430 graphically is used in one example. This implicit name can be made explicit by clicking on the dot by a pointing device. Such a default setting makes maps more succinct and easy to grasp visually, and may be reversed by the user so that all relationship names are explicitly shown.

A relationship 430 is created at the same time as a new node is created, namely between the new node and node to which the new node is associated. An existing relationship 430 can be edited by clicking with a pointing device on the edge that represents it visually. Editing a relationship allows adding, removing or modifying its name.

A tree-form display of a map 400 has a main node at the center. It can be a category 420 or an individual 410. For instance, FIG. 23B displays a configuration where the main category is "My Life". The remaining categories "Home", "Hobbies", "Social Life", "Work", "Leisure", and "Family" can be regarded as subcategories of "My Life", because they have been created as its child nodes.

In one embodiment of the present invention, maps 400 are constructed by a pointing device and a text input device. Selecting a node by a pointing device activates the node, moves it to the center of the display, and arranges the immediately related nodes around it. It should be noted that hereinafter selecting a node implies clicking once on the node by a pointing device (such as a mouse), which moves the selected node to the center of the display.

Submaps may be moved to other locations in the map 400 by dragging-and-dropping, as described in more detail below.

The UI may also contain a message area for the user, as illustrated in the bottom of FIG. 23B. In one embodiment, the terminal is intended to be in continuous real-time contact with other terminals and servers via Internet, telephone networks, Bluetooth, WLAN and/or the like.

Thus, in this exemplary embodiment, the illustration depicts the situation where the user receives a message and is informed by the UI in real-time. The nodes of the map 400 may be arranged in a particular geometric configuration, such as child nodes may be displayed on an ellipse shape arrangement around their parent, as shown in FIG. 23B. The user may optionally rotate this ellipse manually to inspect it from other aspects. In addition, the present invention may also allow automatic rotations with respect to the rhythmic passing of time (such as day, week, year and/or the like).

In accordance with the present invention, users are enabled in sharing maps with other users. For example, FIG. 23B illustrates the example where the user has received a map request from another user.

As will be described below, the user navigates the map 400 manually by repeatedly selecting nodes, which results in the nodes moving to the center of the display. For example, FIG. 23C shows a situation where the user has selected category "Hobbies" by a pointing device and hence moved it to the center of the display device (FIG. 23D). The immediately related nodes may be drawn around the node moved to the center. Selecting a node located in the center of the display opens it for inspection or editing unless it is an application or action node. If it is a note node with a link to another map, the other map is displayed. In one embodiment, double-clicking an application or action node in the center of the display starts the application or performs the action.

Further generations of nodes beyond the first generation of children are displayed depending on the terminal, so that the displayed part of the map fits on the display device 2300.

The previous node on the navigation path is displayed at the bottom left corner of the display 2300, as illustrated by the navigation path traversed in the sequence of FIGS. 23D–23G, 23I–23L, which lets the user backtrack. Selecting the node, shown at the bottom left corner of the display, with a pointing device takes the user to the previous node on the path. Alternatively, several previous nodes of the navigation path may be displayed on the display device 2300.

In connection with navigation, the user may also reorganize a map 400, by adding, deleting, editing the content, or moving around parts of it. Thus, FIG. 23D illustrates how the user may organize information by adding a new subcategory "Music" to the category 2320 "Hobbies".

FIG. 23E illustrates a map search. The user first selects the category "Cooking" and then its subcategory "Pasta". Now the search engine of the present invention informs him that two other users, namely "Lisa Jordan" from Mexico and "John Wayne" from Italy, also have a map 400 with this association (i.e., information about cooking pasta). If more associations are found in the "mobile universe" than can be displayed simultaneously, only the number of associations that fit on the display 2300 at any given time are displayed in order to avoid information overload.

Another aspect of the present invention is the notion of a search agent that automatically scans the "mobile universe" and gathers statistics of the most commonly occurring associations. When the user creates a node, the "Mapper" may then suggest, for example, the five most frequently occurring associations in the "mobile universe" as possible extensions of the user's map 400. It should be noted that hereinafter Mapper is a term used to describe a contextualized interaction environment which allows a user to create a UI in accordance with the present invention.

As one possible example, if the user creates a node with name "Cooking", and the most common associations with "Cooking" are "Pasta", "Pizza", "Paella", "Meatloaf" and "Thali", the "Mapper" can suggest these to the user as possible extensions of his map 400. The user may collaborate with other users, say, in terms of the child nodes "Desserts", "Ingredients", "Instructions", "Wines", and "Salads" of "Pasta" (FIG. 23F). The UI displays a price tag for each item, which signifies that they are objects of commerce. Alternatively, the user may give away for free content that he has created. Commercial actions are straightforward and intuitive: if the user selects an item with a price tag, the user's electronic purse is charged that amount. One of the attributes of a node may be price.

FIG. 23G illustrates an exemplary action where the user has selected the category "Instructions" and paid 2 Euros for them. Using the purchased pasta cooking instruction illustrates how the present invention is used for learning. The user may also obtain an item of information in linear form, instead of a map form, by means of an automatic conversion, as illustrated in FIG. 23H. The linear form can be automatically converted to map form, shown in FIG. 23I.

The next step of the exemplary embodiment of the instruction requires a pasta machine. Assuming the user does not have one, the user may learn where to get one. To learn, he selects that item, and obtains information regarding pasta machine vendors, tests, reviews and/or the like, as shown in FIG. 23J. If the user decides to buy a pasta machine in the example, the user selects the item "Vendors" on the terminal. Three vendors are displayed in map form (FIGS. 23J, 23K), using an association-search across the network. The user may decide to purchase "Pasta De Luxe" by selecting that item, as shown in FIG. 23L. The user may then decide to buy this item, by providing his contact information to the vendor, as shown in FIG. 23M. As is evident, this described process illustrates communication and commerce using a user's mobile, and the interrelation with understanding, organizing and navigating information.

In an alternative embodiment, shown in FIG. 23N, two users might create new content collaboratively. The resulting map 400 could then be shared for free with other users or made an object of commerce that is co-owned by the two users. The "Mapper" supports such collaboration by allowing the map 400 of the user to be displayed simultaneously with the map 400 of another user, which is achieved by splitting the display area in two by a line. A modification of such collaboration may be that the foreign map on a display is common to a group of users. In such group collaboration, each user sees his own map simultaneously with the common map, with the display split in two by a line.

In another embodiment, in the group collaboration, the user's own map may be placed at the corner of the display device 2300, in a window which may be opened and closed according to the user's needs. Moreover, if the group collaboration utilizes an application, then the session may be shared among the collaborators.

According to the invention, each node in a map may include an attribute that can alternatively be set to Private or Public to enable the user in preventing others from navigating his private maps. The attribute can also be set to Custom, which means that the user may enumerate a list of users that may access that node and others may not.

Learning by means of UIs constructed by the "Mapper" offers many benefits to the user. Navigating maps that have been constructed according to associations of concepts is an efficient method of learning, as is also creating maps to represent, understand, summarize or organize information alone or in co-operation with others.

In addition to these general functionalities offered by the "Mapper", learning by the present invention may be accomplished in many ways, as illustrated by the following examples. In one embodiment, the combination of navigation, learning and understanding takes place. Here, learning may occur by a quiz game. Given a map 400, one must connect one of the alternative surrounding nodes to the main node by an edge. That relationship represents the user's answer to the quiz. If the answer is correct, the user is provided further information.

In another embodiment, the same cross-functionality of the UI provides a game for small children to teach Finnish language. Given a letter of the alphabet, the game prompts the user to connect Finnish words that begin with that letter to pictures that have the same meaning as the words.

FIG. 23O illustrates the functionality involved in the user's finding a pasta recipe. The user has navigated from his main map "My Life" via the path of "Hobbies" and "Cooking" to "Pasta". His maps reside in his master device. Then, the user searches for instructions across a network. The one found in another user's (labeled "John") map is accessed by transferring it from the other user's master device to the first user's master device and linking it to the Pasta node of the first user's map. This is also a digital commerce transaction, whereby the first user's purse is charged 2 Euros. Because maps contain just links to content rather than the content all itself (which is distributed across various devices), it should be noted that only maps are copied, not the content linked to the map by URIs.

Another exemplary manner for navigating is by using search engines to find associations between pairs of nodes, or to find single nodes. The user may select a node pair and submit a search request across the network for node pairs of the same name that are associated. A search may also be carried out for a single node, a relationship, or any number of their attributes.

The user may also specify an automatic search agent operating continuously as a background process that pushes search results that match his query in real time as they are created by other users anywhere in the network. The apparatus of this invention thus contains a search engine and a push mechanism.

The search for associations allows the user to search for other users' maps with the same association, and allows the possibility of associating ideas using the map-based UI. The name of a node is a keyword that indicates the meaning of the node. Thus, maps are types of semantic networks, and the totality of all users' maps are interlinked via the "mobile universe" (described below) to form a semantic web. The "Mapper" allows searching for associations across this semantic web that match those of the user. Thus, the present invention allows searching of the Internet in a semantic orientation.

In one embodiment, the Semantic Web developed by the W3 consortium can be linked to the semantic web of the present invention by means of node profiles. One attribute of a node may be Definition, which may contain an URI to a Semantic Web ontology that formally defines the meaning of the keyword naming the node. It should be noted that in one embodiment, the semantic web of the present invention is semantic from the user's point of view, whereas the Semantic Web of the W3 consortium is semantic from a computing device's point of view. These two approaches are thus complementary ways of incorporating semantics into the web—the present invention describes a semantic web for users of computing devices, in the form of a new knowledge layer above the existing information layer, whereas the W3 Consortium's Semantic Web augments the web pages of the existing information layer with semantic information for computing devices but invisible to users.

It should be noted that the above-discussed exemplary embodiments are mere illustrations of the dynamic nature of the present invention in that the invention allows use in a wide variety of functions.

FIGS. 24A–24F illustrate one exemplary process of the flow by which users may create new nodes and edges on the maps. As noted above, this exemplary flow is an illustration of how the present invention may be used, and should not be considered as limiting the scope thereof.

FIGS. 24A–24B illustrate the process of creating a new node and a new edge in the map 400, in accordance with the present invention. In step 2402, the user clicks on a new node symbol on the terminal of the computing device, which in one of exemplary embodiments may be a mobile device. The new node symbol causes the initiation of the process of creating a new node, within the system. Next, at step 2404, the user drags the symbol onto an existing node and drops it thereupon. In accordance with the present invention, the dragging and dropping action may be performed using a mouse or any other of the above-mentioned pointing devices.

Next, the flow proceeds to step 2406, where a node description form is displayed to the user by the present system. At step 2408, the user inputs the node name in accordance with his own personal preferences.

The flow then proceeds to step 2410, where the system checks to determine if the node name already exists in its database. If the node name does not already exist, the flow proceeds to step 2416 and the user inputs other node characteristics. The process of inputting other node characteristics is described more fully in conjunction with FIG. 24C. On the other hand, if a node name already exists in the system's database, the flow proceeds to step 2412. The system asks the user if the new node is the same as the old node, i.e. whether the nodes should be identified. If the user answers affirmatively, the system adds the node pair to its list of identical node pairs in its database, in step 2414. Next, the flow proceeds to step 2416 and the user inputs other node characteristics. However, if, at step 2412, the user answers negatively, the flow proceeds directly to step 2416. In this case, the user must also enter a new name for the node. The new node name should not yet exist in the system's database.

From step 2416 the flow proceeds to step 2418 (FIG. 4B), where the system draws a new node with the name the user provided. Next, at step 2420, a new edge is drawn to the new node from the existing node on which the new node symbol was dropped. In other words, in step 2420 the system connects the newly drawn node to the older node from which the creation of the new node was initiated.

Finally, the flow proceeds to step 2422, where the new node is added to the node list in the system database, and the new edge is added to the edge list in the database as a pair consisting of the source node and the destination node. The new edge is drawn by connecting the source node and the destination node.

FIG. 24C illustrates the subroutine called from step 2416 in FIG. 24A to allow the user to input node characteristics. In step 2430, the user is allowed to initiate inputting of detailed description for the new node being created. In step 2432, the user selects the node type for the node being created. According to the present invention, some of the exemplary node types that can be selected by the user are attachment, action, application, outlined entry, and/or the like. In step 2434, the system checks to determine if the user selected the attachment option as his node type. If the user selected attachment as the node type, the flow proceeds to step 2436, where the user may input the characteristic information for the attachments. Further details regarding the input characteristics for attachments is provided in conjunction with FIG. 24D and will be described in more detail later.

After step 2436, the flow proceeds to 2438, where the composition of the selected as well as the input items is displayed to the user on the terminal. Referring back to step 2434, if, however, the system determines that the user did not make the attachment selection, the flow proceeds to step 2440, where the system checks to determine if the user selected the action option as the node type. If the user selected action as the node type, the flow proceeds to step 2442 where the user may input characteristic information for actions that may be performed using the node. Actions are macros, i.e. sequences of steps of any kind performed with the "Mapper". They are defined by recording such a sequence.

Returning back to step 2440, if the system determines that the user did not select action as the node type, the flow proceeds to step 2444. At step 2444, the system checks to determine if the user selected the application option as the node type. If the user selected the application option, the flow proceeds to step 2446, where the user may select the application that is to be associated with the node. In one embodiment, the user may select the application by looking through a predetermined list of applications that are supported by the present invention. FIG. 24F will provide more details regarding the selection of an application by the user.

Returning back to step 2444, if the system determines that the user did not choose application as the node type, the flow proceeds to step 2448 where the system checks to determine if the outlined entry option was selected as the node type. If the outlined entry option was selected as the node type, the flow proceeds to step 2450, where the user may input characteristic information for outlined entries, which is described in more detail in conjunction with FIG. 24E. If the system determines that the user did not select outlined entry as his option, the flow proceeds to step 2438 from 2448.

FIG. 24D illustrates the process of inputting characteristics for attachments that were initially mentioned in step 2436, from where the flow proceeds to step 2454 where the user is allowed to select the attachment content from the system database. In one embodiment, the selection may be made by utilizing a scrollable selection map. Next, at step 2456, the system symbolizes the node that is being created by an attachment symbol that indicates the type of the attached file (e.g. Word document, picture, video, map).

FIG. 24E illustrates the process of inputting characteristics for outlined entries, which called from step 2450 of FIG. 24C. At step 2480, the user may select the outlined entry type from a predetermined selection, in one embodiment. The outlined entry may be Contact, Recipe, Time, Location, and Message and/or the like. Once the user has selected the appropriate outlined entry, the flow proceeds to step 2482, where the system checks to determine if the outlined entry type is time. If the outlined entry type is not time, the flow proceeds to step 2484, where the user inputs characteristics for other outlined entry types and then the flow proceeds to step 2489, from where the control is returned to the step that called the subroutine depicted in FIG. 24E.

However, if, at step 2482, the outlined entry type is determined to be time, the flow proceeds to step 2486 where the user is allowed to input the time entry using a predetermined user interface on the terminal. According to one of the embodiments, the time entry user interface is a calendar display.

Next, the flow proceeds to step 2488, where the system associates the input time in the calendar implicitly to the node being created. Finally, the flow proceeds to step 2489.

FIG. 24F depicts the subroutine for selecting an application by a user, which was initially called in step 2446 of FIG. 24C. At step 2490, the terminal displays the first predetermined number of alternatives for selection as nodes around a central node, which represents the node that is to be selected. The flow proceeds to step 2492, where the system checks to determine if the left finger was selected. The left finger is a symbol at the bottom corner of the display, and is visible in FIG. 26I as an example. If the left finger was selected, the flow proceeds to step 2494 where the system replaces the content of the top-most node in the map 400 by the first item from the system database that has not yet been displayed on the terminal. At step 2496, the nodes are rotated one position in the counter-clockwise direction and the flow proceeds to step 2498, where the system checks to determine if any nodes were selected. If at least one node was selected, the flow proceeds to step 2500 and the selection is considered complete.

On the other hand, at step 2498, if no nodes were selected, the flow returns back to step 2492.

Returning back to step 2492, if the system determines that the left finger was not selected, the flow proceeds to step 2502 and the system checks to determine if the right finger was selected. If the user did not select the right finger, the flow returns back to step 2498. On the other hand, if the user selected the right finger, the flow proceeds to step 2504 where the content of the top-most node in the map is replaced by the last item from the database that has not yet been displayed.

Next, in step 2506, the nodes are rotated one position clockwise and the flow proceeds to step 2498, which was described above. On the other hand, if no nodes were selected, 0the process returns back to step 2492 and the entire process is repeated again.

In accordance with one embodiment, FIGS. 25A–25G are screenshots depicting the customization of the UI by the user to conform the UTI to his/her personal preferences.

As described above, the user customizes his UI as a side effect of organizing his information. The user may also customize his UI by choosing a background picture, a background sound, and the manner in which the maps are displayed (i.e., how the individuals 410, categories 420 and relationships 430 look). Another opportunity for customization is based on cognitive or personality style, such as if a user has a particular learning style, he can obtain backgrounds that suit that style from other users or service providers. Specific background pictures and sounds may also be associated with a particular function of the UI. Thus, for instance, learning might be associated with classical music and cooking with salsa music.

Figure 25A:
FIGS. 25A–25G are screenshots illustrating one embodiment of customization of the UI by the user to conform the UI to his/her personal preferences.
Figure 25B:
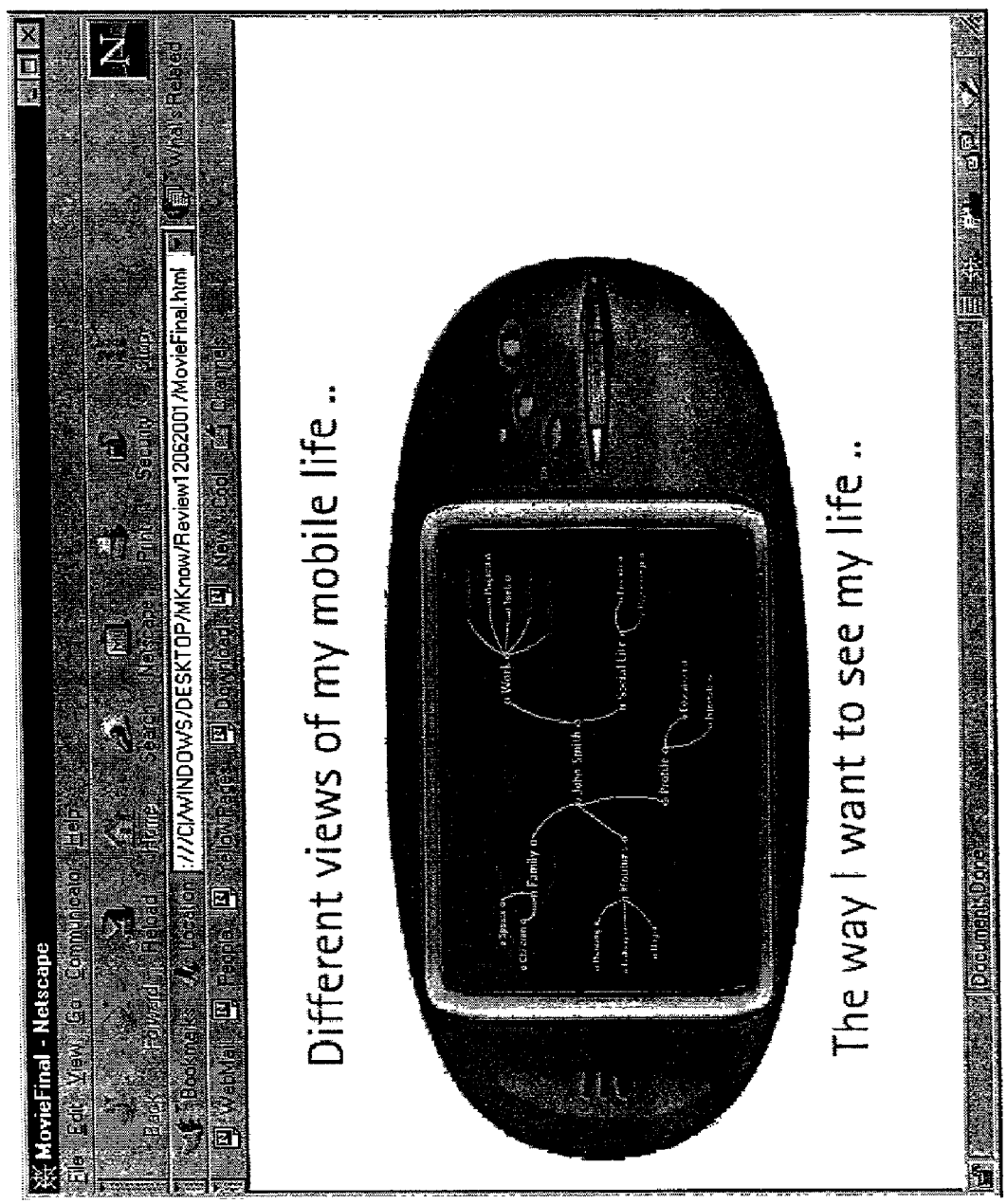
Figure 25C:
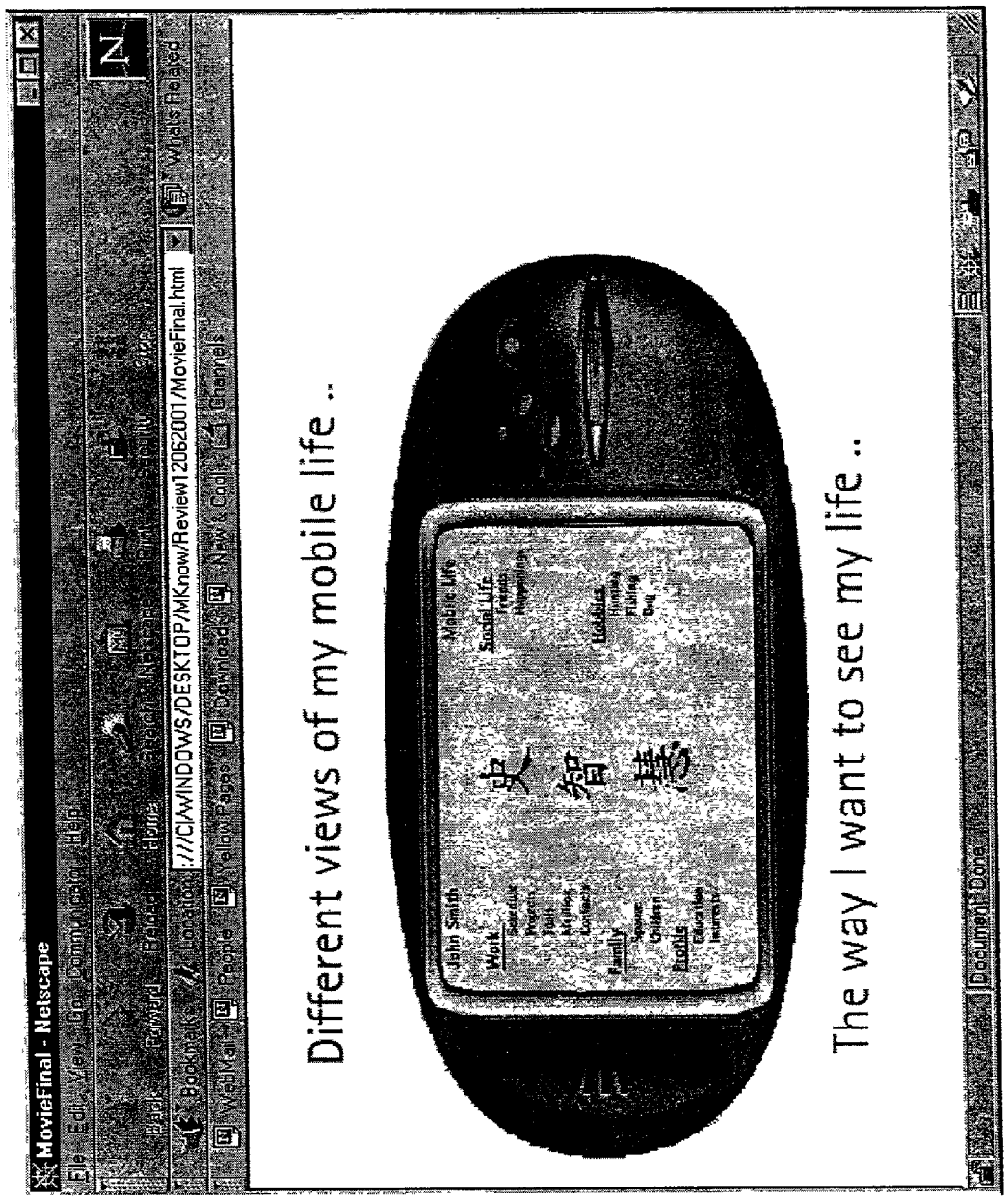

FIGS. 25A–25C illustrate the variation of background pictures and the visual representations of individuals 410, categories 420, and relationships 430. FIGS. 25A–25C each displays the same information, even though the displays are in different forms. In particular, each figure has a different background picture. FIG. 25A displays individuals 410 and categories 420 by ovals, whereas FIG. 25B displays them by plain text that is pre-fixed and post-fixed by a dot symbol.

It should be noted that the scope of the present invention is not limited by the manner in which the information is displayed on the terminal, and various display styles may be used within the scope of the present invention. FIG. 25A displays relationships by straight lines, whereas FIG. 25B displays them by curved lines. Further, FIGS. 25A–25B display the map graphically: the main node is in the center and the immediately related nodes surround the main node. On the other hand, FIG. 25C displays the same information in outline form, with the main node in the upper left corner. This display form could also be displayed on a XHTML/WAP mobile phone without a graphical display, as opposed to those shown in FIGS. 25A–25B which require a terminal with a graphical display.

As noted above, these forms have automatic conversions therebetween, so the user may select the preferred form, provided the terminal being used supports it.

Figure 25D:
Figure 25E:
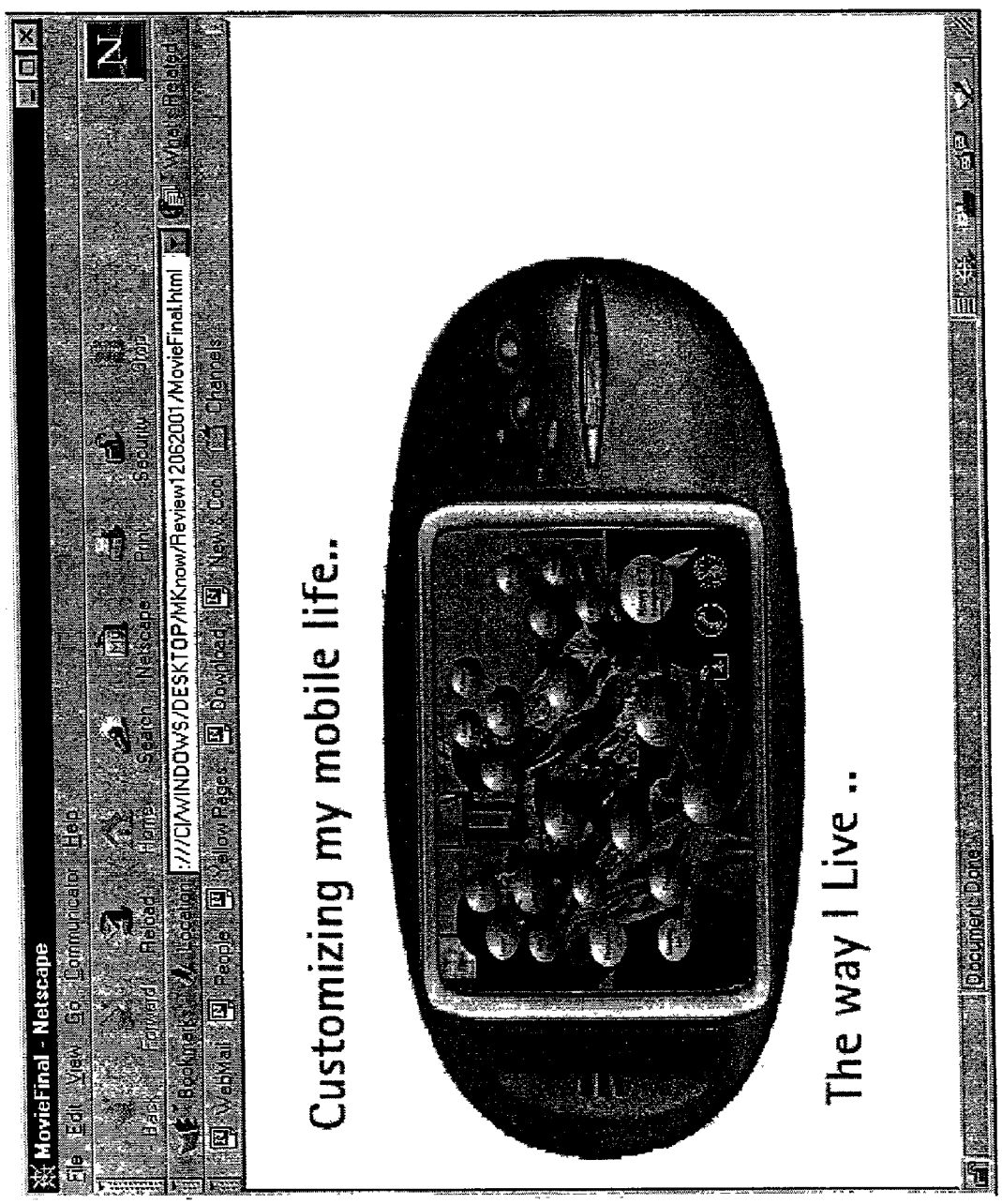
Figure 25F:

FIGS. 25D–25F illustrate the example of customization in the case of three members of a family: John Smith, Lisa Smith and Michael Smith. Each of the members uses a different background, and each has customized his/her own UI according to his/her preferences, and according to his/her social life, hobbies, profile, work, school and/or the like.

Figure 25G:

The user may customize his own UI from scratch, constructing it node by node. Alternatively, the user may purchase an UI from a service provider (as shown in FIG. 25G), or get the UI from some other user or community. A UI obtained from an external source can be used as such, or again the user may further customize it. Thus, any extent of customization is possible, depending on the needs, capabilities and preferences of the user.

A UI constructed by the "Mapper" is relative to a context. The context may contain attributes such as time, location, and role (e.g. work, private, study). One may even relate a map to the user's mood, by using, in one example, a dark background in the event of a bad mood or a light one in the event of good mood.

As just noted, the user may choose to relate the emphasis of nodes in a map to temporal cycles, such as time in a day, week, month, or year, and use this rhythm to contextually customize his UI. Thus, for example, information regarding family and hobbies might be deemed as more important in the evening, while work- or study-related information would have more significance during the day time. Family- and hobby-related nodes are then displayed with emphasis on a map in the evening, and work- and study-related nodes in the daytime. Similar customization can be done with respect to season or time of year. For instance, skiing-related information may be more relevant in the winter and swimming-related matters in the summer. Such customizations are implemented by positioning nodes on an ellipse that the UI automatically rotates as time passes, or by emphasis by means of, for example, color or size.

Customization relative to location may be done by making use of Global Positioning System (GPS), Wireless Local Area Network (WLAN) or Bluetooth. Work-related nodes (including application programs) may be displayed with emphasis in a map when the user is at his office, and family-related matters at home.

The user can manually select a role, such as work, study, or private, that is irrespective of time and location, because the role may not always be automatically determined from time and location, and roles may intermingle.

To help the user in selecting the information he wants to inspect at a particular moment, distinct visual symbols and sounds may be associated with classes of pushed information. Thus, arriving electronic mails might have a different symbol or animation or sound than arriving map requests. Additionally, electronic mails from family members can be further associated with different attributes than electronic mails from colleagues at work.

The CIE associates arriving electronic mails, other pushed information and requested services to their proper context. For instance, electronic mails sent by the family doctor become subnodes of the node representing the family doctor (if there is one). Similarly, answers by service providers to news service requests specified by the profile of the node representing news (if there is one, and specifying, for example, the favorite news subject or the favorite journalist of a user) become subnodes of the news node.

To help the user in creating maps more conveniently and swiftly, the "Mapper" provides pre-initialized maps. They may, for example, have certain attributes that are fixed, such as background, sound and/or the like. Such pre-initialized maps may be copyrighted, given away for free or sold to other users via a mobile network.

Figure 26A:
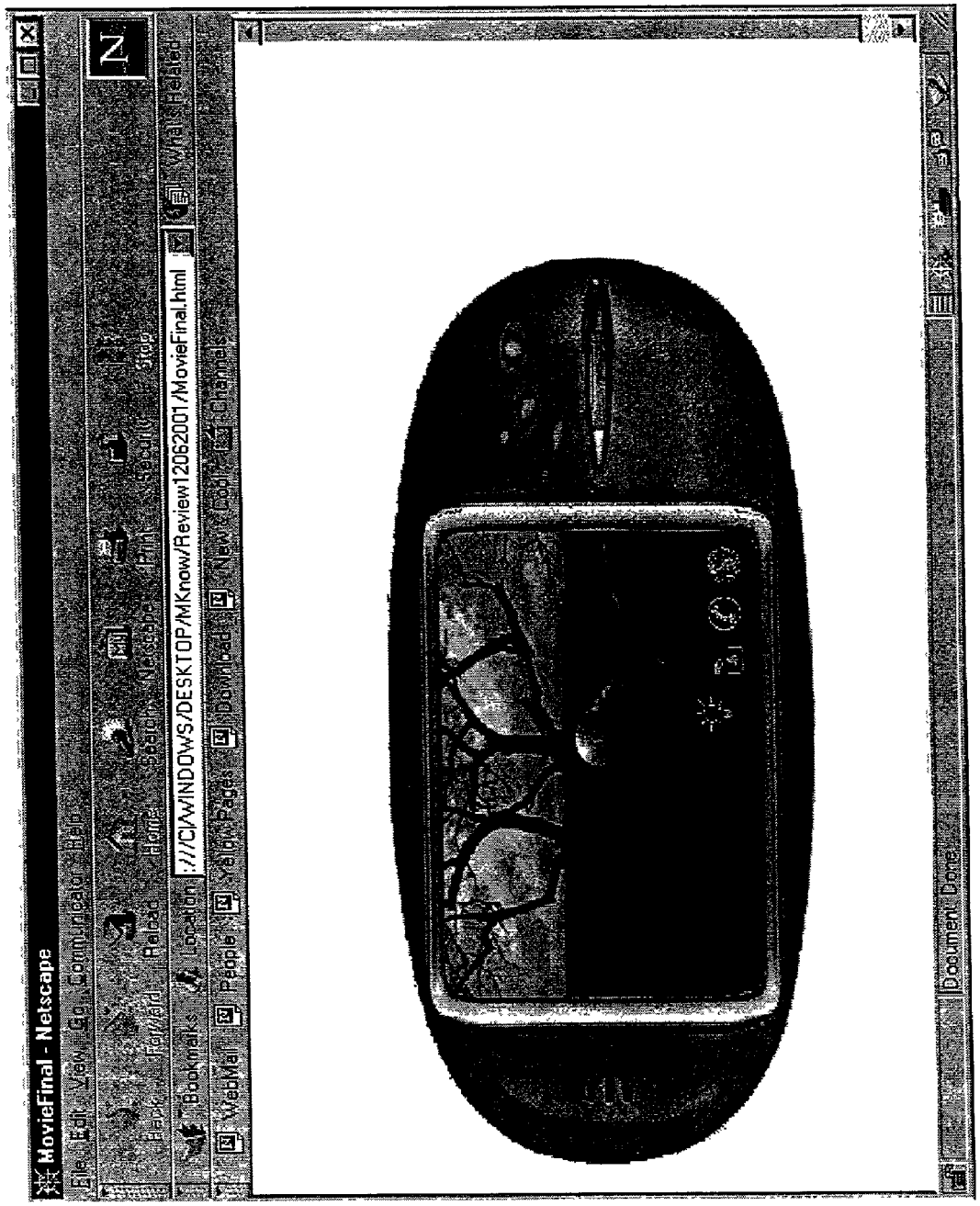
FIGS. 26A–26AE are screenshots illustrating one embodiment of the functions that may be performed on the disclosed maps.

FIGS. 26A–26AE are screen shots that illustrate one exemplary embodiment of the functions that may be performed on the created maps, in accordance with the present invention.

A new map always contains a main node to start the construction process. FIG. 26A displays a new map, whose main node has already been named by the user John Smith after himself. The lower right corner of the display contains four symbols. From left to right, they are for "Creating a new node", "Deleting a node", "Calling", and "Navigating". The first two items are fixed items (i.e., "Creating a new node" and "Deleting a node"), and the two last (i.e., "Calling" and "Navigating") are examples of user-selectable items. It should be noted that if the node is the root node of a submap, then deleting a node also causes the submap to be deleted. In the disclosed example, the user has clicked the new node symbol with a pointing device and started dragging the new node symbol towards the main node (with his own name) in order to create a new node.

Figure 26B:
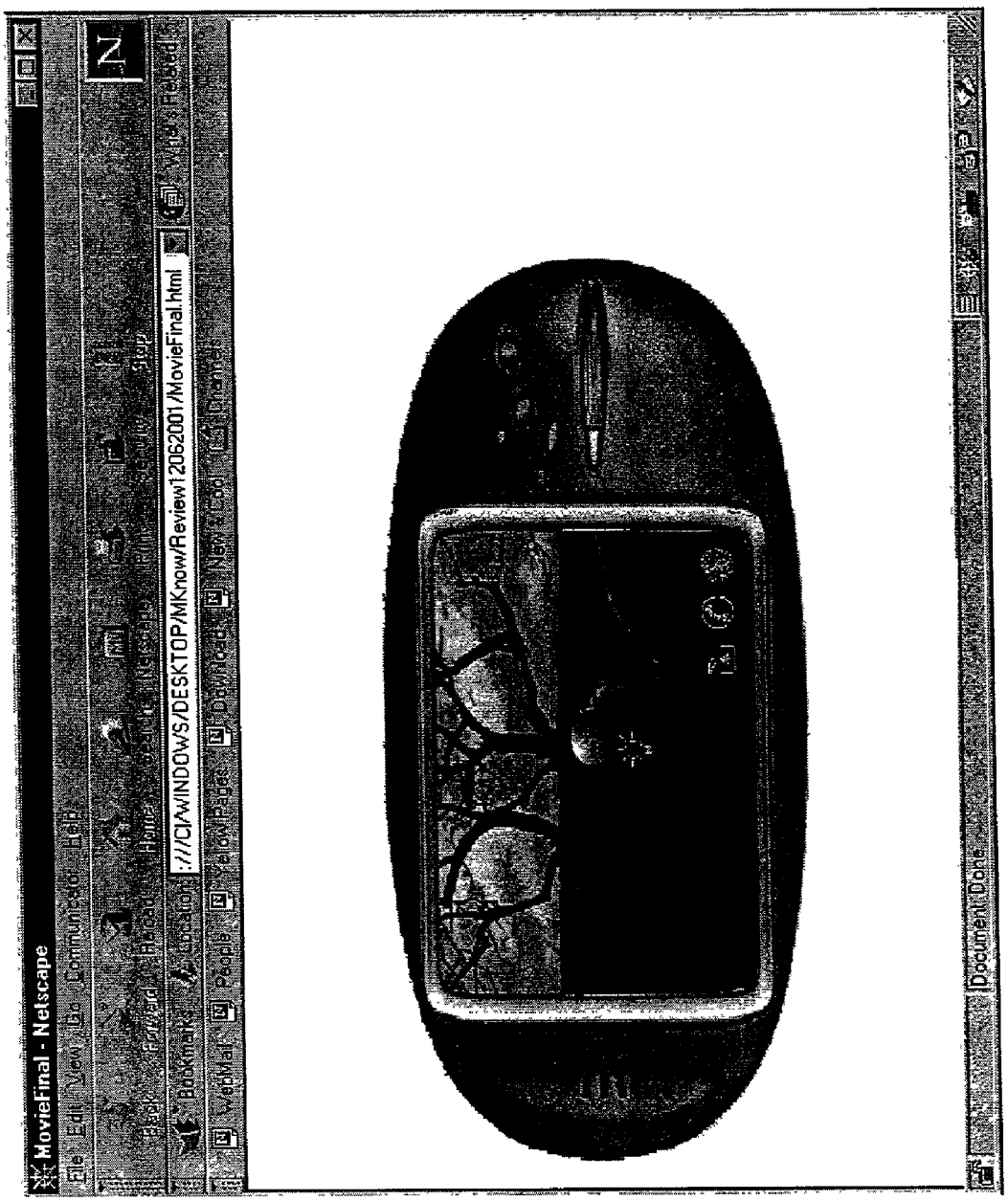

FIG. 26B displays the subsequent position of the new node symbol, where the dragging causes the new node symbol to be on top of the destination node. Here, the user releases it with the pointing device.

Figure 26C:
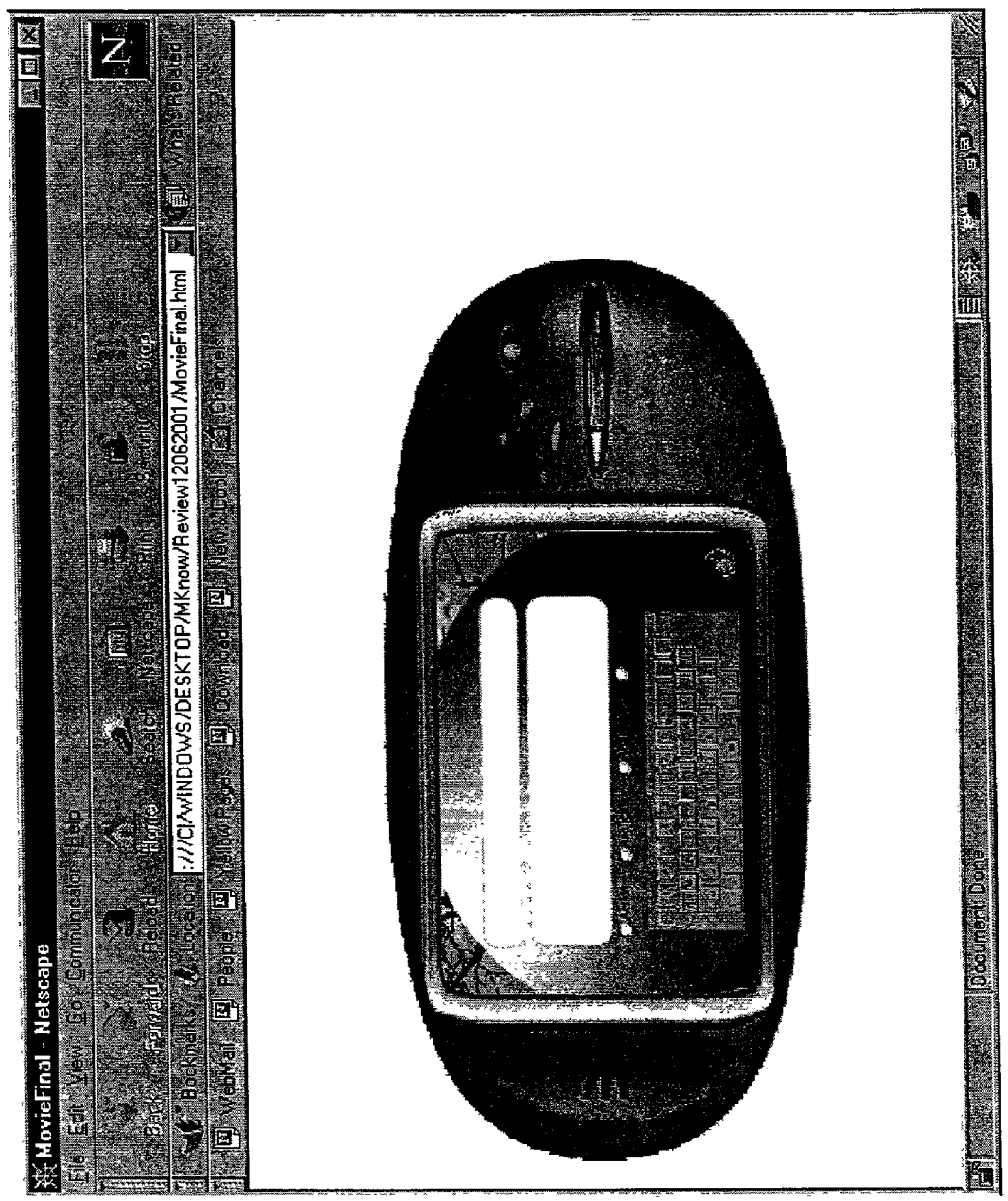

The "Mapper" now displays a form, as shown in FIG. 26C, from top to bottom with a field for the new node's name; a field for describing the node by a more detailed note; check boxes for selecting the type of node, namely Action, Application, Attachment or Outlined entry. If no selection is made, the node is considered a Note. A virtual keyboard for typing may also be part of the form. If the terminal type has a physical keyboard, the virtual keyboard may not be displayed.

Figure 26D:
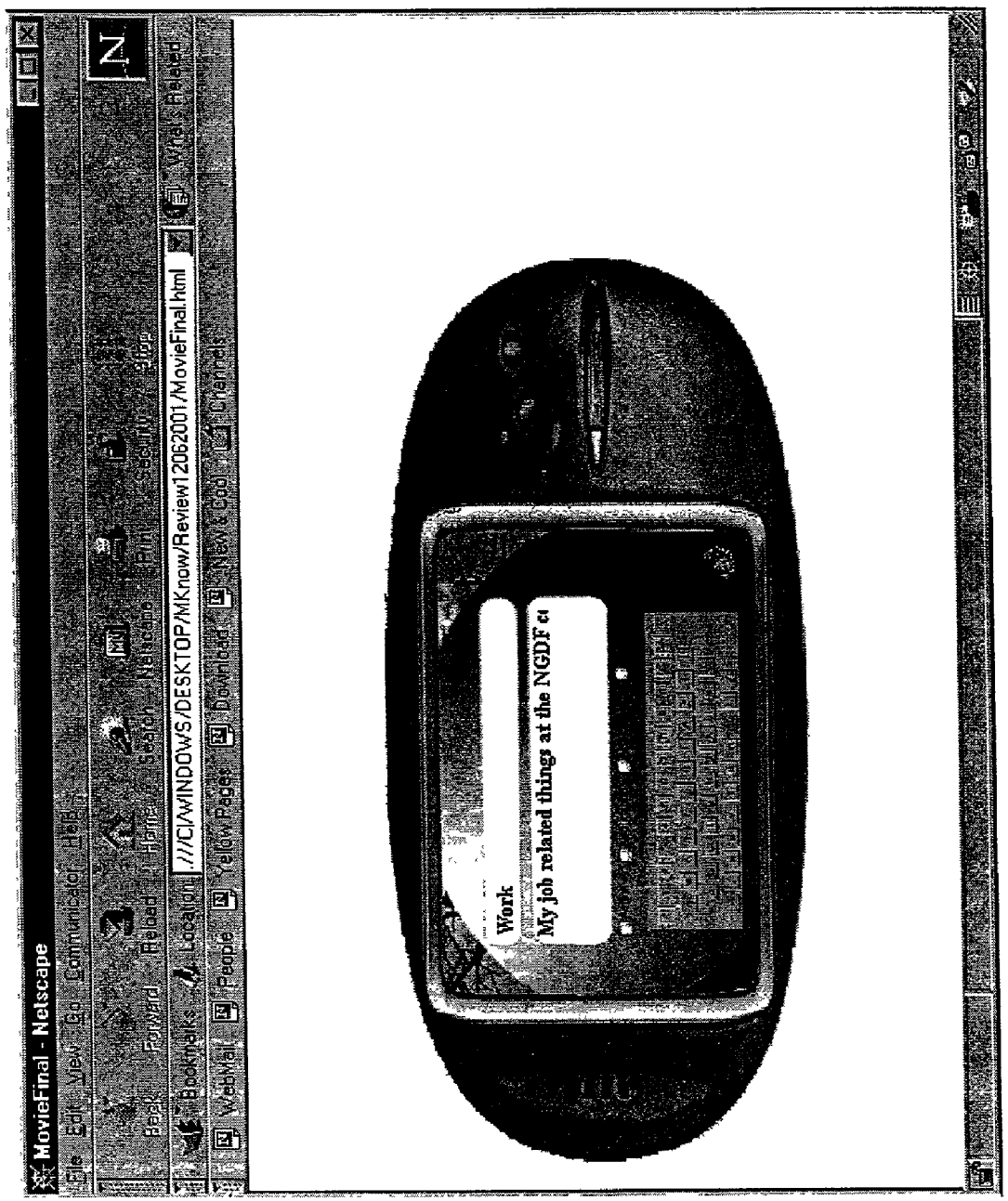

FIG. 26D displays the example where the user has completed the form. The user has given the new node the name "Work", and described the node in more detail as "My job related things at the NGDF c . . . ". As he has not checked boxes for selecting the type of node, the node is a Note.

Figure 26E:
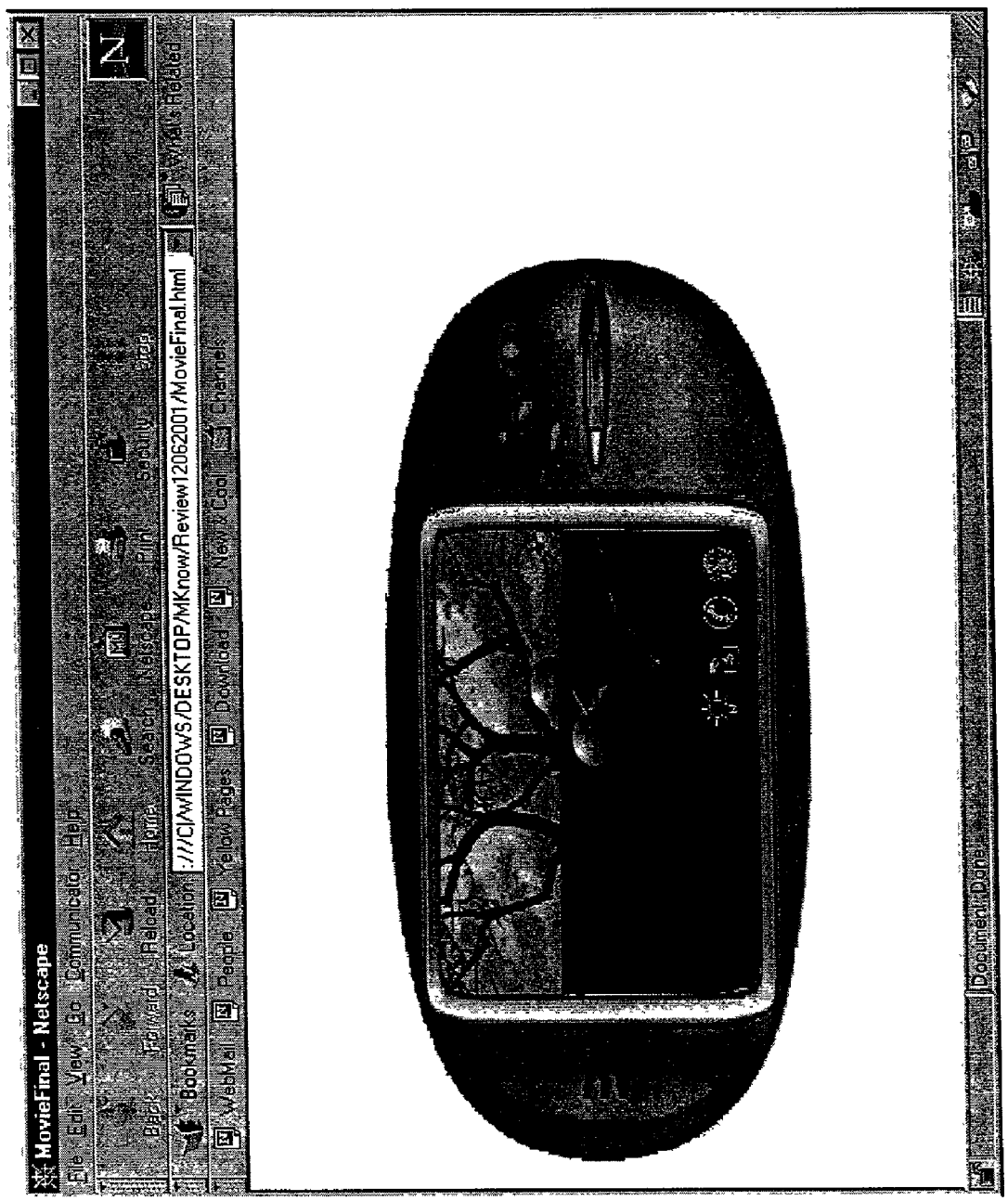

FIG. 26E displays the result. The new node "Work" has been associated to the main node "John Smith".

Figure 26F:
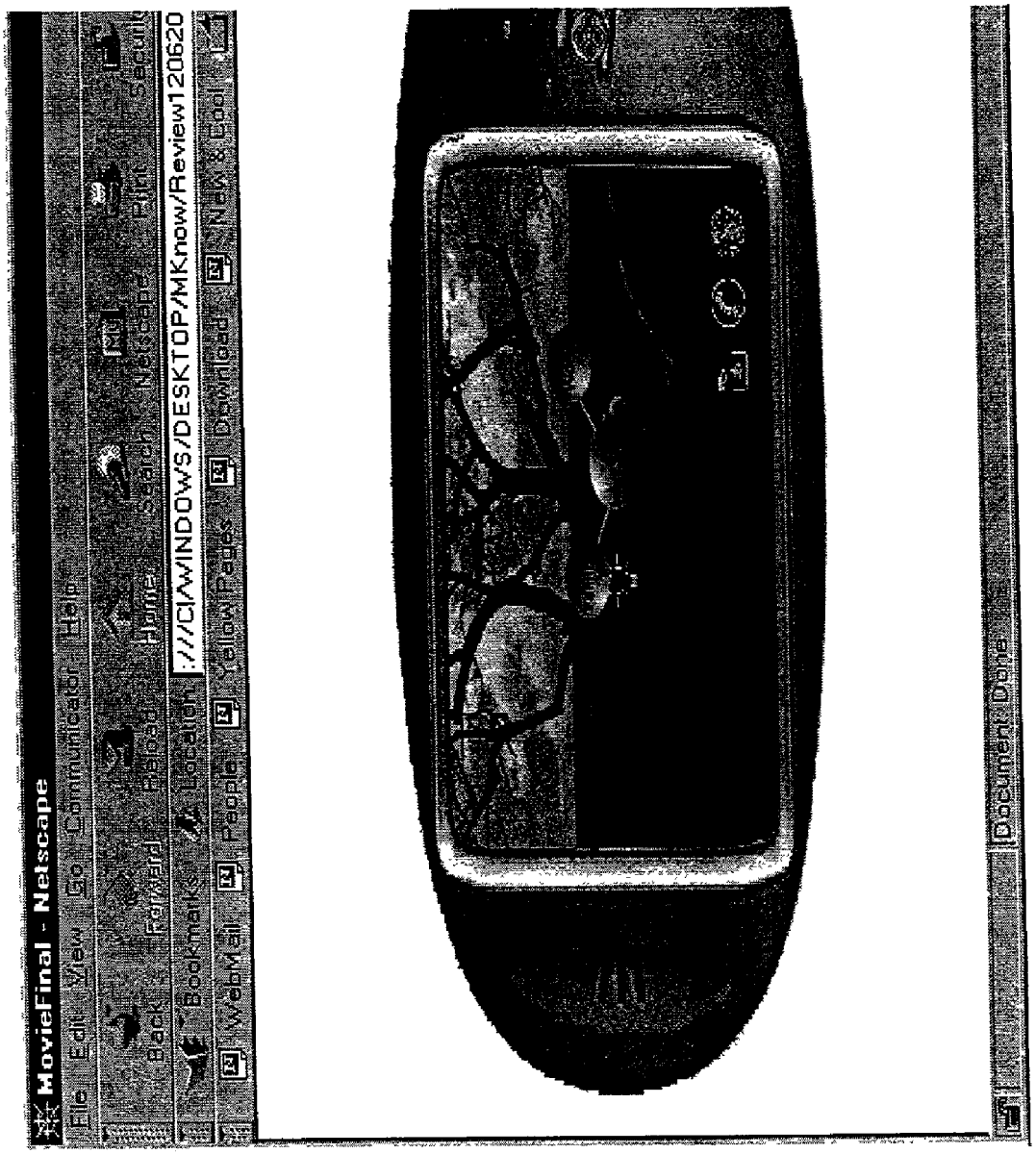

FIG. 26F displays the situation where the user is creating a new node (by the procedure just described), related to the node "Family" that he created after the node "Work". The node "Family" is a child of the main node "John Smith". The user now drags the new node symbol and drops it on the "Family" node. The user decides to construct an attachment node.

Figure 26G:
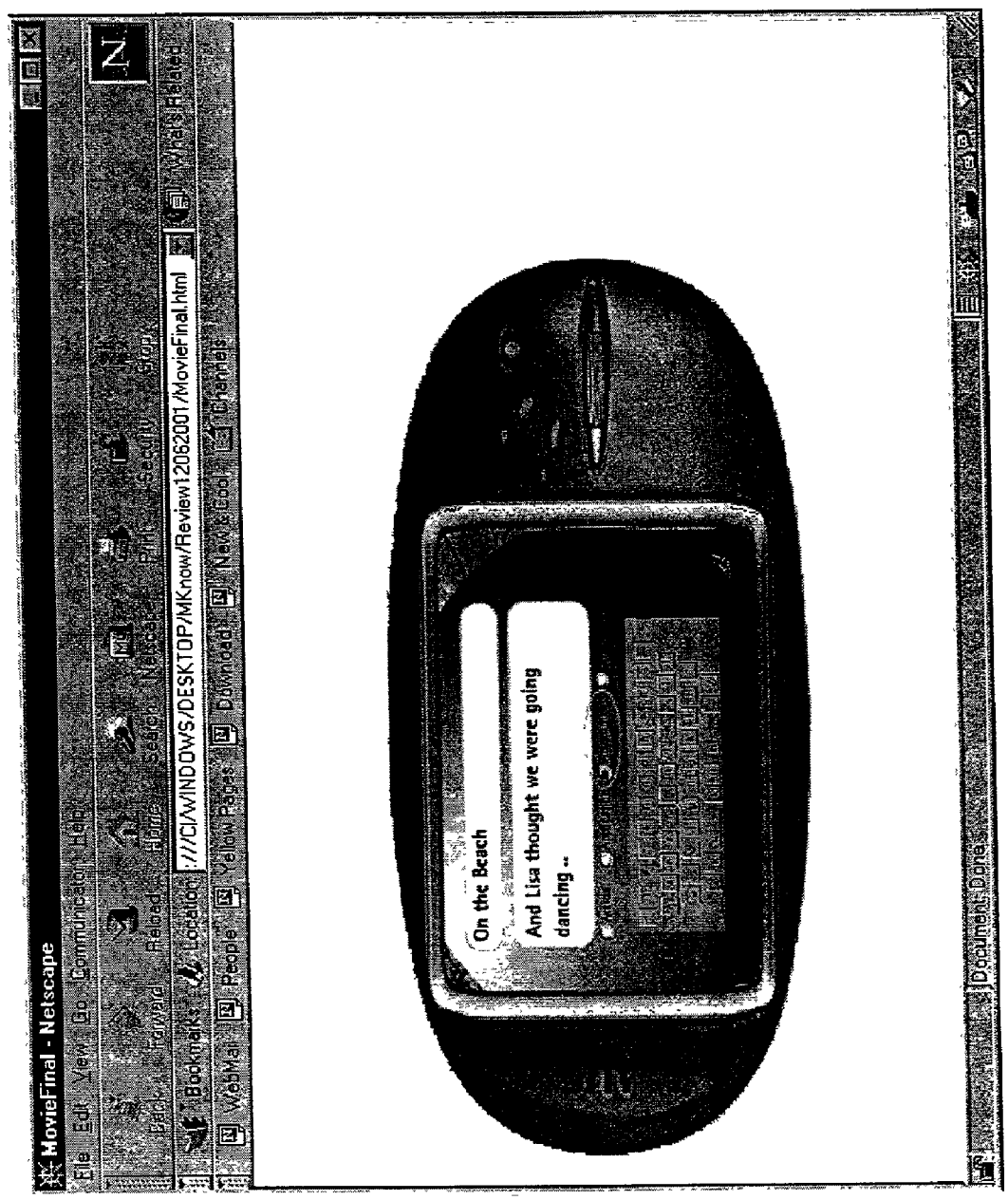
Figure 26H:
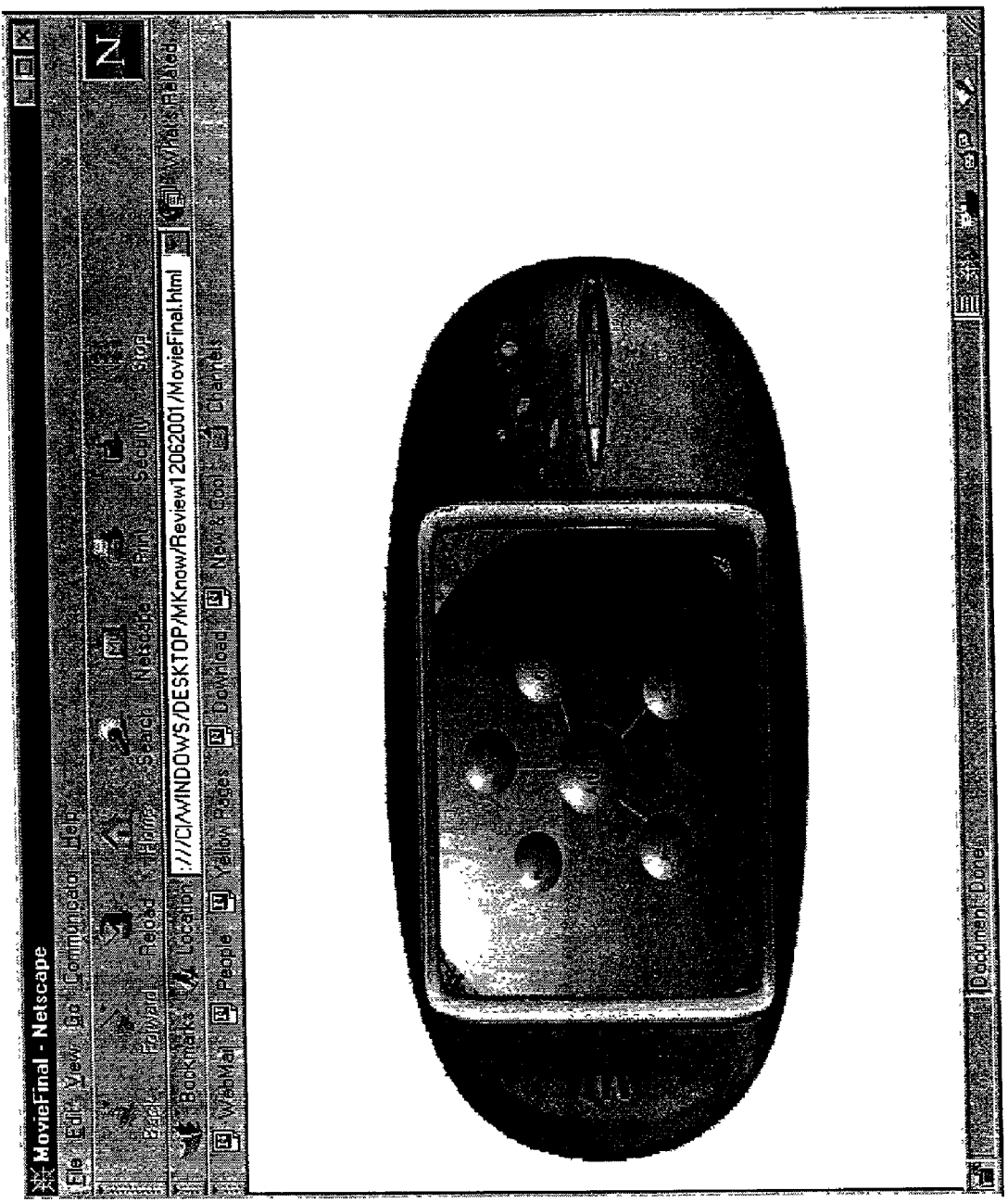
Figure 26I:
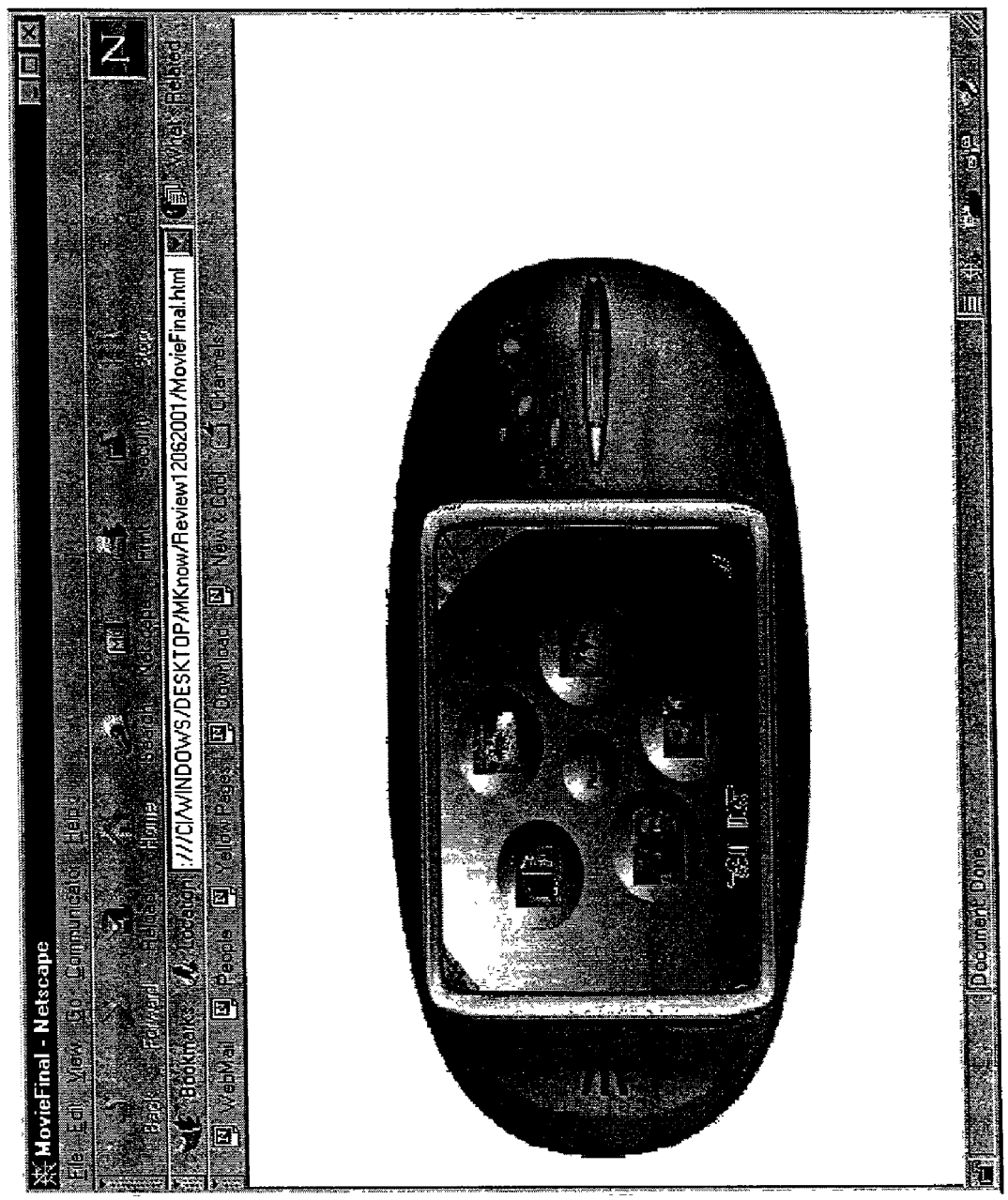

An attachment node is constructed as follows when the user checks the "Attachment" box in the form for entering the new node (FIG. 26G). In this example, the user also names the new node as "On the beach" and describes it in more detail as "And Lisa thought we were going dancing . . . ". FIG. 26H illustrates the selection of an attachment type.

In one embodiment, the user's database contains just pictures. As a result, the "Mapper" displays a selection of pictures in the user's database, in FIG. 26I. The user may rotate these pictures forwards and/or backwards by means of the two "pointing finger" symbols at the bottom of the screen. At each rotational step, a picture is replaced by a new one from the database (if possible), so that the user can scroll through his entire collection of pictures. The user makes selections by clicking a picture with a pointing device.

Figure 26J:
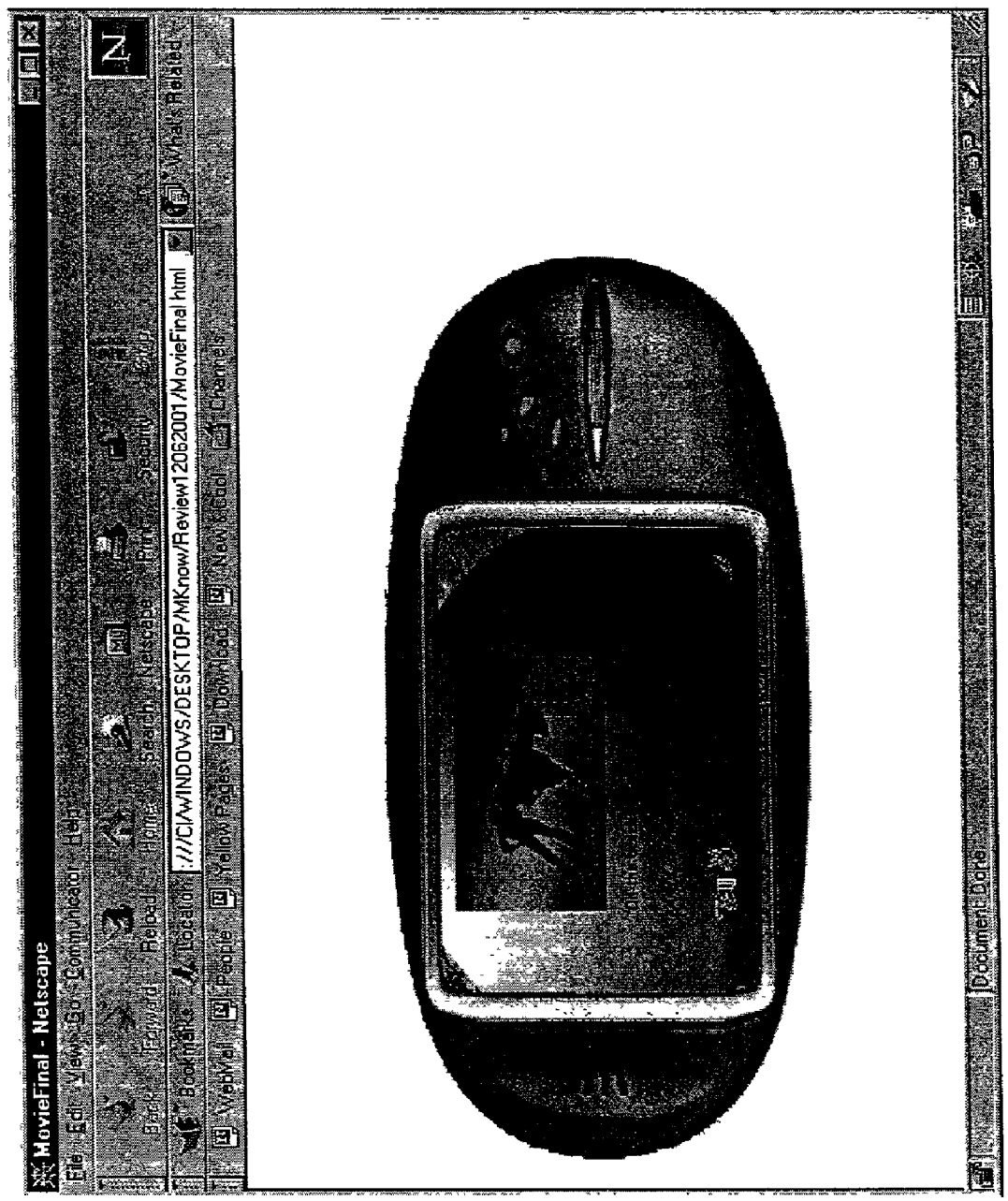

FIG. 26J displays the result of selecting a picture. The result includes the composition of the selected picture, the name of the node and a more detailed description. At the bottom of the screen, there are symbols for returning to the previous screen to undo the picture selection (i.e., finger pointing to the left), and for accepting the selected choice (i.e., fingers in OK position).

Figure 26K:
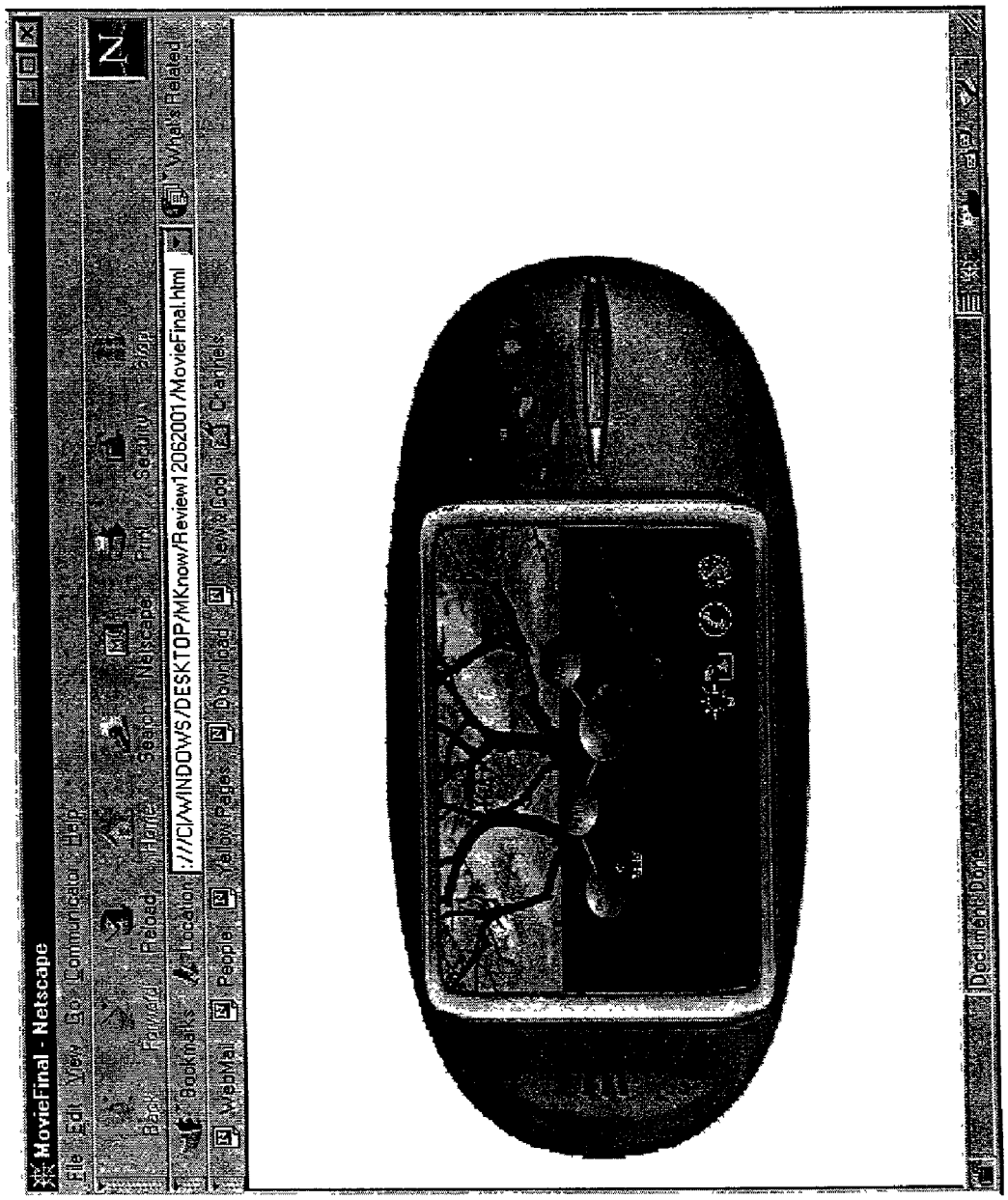
Figure 26L:
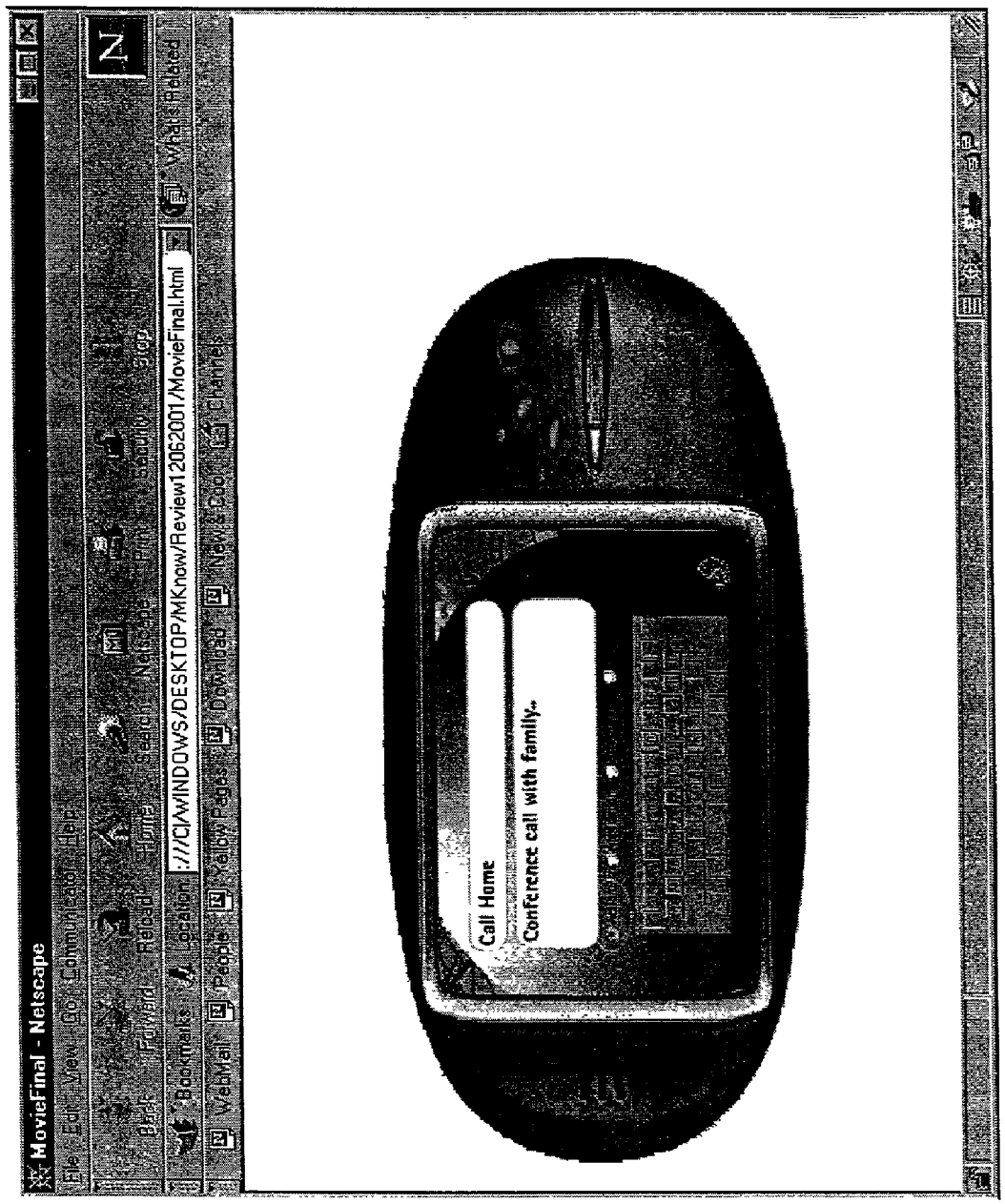
Figure 26M:
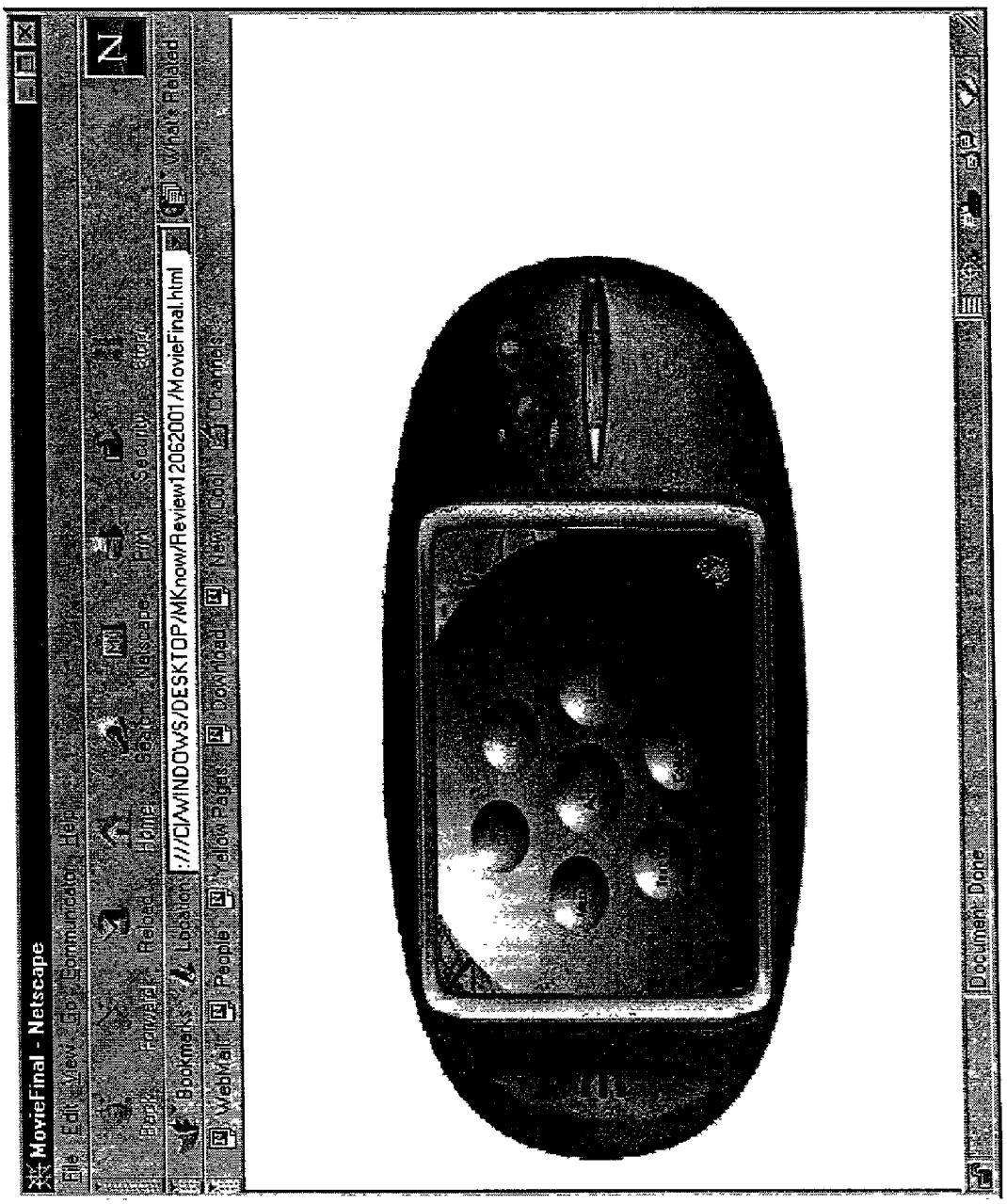
Figure 26N:
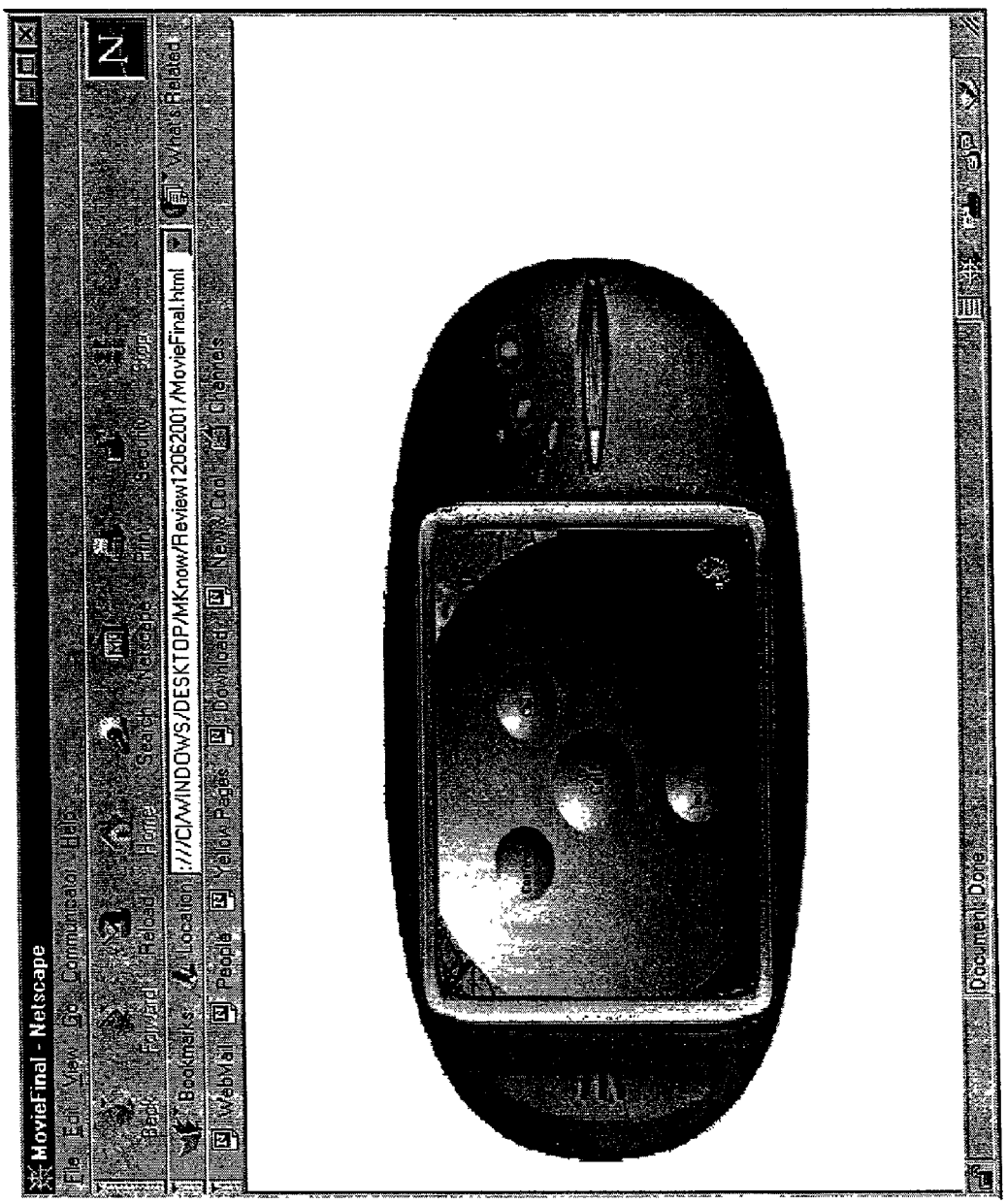
Figure 26O:
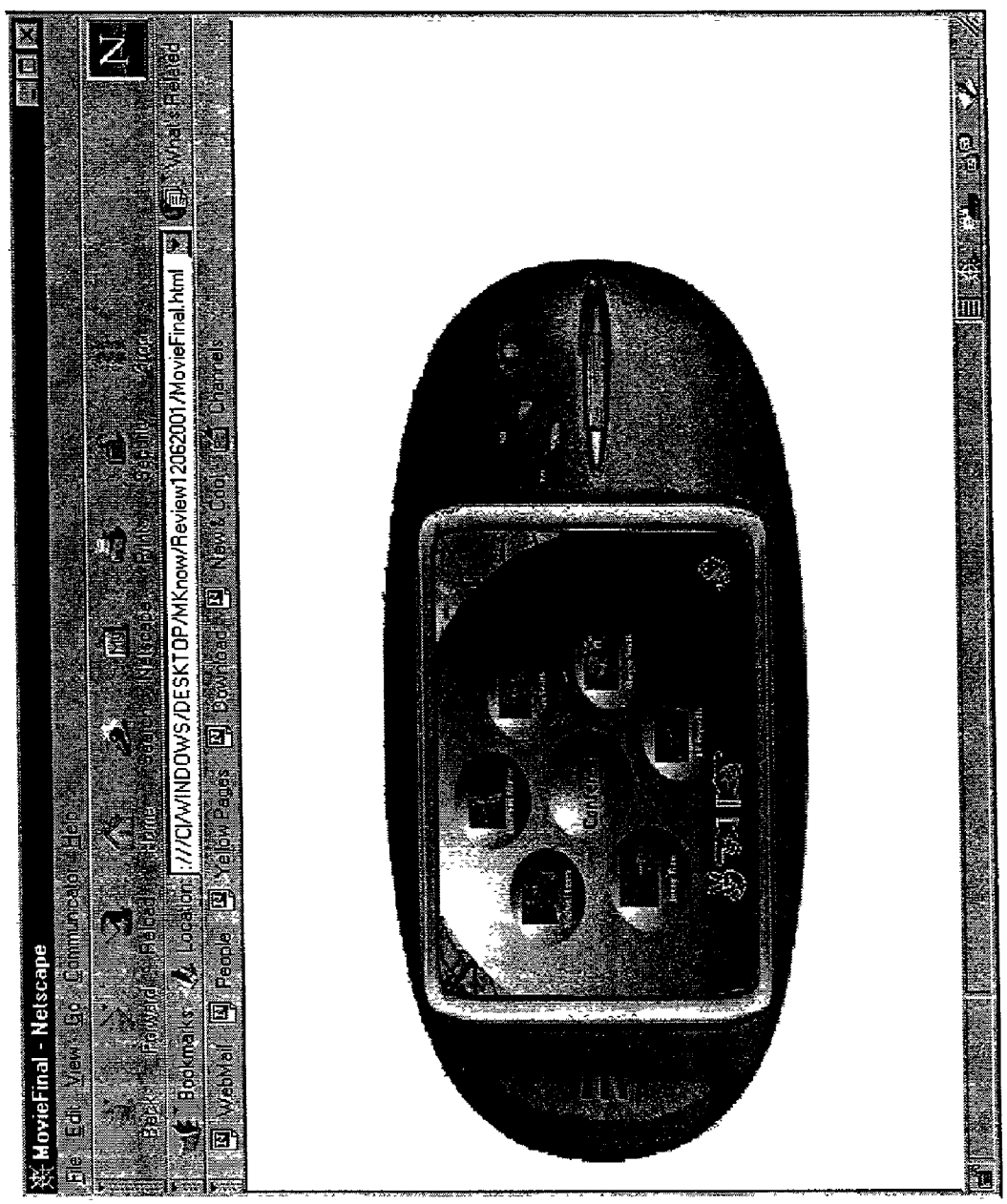
Figure 26P:
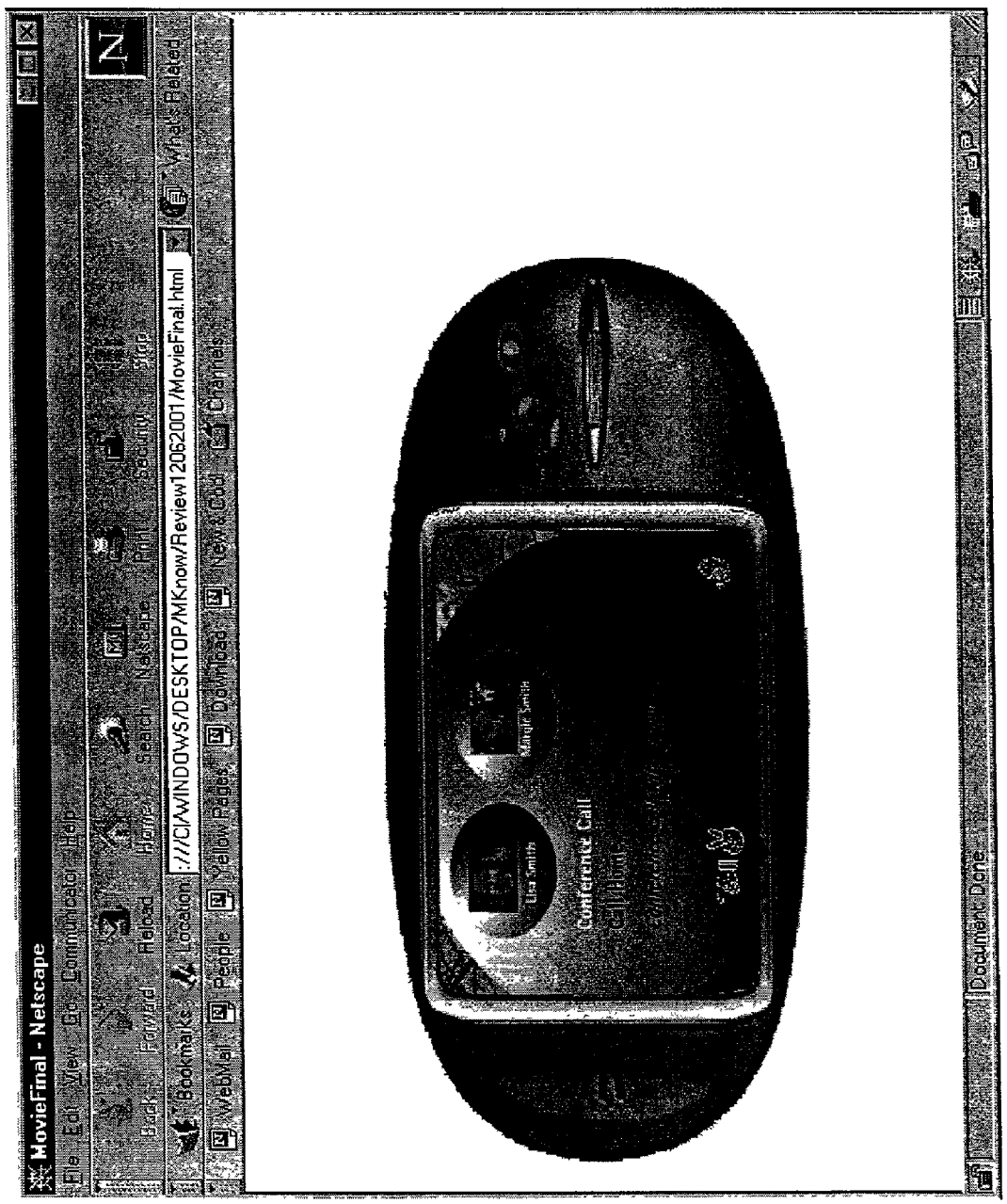

FIG. 26K shows the resulting new node "On the beach" with a symbol that indicates the type of the attached file, i.e. picture in this case. Thus, the user records the steps of making a conference call to his family.

FIGS. 26L–26P illustrate the process of making a conference call.

Figure 26Q:
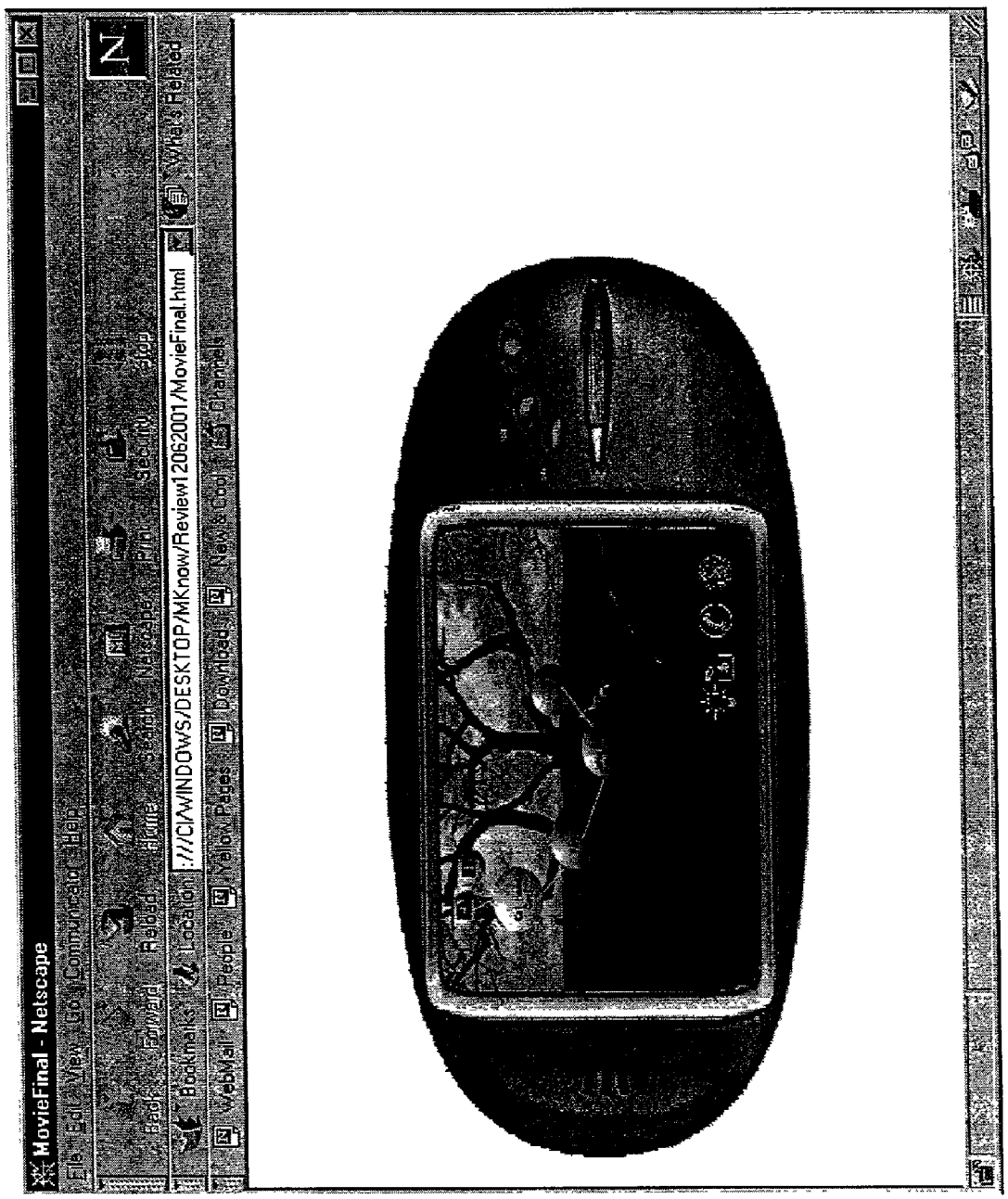

FIG. 26Q displays the result of accepting the selections. A new action node for carrying out a conference "call home" is displayed. It is related to the node "Family", and also displays the pictures of the other participants. After defining an action like this, the user may perform the action by double-clicking the node with a pointing device when it is at the center of the display. The "Mapper" moreover allows the user to customize his UI completely with respect to associating actions to the place where they belong on his map in terms of his personal preference. Thus the "Conference Call with Family" node is naturally associated to the "Family" node.

Figure 26R:
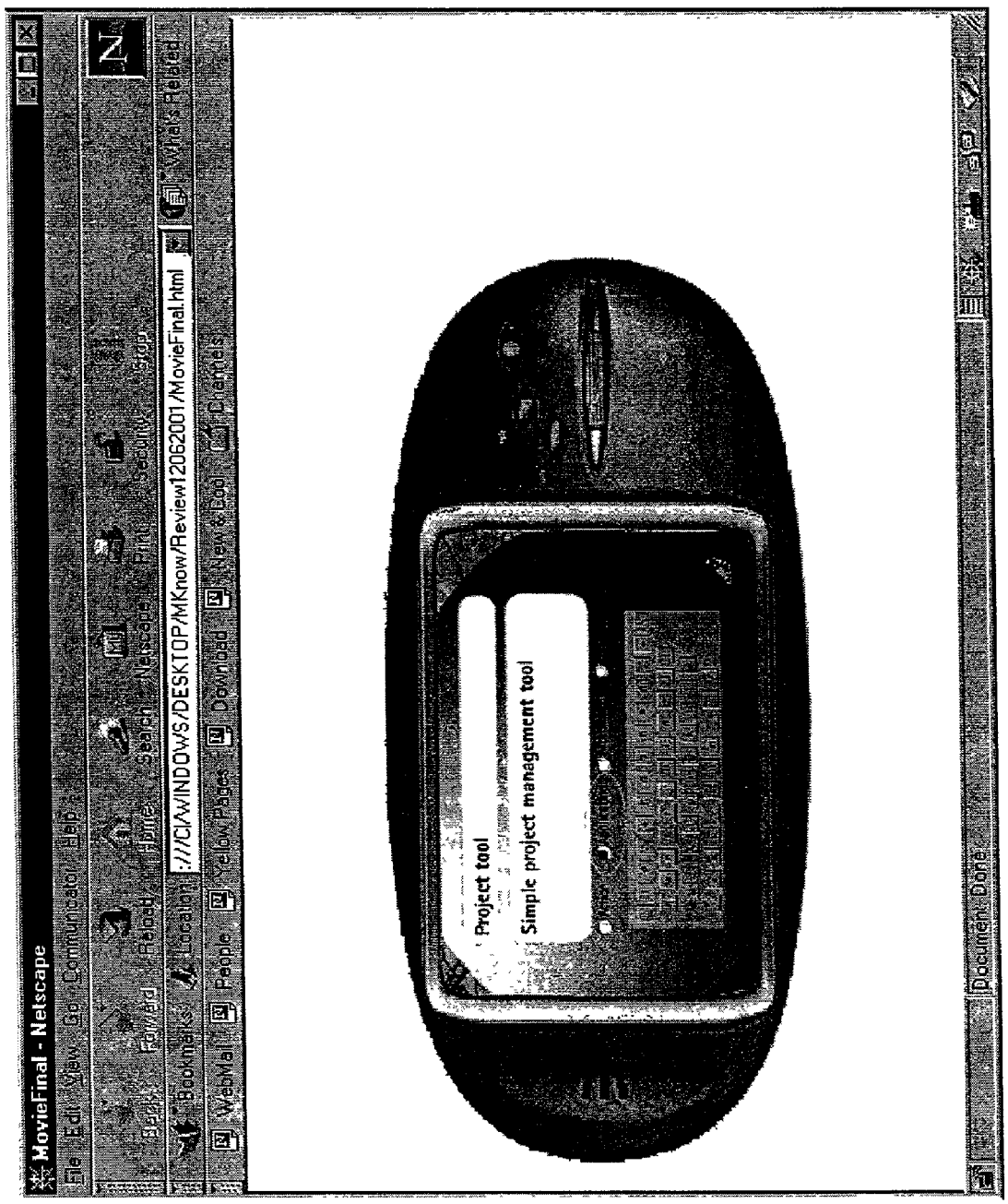

An application node may also be constructed. First, the user creates a new node with the procedure described above, by dragging the new node symbol and dropping it on, for example, the node "Work". At the description form (shown in FIG. 26R) of the new node, the user checks the "Application" selection. In the present example, the user constructs a node for a project tool application and thus names the node "Project tool" and describes it further as "Simple project management tool".

Figure 26S:
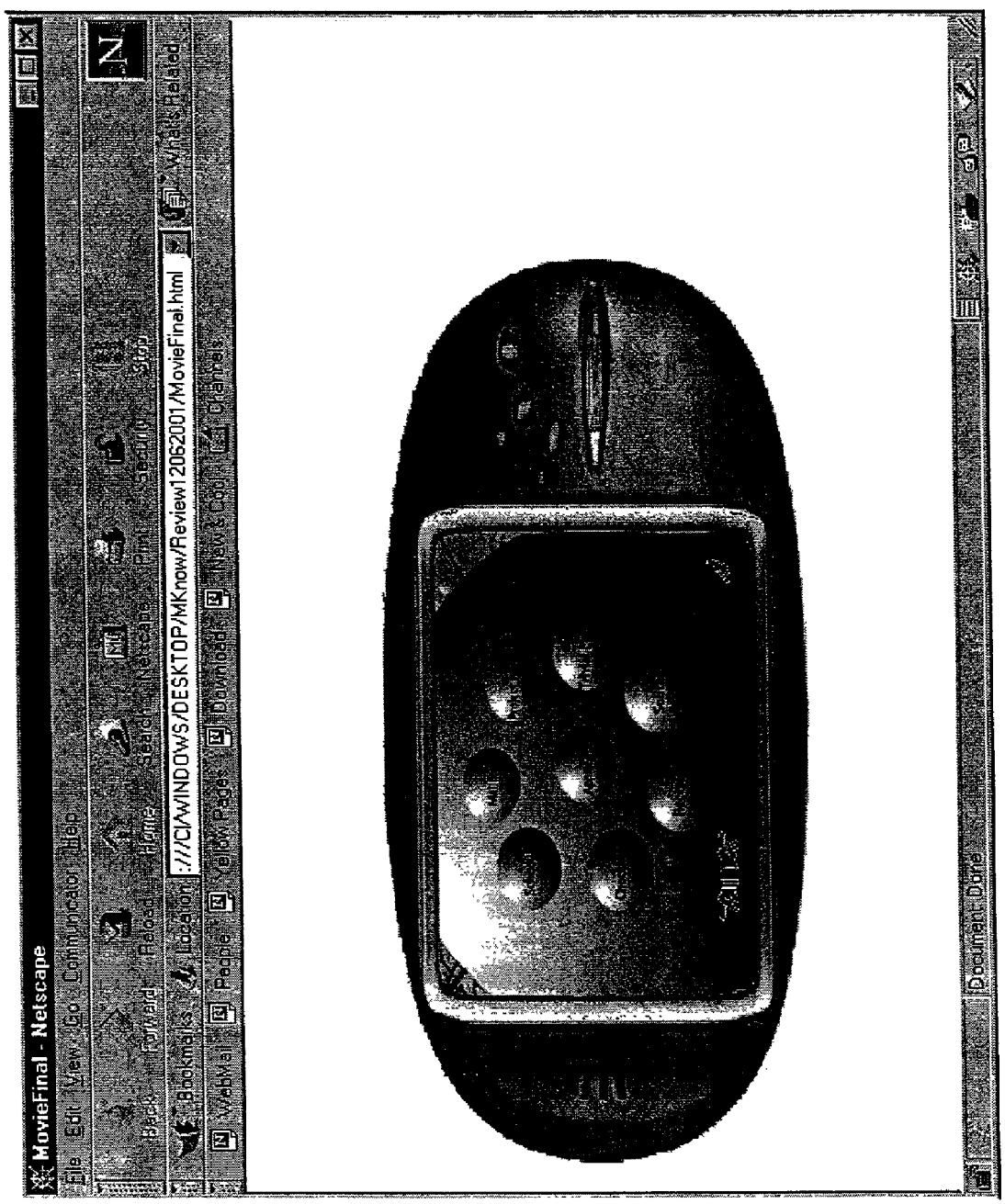

As a result, the "Mapper" displays a selection of available applications, as shown in FIG. 26S. In the manner described above in connection with FIG. 26I, the user may scroll through other possible applications by means of the two "pointing finger" symbols at the bottom of the display. The user selects the "Project Management" alternative by a pointing device.

Figure 26T:
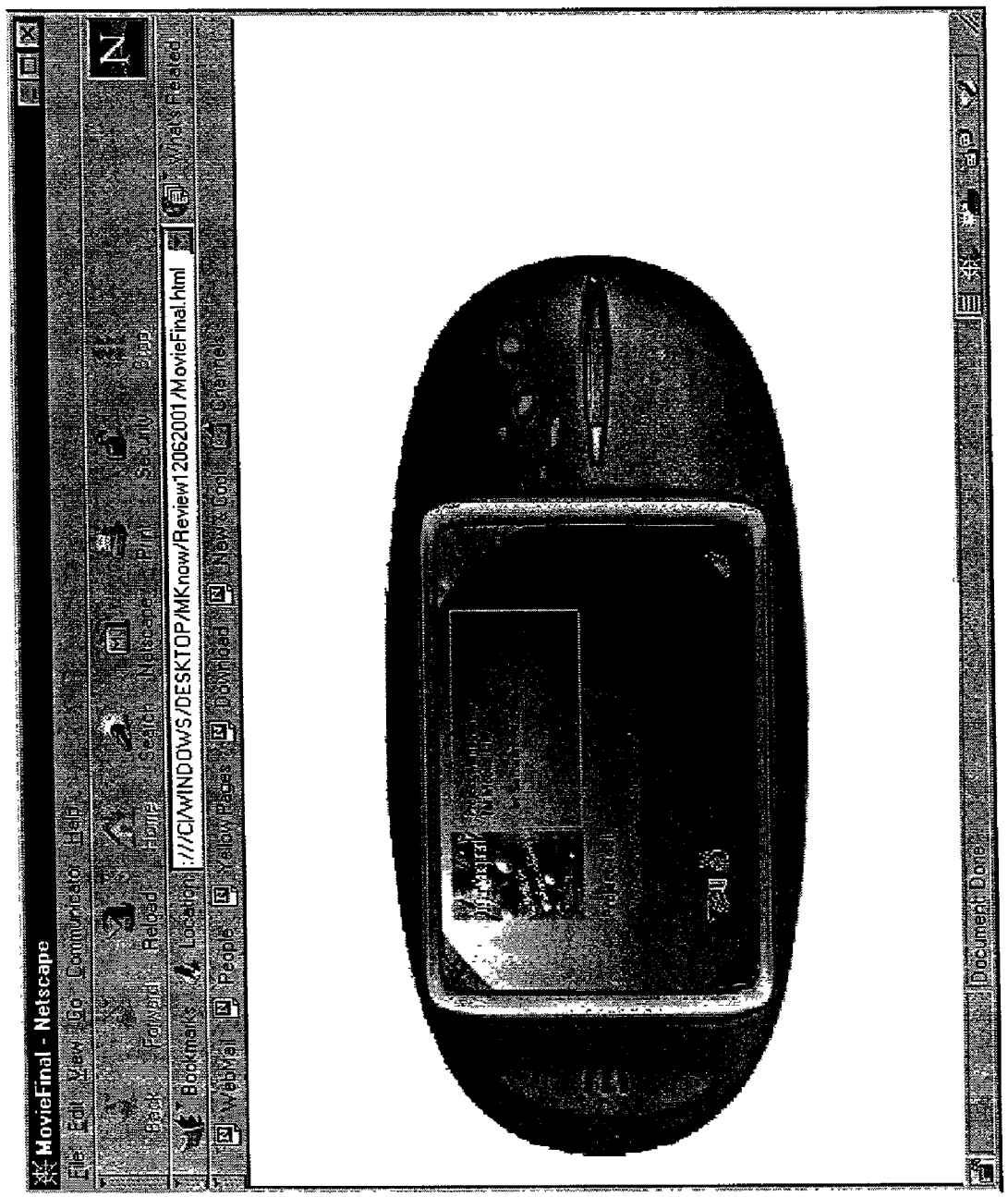

FIG. 26T shows the composition that results from the inputs given and selections made. The user may now redo the selections or accept them, using the two symbols at the bottom of the screen in the manner described in connection with FIG. 26J.

Figure 26U:
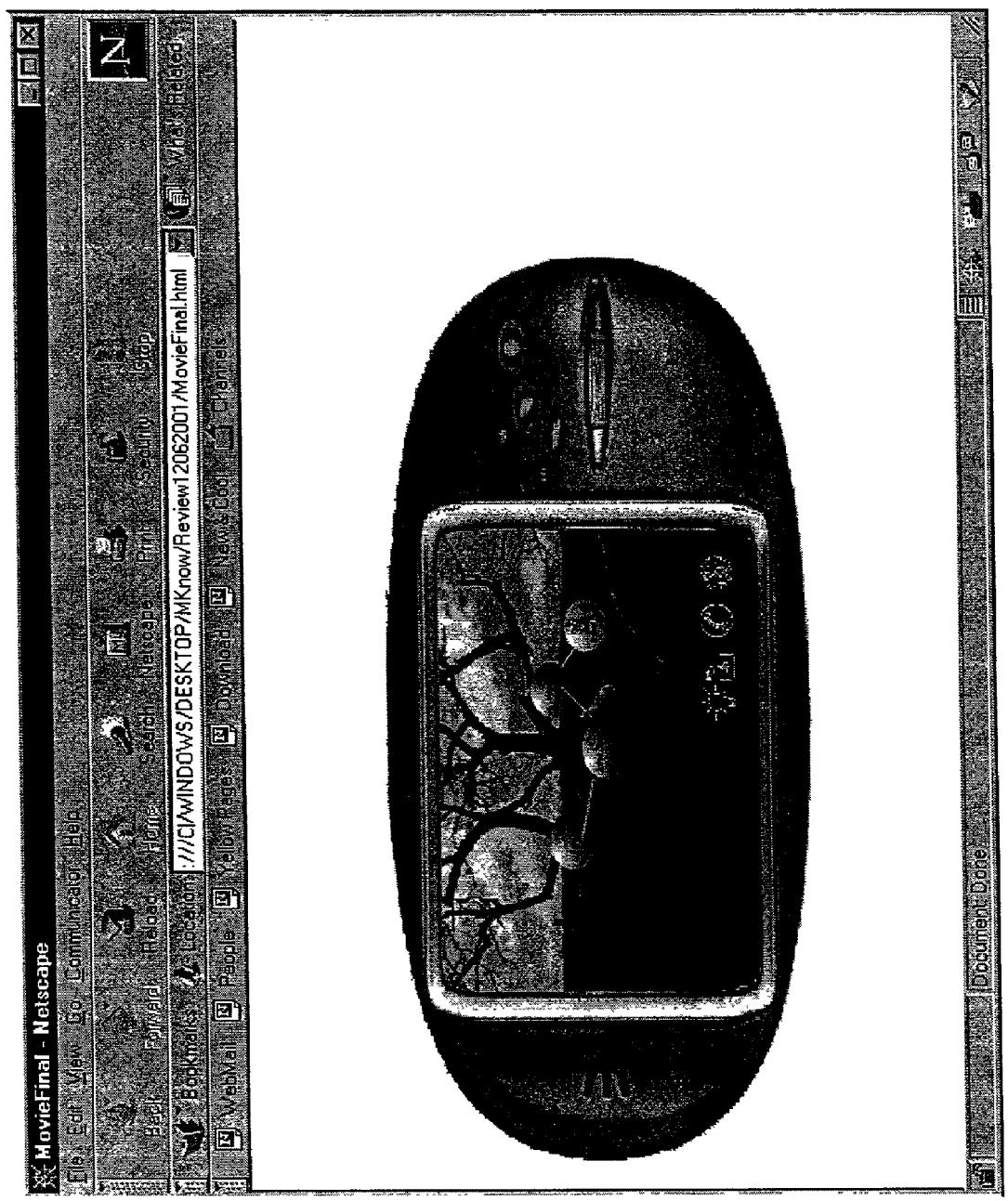

FIG. 26U displays the result, namely the new node that has been associated to the "Work" node.

An example of a construction of an outlined entry is provided below. First, the user creates a new node with the procedure described above, by dragging the new node symbol and dropping it on, for example, the node "Review" which he has already created so that it is associated to the "Work" node. The user may now construct an outlined time entry node for the work review.

Figure 26V:
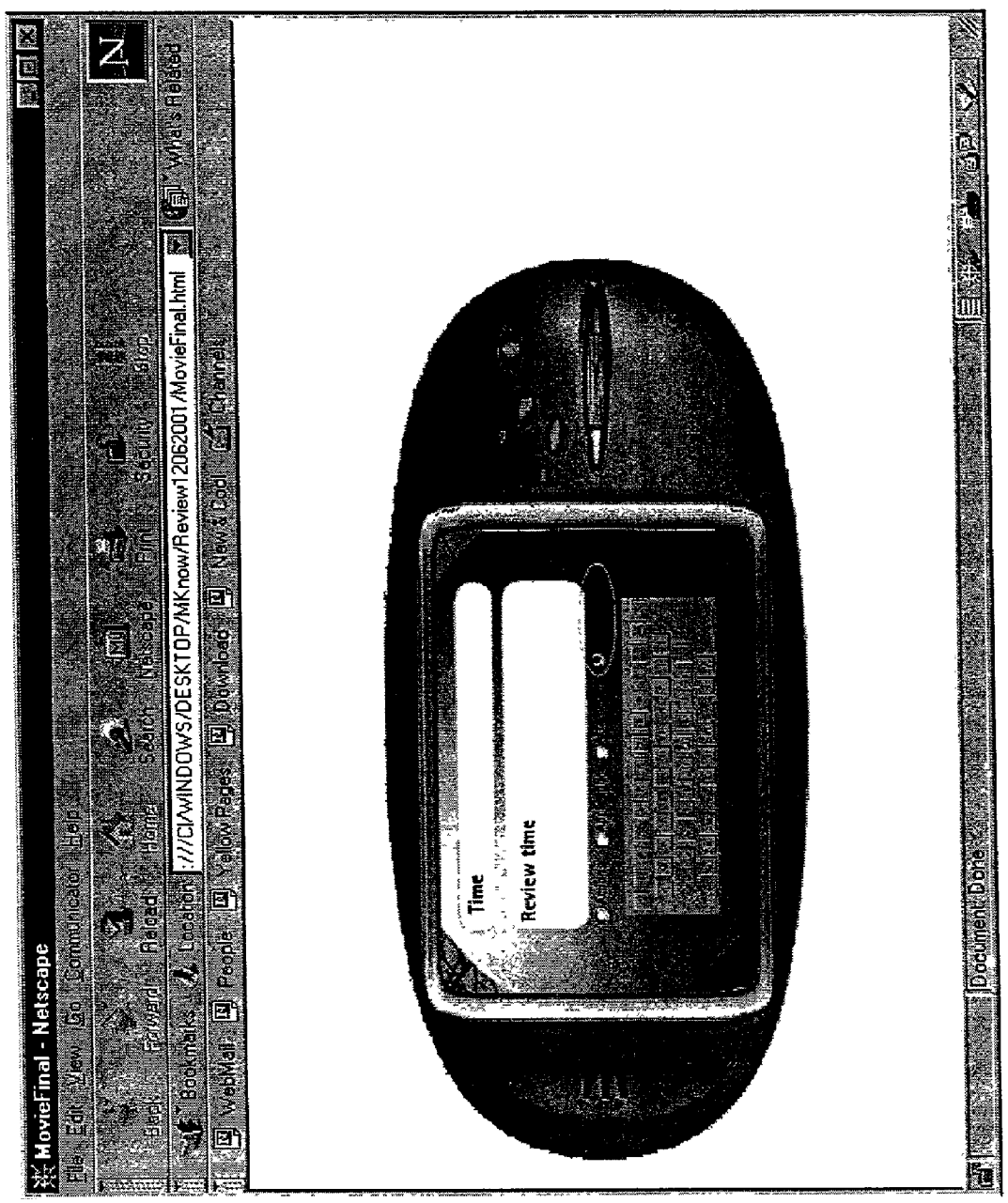

FIG. 26V displays the node description form. The user enters the name "Time", the more detailed description "Review time", and checks the selection for "Outlined entry".

Figure 26W:
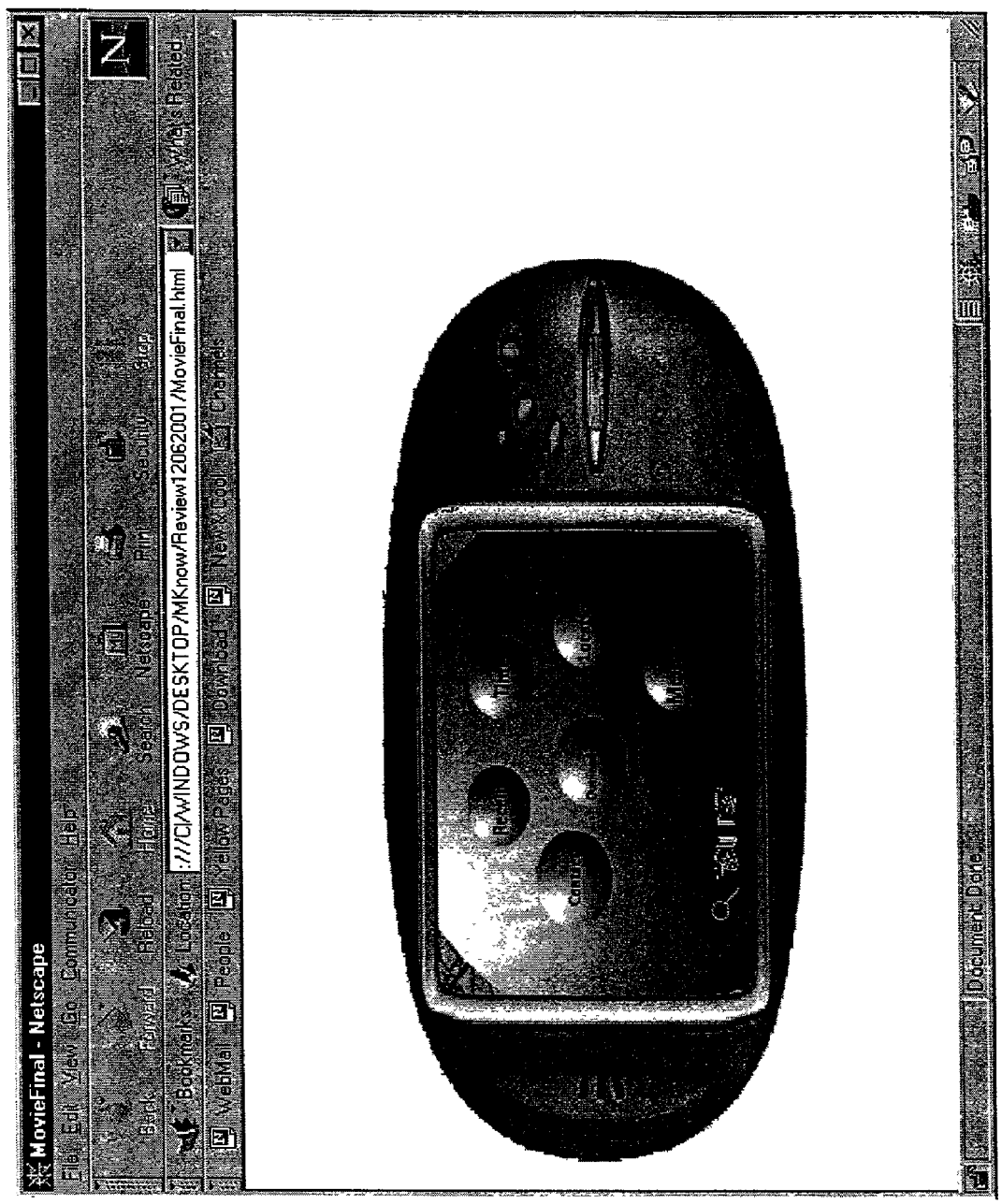
Figure 26X:
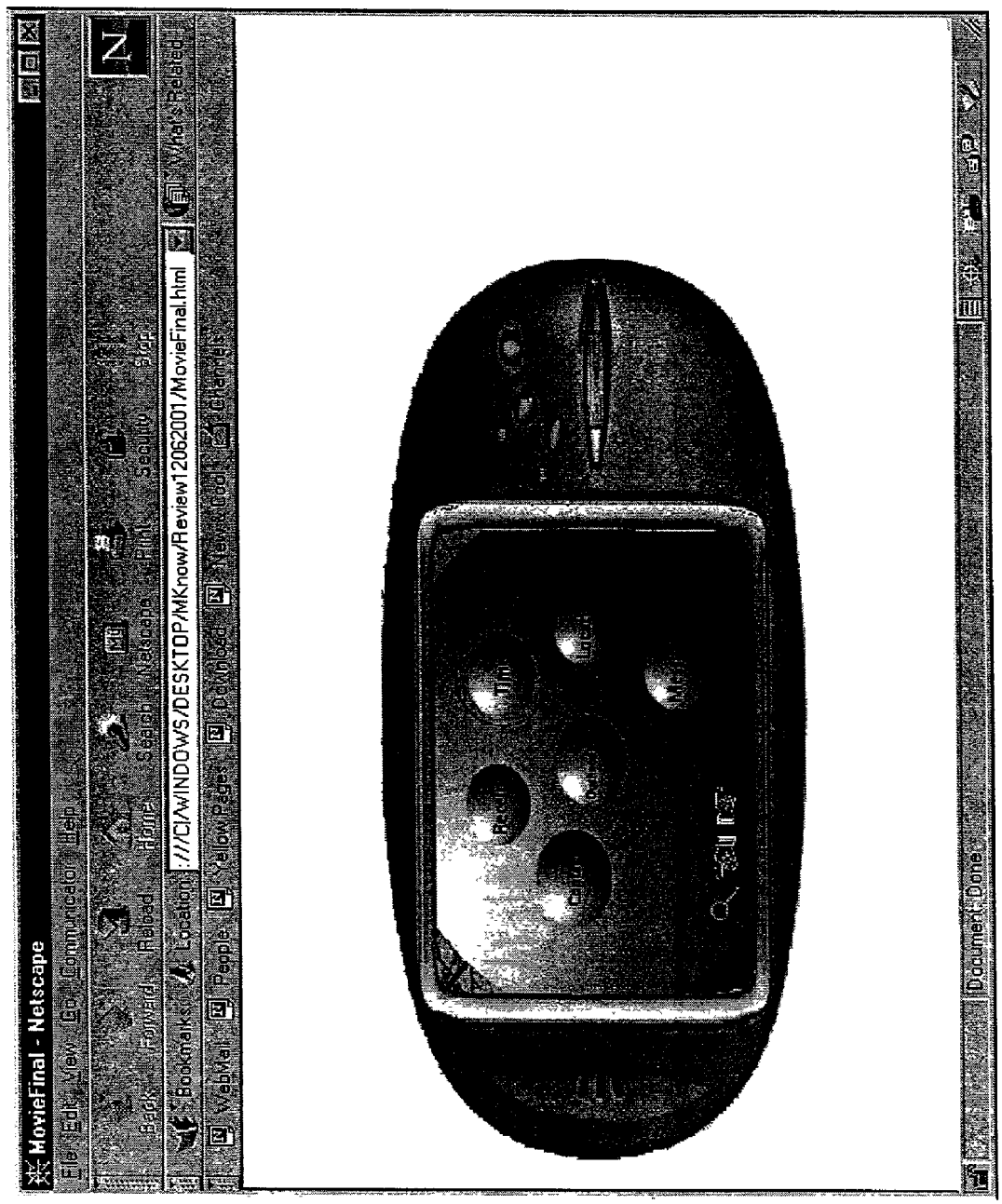

As a result, the "Mapper" displays a selection of possible Outlined entry types, as shown in FIG. 26W. In one embodiment, the possible Outlined entry types are Contact, Recipe, Time, Location, and Message. There may be more Outlined entry types, and these further possible selections may be scrolled by means of the "pointing finger" symbols at the bottom of the screen as in FIG. 26J. The user selects "Time", as shown in FIG. 26X.

Figure 26Y:
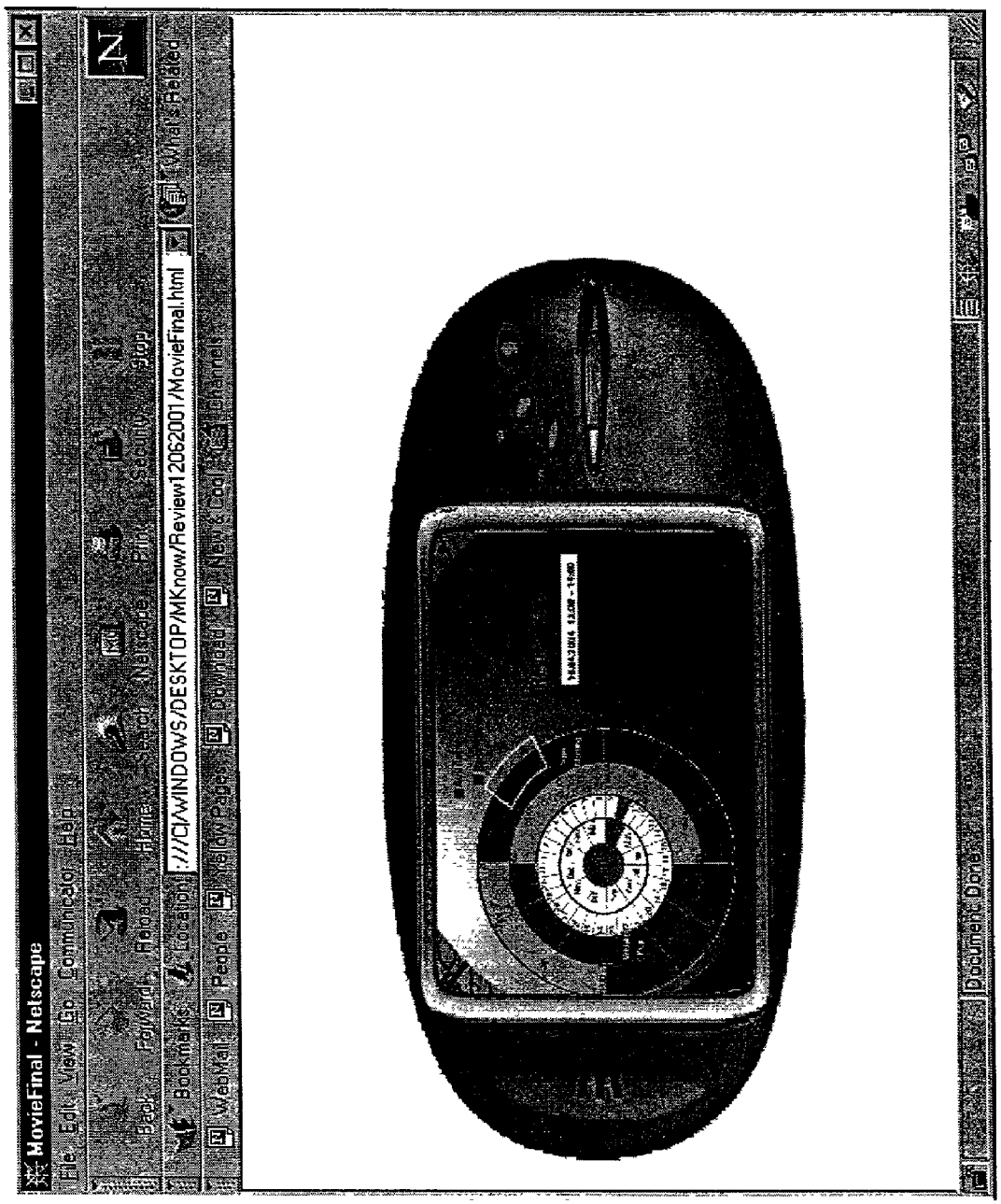

The "Mapper" then displays the user's calendar in a personally customized form. In one embodiment, a circular form is used, such as in FIG. 26Y. FIG. 29 will describe the time display algorithm for this calendar. The calendar shows the busy and available times of the user for a given year, month, day, and time. The center of the circle shows the year, and the concentric rings from center show the month, day, and time respectively. There are two rings for time. The innermost shows the hours from midnight to noon, and the outermost from noon to midnight. The month ring is divided into twelve equal numbered compartments, one for each month. Similarly, the day ring is divided into 28 to 31 equal numbered compartments, depending on the month. And similarly, the two time rings are divided into twelve equal numbered compartments each, the innermost one from 00:00 to 12:00, and the outermost one from 12:00 to 24:00.

Colors may be used to illustrate times. For example, red color may indicate a busy time, and green color may indicate free time. The user may conveniently check his free and busy time for a given occasion by first selecting a month and then a day by a pointing device. The year, by default, may be the present year, but could be changed. The changing may take place by first selecting the center area of the circle by a pointing device, then entering a New Year into a resulting input field, preferably in the center area of the circle itself, then selecting a month, and finally selecting a day.

In the illustrated example, the user enters the time 13:00–14:00, 10.4.2004 for the review by selecting that area in the calendar with a pointing device, and as a result the "Mapper" encircles that area in the calendar and displays the selected time beside the calendar.

Figure 26Z:
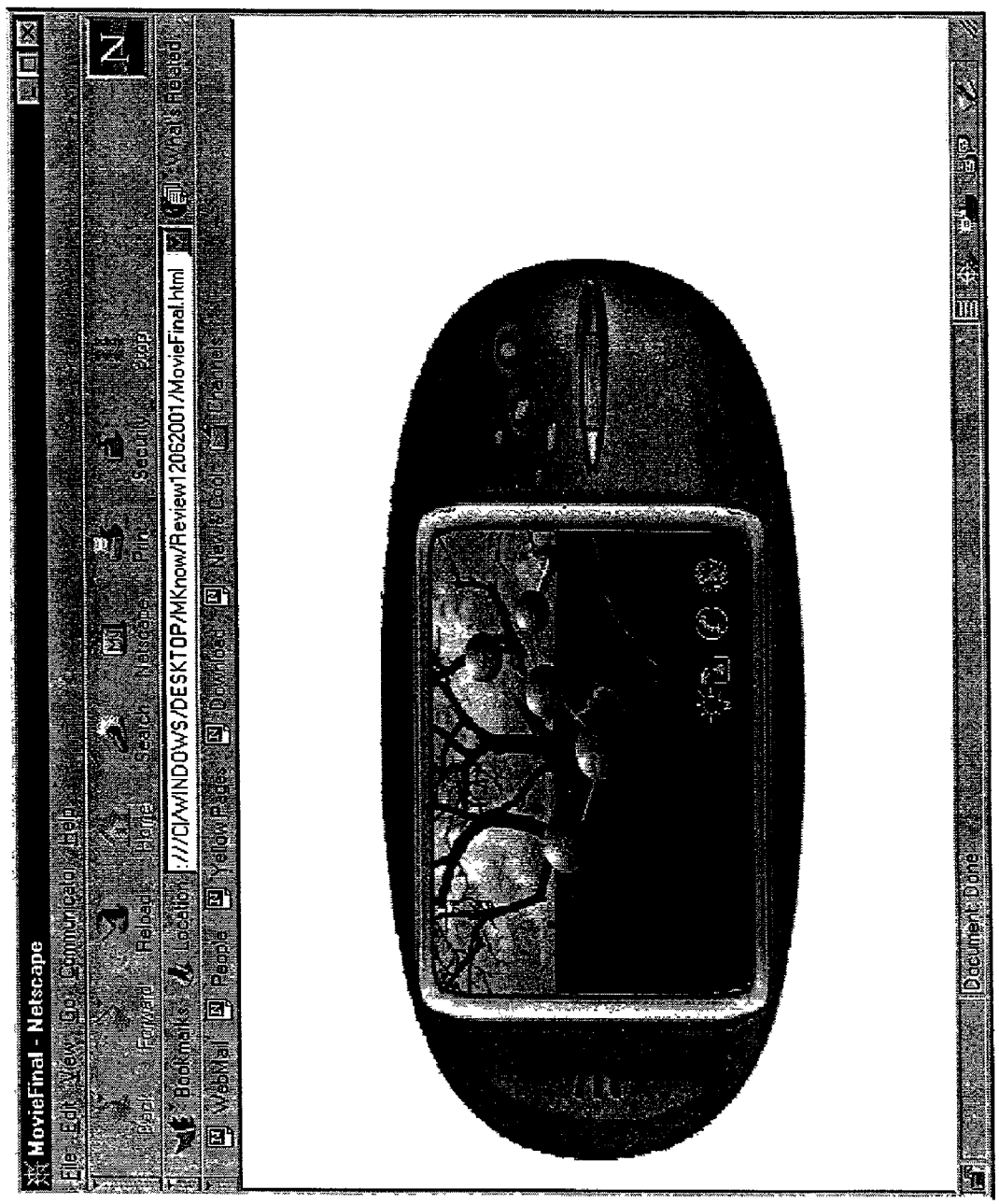
Figure 26A:
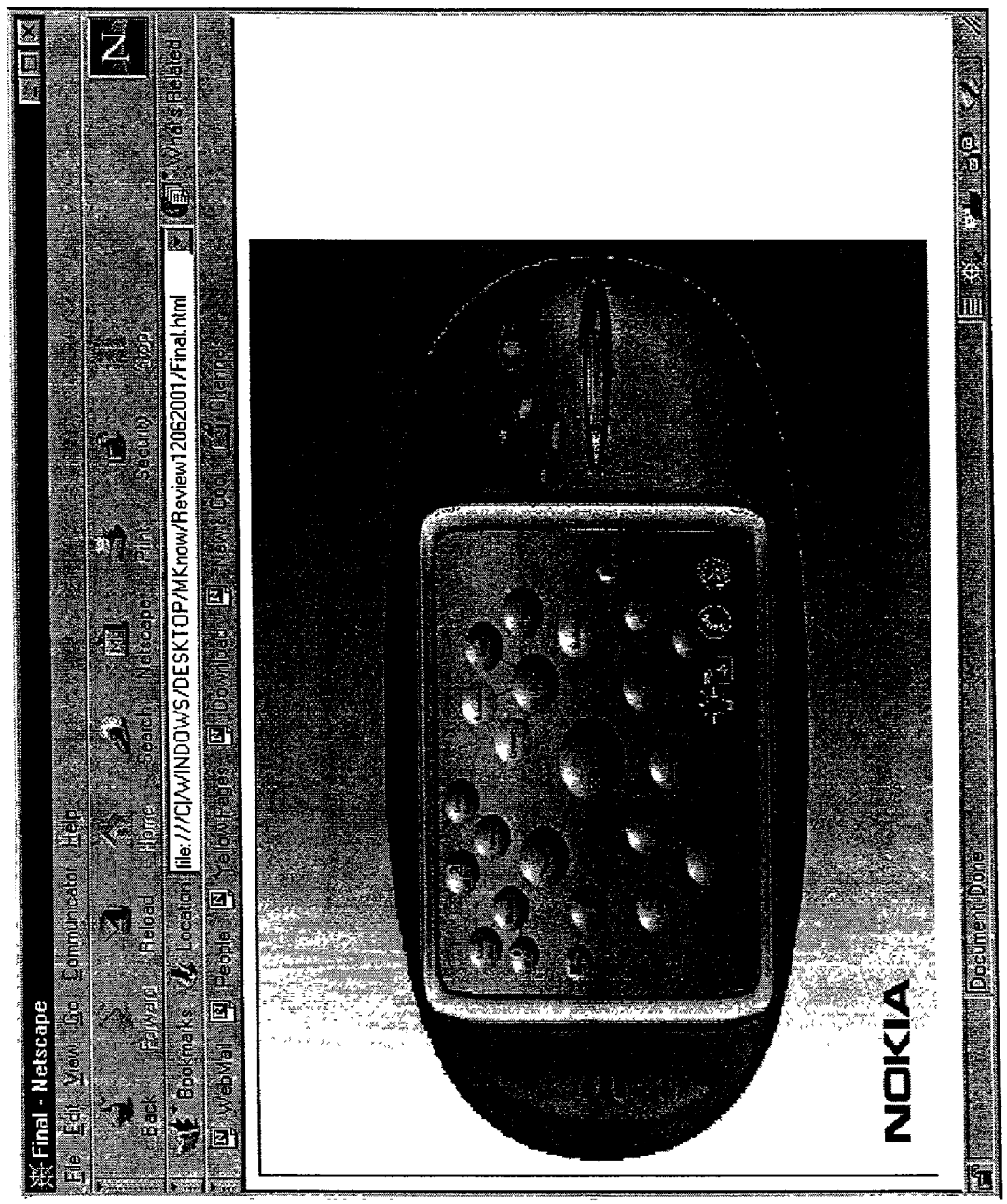
Figure 26A:
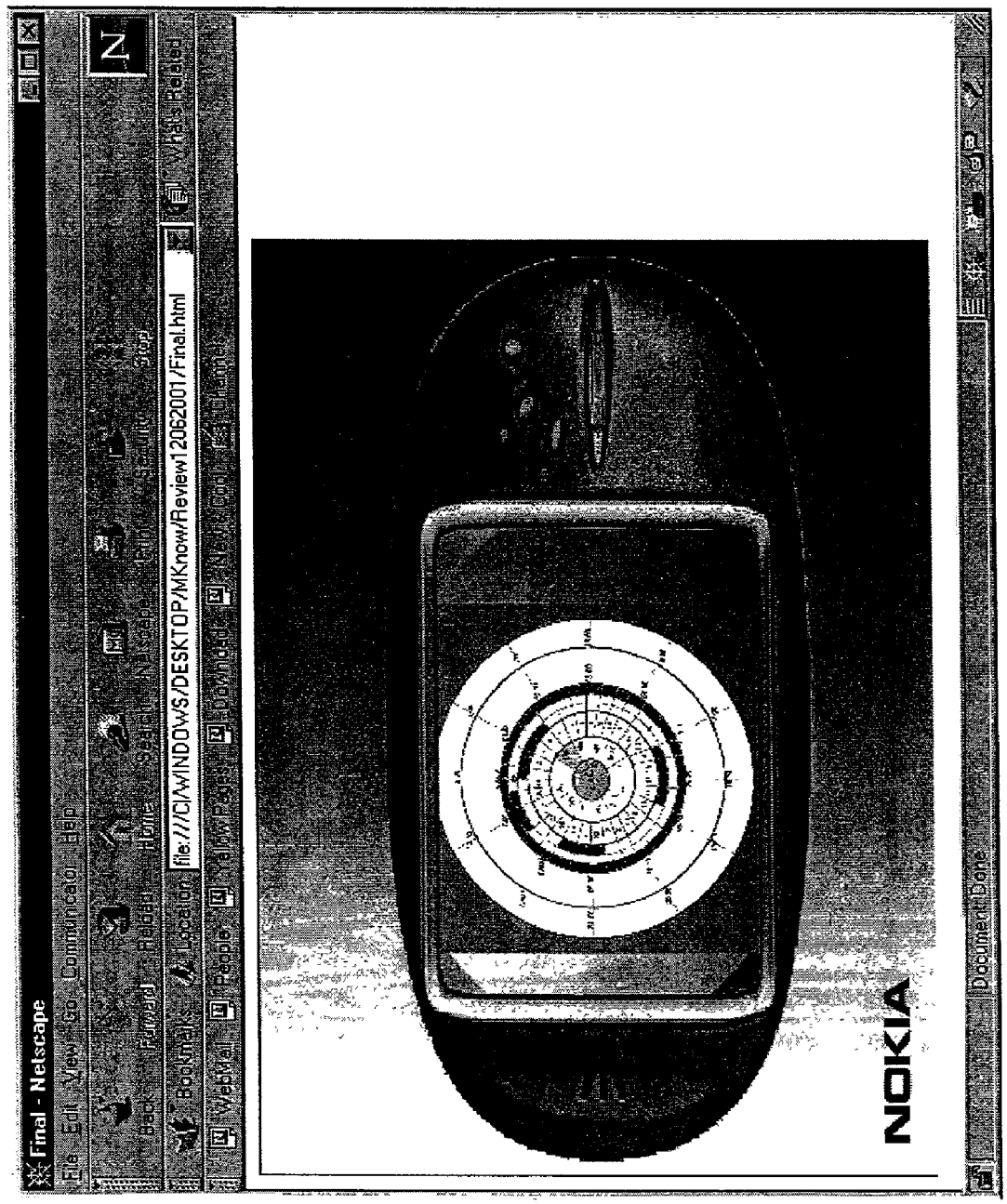
Figure 26A:
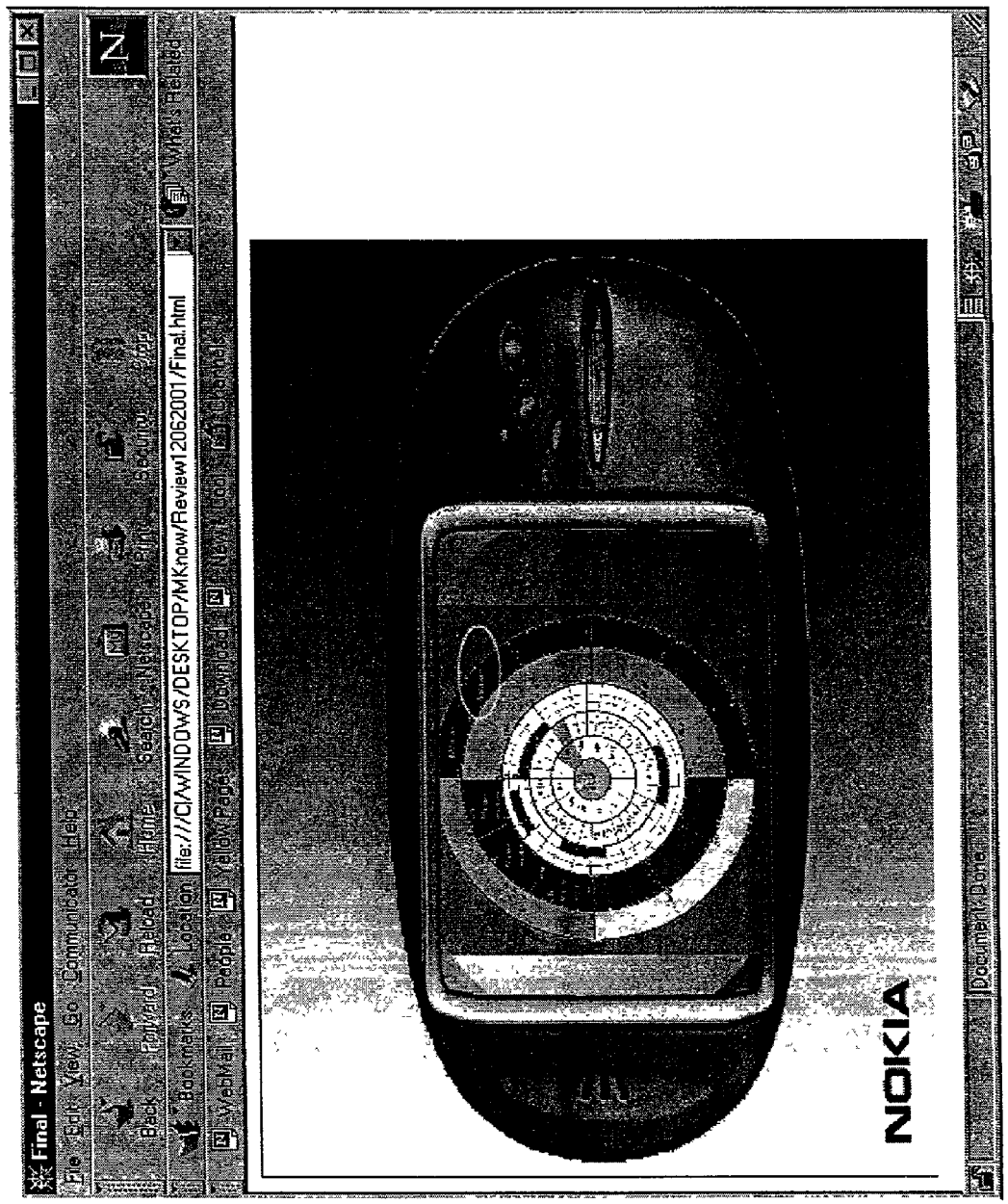
Figure 26A:
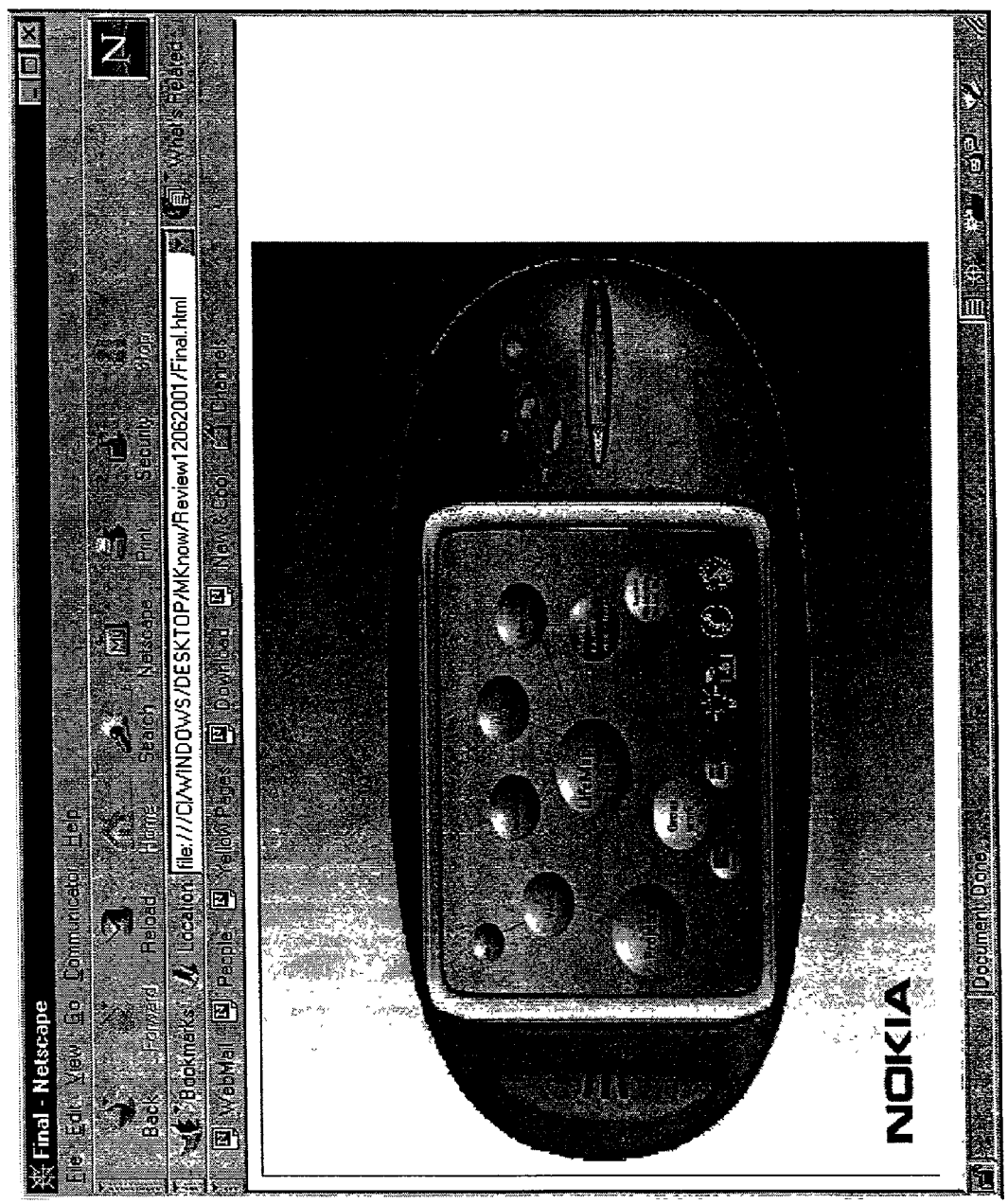
Figure 26A:
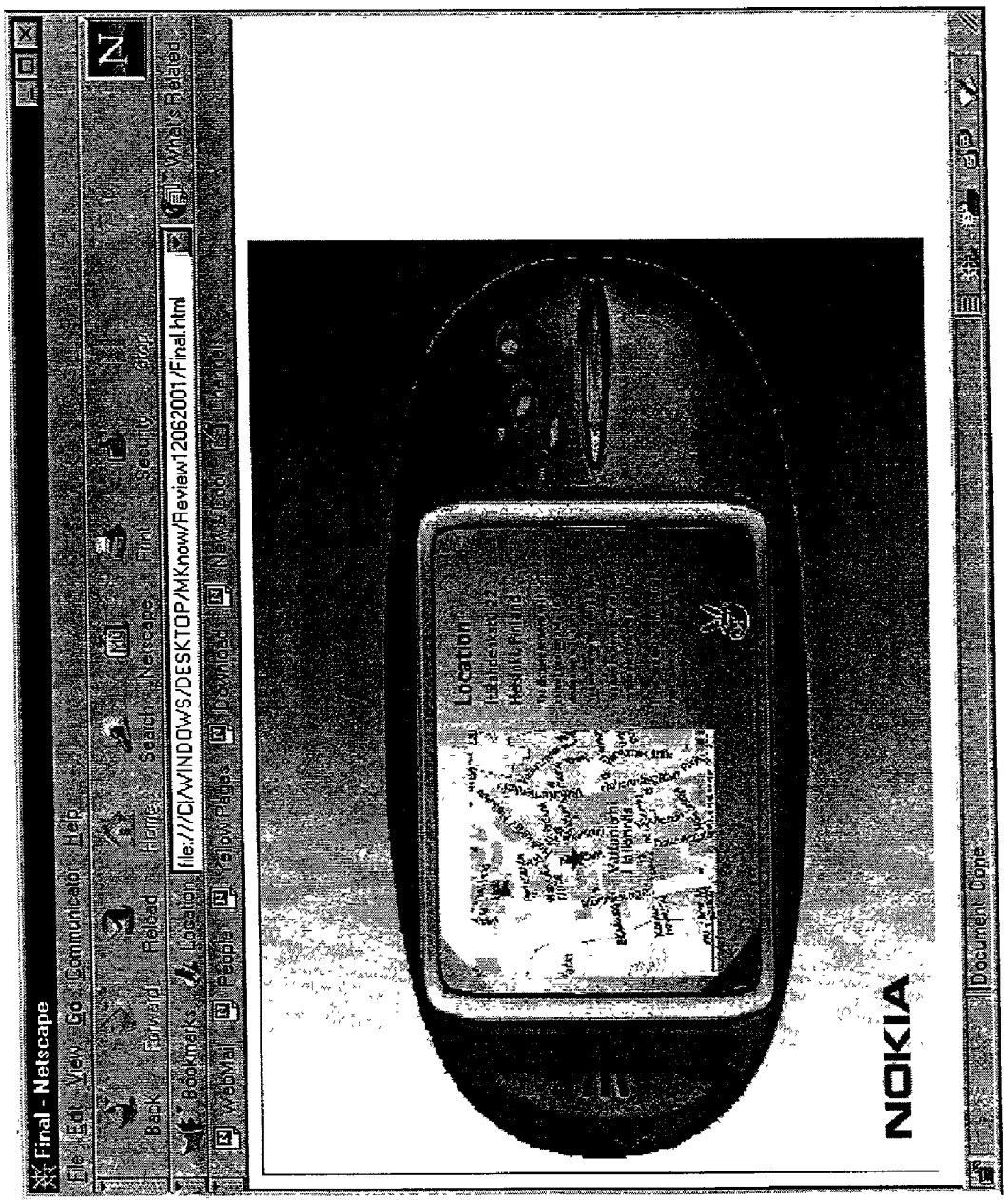

FIG. 26Z displays the result, where the new time entry is associated to the "Review" node. If the user subsequently clicks on the area designating that particular time in his calendar, the "Mapper" moves the node where the time entry was associated to the display, as shown in FIGS. 26AA–26AE, which display the user's map.

The user selects the "Schedule" node by a pointing device on FIG. 26AA. The "Mapper" then displays his calendar for that day, as shown in FIG. 26AB. The user then selects the time zone between 13:00 and 14:00 by means of a pointing device, as shown in FIG. 26AC. The "Mapper" then moves the node where that time entry was made to the display, as shown in FIG. 26AD. This reminds the user that the time entry in his calendar was associated to the child node "Meetings" of the "Mapper Project", and that its location is "Itälahdenkatu 22". This is another illustration of how the "Mapper" allows the user to customize his UI so that it directly reflects associations in his thinking. In addition, contact and calendar information items may be interrelated contextually by the same method using "Mapper".

The user may also select the location node of the meeting, depicted in FIG. 26AE. Now the "Mapper" tells him the distance between his present location and the meeting location, the current speed at which the user is moving, the time after which he has to leave from the present location to the meeting location to get there on time—both in the case of taking public transport or driving by his own car or taking a taxi. Further, in the case of public transport, the "Mapper" instructs which bus number or subway to take. All these functionalities are possible when a terminal has a GPS system for determining the location of the terminal, or it is identified by means of WLAN or Bluetooth.

FIGS. 27A–27D illustrate the exemplary actions that may be performed on the maps, in addition to creating nodes.

FIG. 27A illustrates one exemplary process of deleting an existing node from a map. To delete a node from a map, the user points at it by a pointing device, as shown in box 2705. In step 2710, the user drags the selected node to the node deletion symbol illustrated on the display and drops it thereupon. In step 2715, the node is deleted and erased from display. The submap of which that node is the root is also deleted. Each node uniquely defines a submap for the purposes of deletion, because maps that are graphs can be resolved into trees as described herein, and each node of a tree uniquely defines the subtree whose root the node is. It should be noted that deleting a node that has been identified with another node, which is not a part of the deleted submap results in deletion of only the former occurrence but not the latter, unless the user decides to delete both. The user is asked whether both the nodes must be deleted.

FIG. 27B illustrates one exemplary process of moving a submap to another location in a map. To move a submap— the limiting case is a single node submap—to another place in a map, the user points at the root of the submap by a pointing device, in step 2720. In step 2725, the root is dragged to the node to which the user wants to associate the dragged node, and drops it thereupon. In step 2730, the dragged root node becomes a child of the destination node. As with deletion, each node uniquely defines a submap for the purposes of copying, because maps that are graphs are resolved into trees as described herein. The display is modified to reflect the moved node or submap.

FIG. 27C illustrates one exemplary process of navigating a map manually. The user navigates a map manually by repeatedly selecting nodes, and thus moving the visible area of the map on the display device. In step 2735, the user clicks on a node symbol on a given map. As a result, in step 2740, the map is redrawn so that the clicked node symbol is moved to the center of the display. The immediately related nodes are then drawn around the node moved to the center. The children of the child nodes are drawn around the child nodes. This process is repeated recursively as long as all the nodes continue to be accommodated in the display. Selecting a node that is in the center of the display activates it for inspection or editing. For example, as described above, selecting an attachment node that is in the center of the display opens the attachment.

FIG. 27D illustrates one exemplary process of editing or displaying the name of a relationship. In step 2745, the user clicks on the edge that depicts a relationship on the terminal. In step 2750, the system displays the name of the relationship, if a name exits. In step 2755, the user may Edit-in-place (i.e., add, remove, modify) the name of the relationship, or just leave it as it is for display.

FIG. 28 illustrates the logical structure of one embodiment of a calendar 2800 that may be constructed using the present invention. The inner most circle 2810 represents the year in the calendar, while the surrounding circle 2820 represents the month. The next circle 2830 represents the day, which is followed by the hours circles 2840, 2850, each of which is divided into twelve equal numbered compartments. The first hours circle 2840 has twelve equal numbered compartments from 00:00 to 12:00, while the second hours circle 2850 has twelve equal numbered compartments from 12:00 to 24:00.

FIG. 29 illustrates one exemplary flow for constructing the calendar in accordance with the present invention. In step 2900, the system checks to determine if the user clicked the center of the calendar. If the user did click the center of the calendar, then in step 2905 the user is allowed to enter the desired year for the calendar. Next, in step 2910, the user may select the month option for entering the value for the month. In one embodiment, upon highlighting the month, the selected portion becomes colored.

Once the month's value has been entered, in step 2915, the system redisplays the day ring 2830 that contains the number of days in accordance with the value of the month as well as the year.

Next, in step 2920, the user may select the appropriate day for the calendar. Upon selection, the selected day becomes colored. In step 2925, the two time rings 2840, 2850 are redisplayed, with available/busy time of hours being dependent on the day. The busy hours may optionally be shown in red color, while the available hours may be shown in green color.

In step 2900, if the system determines that the user did not click the center of the calendar, then the calendar retains the current year in step 2930. From step 2930, the flow proceeds to step 2910 and continues as described above.

FIG. 30 illustrates one embodiment of the resolution of a graph into a tree. The present invention resolves the displayed representation of maps that contain cycles into trees if the user chooses so. This is because trees are sometimes more intuitive to grasp and can always be displayed in outline form on terminals without a graphical display.

A cycle, and hence a graph that needs to be resolved into a tree, can only be created by giving a new node a name that already occurs in the map. In this circumstance, the "Mapper" asks the user whether the same thing is denoted by both occurrences of the name. If the user answers positively, the two nodes are identified internally so that a change to one of the nodes is propagated to the other occurrence on the display. The first created occurrence is displayed normally. Providing another circle around the displayed node, which indicates that there exists another identical node in the map, identifies the second occurrence. If any of the two nodes is thereafter updated, the changes are also displayed at the other occurrence. Thus cycles may never be shown to the user, although they may exist (as shown by the dashed line in FIG. 30) in the underlying map structure. This resolution method also allows a node to uniquely determine a submap in deleting or copying a submap. The determination is carried out on the basis of the resolved representation.

Such a method of resolving a graph into a tree can be illustrated by the simplest possible example, as shown in FIG. 30. Initially, as shown in the (a) scenario, the map has nodes "A", "B", and "C", which is to be extended with a new node.

The new node has the name "B", as shown in (b), and the name "B" already exists in the map as denoted by making the second occurrence of "B" doubly circled. The user intends them to denote the same node, which transforms the tree into a graph, as shown in (c). This graph may be resolved into the tree (shown in (b)) when it is displayed. The resolution simply displays the tree (shown in (b)) where the same node ("B") occurs at two different places. Any changes made by the user to one of the occurrences will automatically be propagated to the other occurrence, except deletion.

Node "A" is the uniquely determined root of the submap of (c), because it was initially the root of the tree that was transformed into a graph by adding a second occurrence of node "B".

When the terminal in use has a graphical display, the present invention may also display cycles in graphs. To enter or exit this graph display mode, the user may select a special button in the UI by means of a pointing device.

In a terminal without a graphical display, information is always displayed in outline form, which is a linear representation of tree form, irrespective of whether the user has switched into graph display mode or not.

Graphs are then resolved to trees throughout. This is always possible like the display of a Unix file system as a tree structure despite symbolic links that form graphs of a kind.

Thus, as will be evident, the present invention allows two different visual structures that the user may switch between depending on his preference. In graph display mode, the UI displays graphs, and otherwise trees. In graph display mode, the user may choose a two- or three-dimensional display for graphs if he is using a terminal with a graphical display. The three-dimensional display may make complex graph structures easier to grasp.

Figure 33:
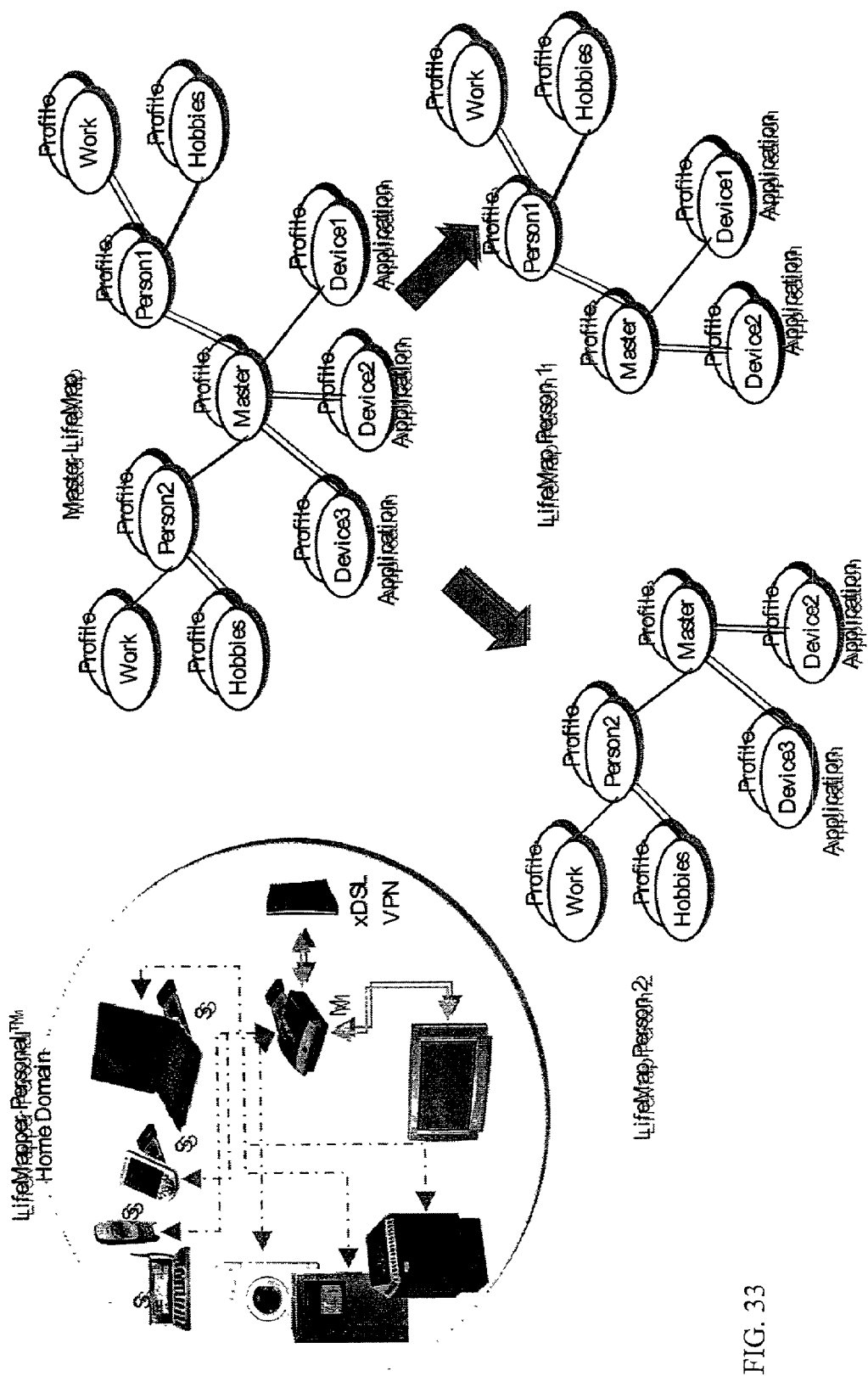
FIG. 33 illustrates the example where each member of a family (or similar group of people) has a map which is a submap of the master device's map.

FIG. 33 illustrates the example where each member of a family (or similar group of people) has one's own map which is a submap of the master device's map, and they share the same devices (e.g. refrigerator, coffee machine) through the master. One user may be given access to different devices than another, and so, for example, person 1 has access to devices 1 and 2, while person 2 has access to devices 2 and 3. This feature may be used to, for example, disallow children to access potentially dangerous devices. The users can also share applications, which are subnodes of the master. Furthermore, users are able to share nodes which represent common content, such as a family's shopping list. Each family member may have access to the content and may thus update it at any time and place device-independently. This is a form of collaboration supported by the CIE.

Thus, in summary, herein is disclosed a method, system and apparatus for enabling users to create customized user interfaces. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface.

Although illustrative embodiments have been described herein in detail, it should be noted and understood that the descriptions have been provided for purposes of illustration only and that other variations both in form and detail can be made thereupon without departing from the spirit and scope of this invention. The terms and expressions have been used as terms of description and not terms of limitation. There is no limitation to use the terms or expressions to exclude any equivalents of features shown and described or portions thereof and this invention shown be defined with the claims that follow.

We claim:

1. A method for updating a user interface in a contextualized interaction environment for use in a computing device, comprising:
   a. displaying information on the user interface via a node map;
      i. wherein said node map is arranged to represent said information in a particular context on the user interface by utilizing a content abstraction layer, said content abstraction layer comprising links to at least one of content, applications, services and devices;
   b. receiving user instruction regarding information displayed on the user interface;
   c. updating said internal node map in accordance with said user instruction; and
   d. displaying the user interface in accordance with the updated internal node map.

2. The method of claim 1, further comprising adding new information for display on the interface.

3. The method of claim 2, wherein said new information is represented in said node map by adding a new node thereto.

4. The method of claim 3, wherein said new information is related to existing information, such that said new node is linked to an existing node in said node map to form a relationship.

5. The method of claim 4, where said new node inherits all properties of said existing node.

6. The method of claim 1, further comprising deleting existing information from display on the interface.

7. The method of claim 6, wherein said deleting of existing information is represented in said node map by removing an existing node that corresponds to the information being deleted.

8. The method of claim 1, wherein said content abstraction layer comprises abstraction information on said content, said applications, said services, and said devices.

9. The method of claim 1, further comprising transmitting information regarding the interface to a remote master device, wherein said master device is capable of controlling processing of information on the computing device.

10. The method of claim 9, wherein said master device is connected to a service provider, such that the computing device is able to utilize services provided by said service provider.

11. The method of claim 9, wherein said master device is connected to a plurality of computing devices.

12. The method of claim 11, wherein said master device stores node maps from each of said plurality of computing devices connected thereto.

13. The method of claim 12, wherein a plurality of users of said plurality of computing devices are enabled to communicate therebetween in a peer-to-peer network.

14. The method of claim 1, wherein said interface may be adjusted to inter-allow display of the user information in a plurality of display formats.

15. The method of claim 14, wherein said plurality of display formats are interchangeable.

16. The method of claim 18, wherein said attachment node has an attachment locator linked thereto for allowing usage of an attached file associated therewith.

17. The method of claim 1, wherein said node map comprises a plurality of nodes.

18. The method of claim 17, wherein said node is one of a note node, an attachment node, an action node and an application node.

19. The method of claim 18, wherein said action node has a built-in capacity of creating another node, removing an existing node, or running node applications.

20. The method of claim 18, wherein said application node has a built-in application functionality associated therewith.

21. The method of claim 18, wherein said note node contains a link to a second node map.

22. The method of claim 18, wherein said node has a profile associated therewith.

23. The method of claim 22, wherein said profile is used to define the attributes of said node.

24. The method of claim 23, wherein said attributes further define the security level of said node.

25. A system for updating a user interface in a contextualized interaction environment for use in a computing device, comprising:

a. a memory; and
b. a processor in communication with said memory, said processor configured for:
   displaying information on the user interface via a node map, wherein said node map is arranged to represent said information in a particular context on the user interface by utilizing a content abstraction layer, said content abstraction layer comprising links to at least one of content, applications, services and devices;
   receiving user instruction regarding information displayed on the user interface;
   updating said internal node map in accordance with said user instruction, and
   displaying the user interface in accordance with the updated internal node map.

26. The system of claim 25, wherein said processor is further configured for adding new information for display on the interface.

27. The system of claim 26, wherein said new information is represented in said node map by adding a new node thereto.

28. The system of claim 27, wherein said new information is related to existing information, such that said new node is linked to an existing node in said node map to form a relationship.

29. The system of claim 28, wherein said new node inherits all properties of said existing node.

30. The system of claim 25, wherein said processor is further configured for deleting existing information from display on the interface.

31. The system of claim 30, wherein said deleting of existing information is represented in said node map by removing an existing node that corresponds to the information being deleted.

32. The system of claim 25, wherein said content abstraction layer comprises abstraction information on said content, said applications, said services, and said devices.

33. The system of claim 25, wherein said processor is further configured for transmitting information regarding the interface to a remote master device, wherein said master device is capable of controlling processing of information on the computing device.

34. The system of claim 33, wherein said master device is connected to a service provider, such that the computing device is able to utilize services provided by said service provider.

35. The system of claim 33, wherein said master device is connected to a plurality of computing devices.

36. The system of claim 35, wherein said master device stores node maps from each of said plurality of computing devices connected thereto.

37. The system of claim 36, wherein a plurality of users of said plurality of computing devices are enabled to communicate therebetween in a peer-to-peer network.

38. The system of claim 25, wherein said interface may be adjusted to inter-allow display of the user information in a plurality of display formats.

39. The system of claim 38, wherein said plurality of display formats are interchangeable.

40. The system of claim 25, wherein said node map comprises a plurality of nodes.

41. The system of claim 40, wherein said node is one of a note node, an attachment node, an action node and an application node.

42. The system of claim 41, wherein said attachment node has an attachment locator linked thereto for allowing usage of an attached file associated therewith.

43. The system of claim 41, wherein said action node has a built-in capacity of creating another node, removing an existing node, or running node applications.

44. The system of claim 41, wherein said application node has a built-in application functionality associated therewith.

45. The system of claim 41, wherein said note node contains a link to a second node map.

46. The system of claim 41, wherein said node has a profile associated therewith.

47. The system of claim 46, wherein said profile is used to define the attributes of said node.

48. The system of claim 47, wherein said attributes further define the security level of said node.

49. A system for updating a user interface in a contextualized interaction environment for use in a computing device, comprising:
a. means for displaying information on the user interface via a node map;
   i. wherein said node map is arranged to represent said information in a particular context on the user interface by utilizing a content abstraction layer, said content abstraction layer comprising links to at least one of content, applications, services and devices;
b. means for receiving user instruction regarding information displayed on the user interface;
c. means for updating said internal node map in accordance with said user instruction, and
d. means for displaying the user interface in accordance with the updated internal node map.

50. The system of claim 49, further comprising means for adding new information for display on the interface.

51. The system of claim 50, wherein said new information is represented in said node map by adding a new node thereto.

52. The system of claim 51, wherein said new information is related to existing information, such that said new node is linked to an existing node in said node map to form a relationship.

53. The system of claim 52, wherein said new node inherits all properties of said existing node.

54. The system of claim 49, further comprising means for deleting existing information from display on the interface.

55. The system of claim 54, wherein said deleting of existing information is represented in said node map by removing an existing node that corresponds to the information being deleted.

56. The system of claim 49, wherein said content abstraction layer comprises abstraction information on said content, said applications, said services, and said devices.

57. The system of claim 49, further comprising means for transmitting information regarding the interface to a remote master device, wherein said master device is capable of controlling processing of information on the computing device.

58. The system of claim 57, wherein said master device is connected to a service provider, such that the computing device is able to utilize services provided by said service provider.

59. The system of claim 58, wherein said master device is connected to a plurality of computing devices.

60. The system of claim 59, wherein said master device stores node maps from each of said plurality of computing devices connected thereto.

61. The system of claim 60, wherein a plurality of users of said plurality of computing devices are enabled to communicate therebetween in a peer-to-peer network.

62. The system of claim 49, wherein said interface may be adjusted to inter-allow display of the user information in a plurality of display formats.

63. The system of claim 62, wherein said plurality of display formats are interchangeable.

64. The system of claim 49, wherein said node map comprises a plurality of nodes.

65. The system of claim 64, wherein said node is one of a note node, an attachment node, an action node and an application node.

66. The system of claim 65, wherein said attachment node has an attachment locator linked thereto for allowing usage of an attached file associated therewith.

67. The system of claim 65, wherein said action node has a built-in capacity of creating another node, removing an existing node, or running node applications.

68. The system of claim 65, wherein said application node has a built-in application functionality associated therewith.

69. The system of claim 65, wherein said note node contains a link to a second node map.

70. The system of claim 69, wherein said node has a profile associated therewith.

71. The system of claim 70, wherein said profile is used to define the attributes of said node.

72. The system of claim 71, wherein said attributes further define the security level of said node.

73. A user interface created in a contextualized interaction environment for use in a computing device, said computing device comprising:
a. display,
b. a processor in communication with said display,
c. a data entry device in communication with said processor;
d. a storage unit in communication with said processor; and
e. software means in communication with said processor, said software means for:
displaying information on the user interface via a node map, wherein said node map is arranged to represent said information in a particular context on the user interface by utilizing a content abstraction layer, said content abstraction layer comprising links to at least one of content, applications, services and devices;
receiving user instruction regarding information displayed on the user interface;
updating said internal node map in accordance with said user instruction, and
displaying the user interface in accordance with the updated internal node map.

74. The interface of claim 73, wherein storage unit stores at least one of data, operating system and Java virtual machine.

75. The interface of claim 73, wherein storage unit further stores a contextualized interaction environment software.

76. An apparatus for providing a user interface comprising:
elements that represent at least one context by utilizing a content abstraction layer, said content abstraction layer comprising links to at least one of content, applications, services and devices;
the user interface being modifiable by a user for interactive communication with a display and a common interface, said common interface carrying enablement elements for said user interface for communication between said common interface and at least one computing device, said communication comprising authentication information linked to said common interface, said communication between said interface and said at least one computing device being based on said authentication information linked to said common interface.

77. The apparatus of claim 76, wherein authentication information is transmitted by a mobile phone to said common interface.

78. The apparatus of claim 77, wherein transmission link is a low power RF.

79. The apparatus of claim 76, wherein said communication further includes sensor data and master device location information.

80. A computer program product comprising a computer usable medium having computer readable program code embodied in said medium for updating a user interface in a contextualized interaction environment for use in a computing device, comprising:
a. a computer readable program code for displaying information on the user interface via a node map;
i. wherein said node map is arranged to represent said information in a particular context on the interface by utilizing a content abstraction layer, said content abstraction layer comprising links to at least one of content, applications, services and devices;
b. a computer readable program code for receiving user instruction regarding information displayed on the user interface;
c. a computer readable program code for updating said internal node map in accordance with said user instruction; and
d. a computer readable program code for displaying the user interface in accordance with the updated internal node map.

81. The computer program product of claim 80, further comprising an application program interface (API) including definitions and instructions allowing the contextualized interaction environment to request data from and send data to an operating system.

82. The computer program product of claim 80, further comprising a platform independent application program interface (API) by which resources existing outside of the contextualized interaction environment are made available to a user through the user interface, wherein:
a. a user action triggers a command that is executed within the contextualized interaction environment corresponding to content, applications, services and devices existing outside of the contextualized interaction environment; and
b. the application program interface is utilized to access the content, applications, services and devices existing outside of the contextualized interaction environment in order to execute the command.

* * * * *